United States Patent
Snyder

(10) Patent No.: US 12,459,255 B2
(45) Date of Patent: Nov. 4, 2025

(54) SYSTEMS, DEVICES, AND METHODS FOR DISPENSING DROPS OF FLUID ACCORDING TO DROP PATTERNS

(71) Applicant: CANON KABUSHIKI KAISHA, Tokyo (JP)

(72) Inventor: Brent Andrew Snyder, Austin, TX (US)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/392,632

(22) Filed: Dec. 21, 2023

(65) Prior Publication Data

US 2025/0206016 A1    Jun. 26, 2025

(51) Int. Cl.
*B41J 2/045*     (2006.01)
*G03F 7/00*      (2006.01)

(52) U.S. Cl.
CPC ....... *B41J 2/04561* (2013.01); *B41J 2/04586* (2013.01); *G03F 7/0002* (2013.01)

(58) Field of Classification Search
CPC .. B41J 2/04586; B41J 2/2132; B41J 2/04561; B41J 2/15; B41J 2/0451; B41J 2/2139; B41J 2/2142; G03F 7/0002
See application file for complete search history.

(56) References Cited

U.S. PATENT DOCUMENTS

| | | | |
|---|---|---|---|
| 6,278,469 B1 | 8/2001 | Bland et al. | |
| 7,338,144 B2 | 3/2008 | Mantell et al. | |
| 8,496,313 B2 | 7/2013 | Ueshima | |
| 8,567,896 B2 | 10/2013 | Ueshima | |
| 10,654,286 B2 * | 5/2020 | Reyero | B41J 2/2052 |
| 10,739,675 B2 | 8/2020 | Traub et al. | |
| 2010/0101493 A1 * | 4/2010 | Hodge | B05B 12/004 |
| | | | 118/697 |
| 2021/0397082 A1 | 12/2021 | Hussein | |
| 2021/0405547 A1 | 12/2021 | Hussein | |
| 2023/0033557 A1 | 2/2023 | Rafferty et al. | |

* cited by examiner

*Primary Examiner* — Thinh H Nguyen
(74) *Attorney, Agent, or Firm* — Canon U.S.A., Inc. IP Division

(57) ABSTRACT

Some devices, systems, and methods specify nozzles of a fluid dispenser that are usable to eject fluid and nozzles of the fluid dispenser that are not usable to eject fluid; specify contiguous nozzle groups of the nozzles that are usable to eject fluid; specify a coverage height of a largest contiguous nozzle group of the contiguous nozzle groups; determine, for one or more pass combinations, a respective combined coverage height, wherein each pass combination respectively includes two or more passes, of the fluid dispenser, that are shifted relative to each other by a shift value; and select, as a selected basis of a scanning pattern, the largest contiguous nozzle group or, alternatively, one of the one or more pass combinations based on the coverage height of the largest contiguous nozzle group and on the respective combined coverage height of each of the one or more pass combinations.

20 Claims, 28 Drawing Sheets

SYSTEMS, DEVICES, AND METHODS FOR DISPENSING DROPS OF FLUID ACCORDING TO DROP PATTERNS

BACKGROUND

Technical Field: This application generally concerns dispensing drops of fluid according to drop patterns for imprint lithography and inkjet-based adaptive planarization.

Background: Nano-fabrication includes the fabrication of very small structures that have features that are 100 nanometers or smaller. One application of nano-fabrication is the fabrication of integrated circuits. The semiconductor-processing industry continues to strive for larger production yields while increasing the circuits per unit area formed on a substrate. Improvements in nano-fabrication include providing greater process control and increasing throughput while also allowing continued reduction of the minimum feature dimensions of the structures formed. Another application of nano-fabrication is the fabrication of meta optical elements.

Some nano-fabrication techniques are commonly referred to as nanoimprint lithography. Nanoimprint lithography is useful in a variety of applications including, for example, fabricating one or more layers of integrated devices. Examples of integrated devices include CMOS logic, microprocessors, NAND Flash memory, NOR Flash memory, DRAM memory, MRAM, 3D cross-point memory, Re-RAM, Fe-RAM, STT-RAM, MEMS, optical components, and the like.

Some nanoimprint lithography techniques form a feature pattern in a formable material (polymerizable) layer and transfer a pattern corresponding to the feature pattern into or onto an underlying substrate. The patterning process uses a template spaced apart from the substrate, and a formable liquid is applied between the template and the substrate. The formable liquid is solidified to form a solid layer that has a pattern conforming to a shape of the surface of the template that is in contact with the formable liquid. After solidification, the template is separated from the solidified layer such that the template and the substrate are spaced apart. The substrate and the solidified layer are then subjected to additional processes, such as etching processes, to transfer a relief image into or onto the substrate that corresponds to the pattern in the solidified layer. In an alternative embodiment, the solidified layer is a functional material that is retained as part of the substrate.

Additionally, planarization techniques are useful in fabricating semiconductor devices. For example, the process for creating a semiconductor device may include repeatedly adding and removing material to and from a substrate. This process can produce a layered substrate with an irregular height variation (i.e., relief pattern), and, as more layers are added, the substrate's height variation can increase. The height variation negatively affects the ability to add further layers to the layered substrate. Moreover, semiconductor substrates (e.g., silicon wafers) themselves are not always perfectly flat and may include an initial surface height variation (i.e., relief pattern). One technique to address height variations is to planarize the substrate between layering procedures. A planarization technique, sometimes referred to as inkjet-based adaptive planarization (IAP), involves dispensing a variable drop pattern of polymerizable material between the substrate and a superstrate, where the drop pattern varies depending on the substrate's relief pattern. A superstrate is then brought into contact with the polymerizable material, after which the material is polymerized on the substrate, and the superstrate removed.

Various lithographic patterning techniques benefit from patterning on a planar surface. In ArFi laser-based lithography, planarization improves depth of focus (DOF), critical dimension (CD), and critical dimension uniformity. In extreme ultraviolet lithography (EUV), planarization improves feature placement and DOF. In nanoimprint lithography (NIL), planarization improves feature filling and CD control after pattern transfer.

And a substrate with polymerized material can be further subjected to known procedures and processes for device (article) fabrication, including, for example, curing, oxidation, layer formation, deposition, doping, planarization, etching, formable material removal, dicing, bonding, packaging, and the like.

SUMMARY

Some embodiments of a method comprise specifying nozzles of a fluid dispenser that are usable to eject fluid and nozzles of the fluid dispenser that are not usable to eject fluid; specifying contiguous nozzle groups of the nozzles that are usable to eject fluid; specifying a coverage height of a largest contiguous nozzle group of the contiguous nozzle groups, wherein the largest contiguous nozzle group includes more nozzles than any other nozzle group of the contiguous nozzle groups; determining, for one or more pass combinations, a respective combined coverage height, wherein each pass combination of the one or more pass combinations respectively includes two or more passes, of the fluid dispenser, that are shifted relative to each other by a shift value, and wherein at least one of the nozzles that are usable to eject fluid can eject fluid in each location encompassed by the respective combined coverage height in at least one of the two or more passes; and selecting, as a selected basis of a scanning pattern, the largest contiguous nozzle group or, alternatively, one of the one or more pass combinations based on the coverage height of the largest contiguous nozzle group and on the respective combined coverage height of each of the one or more pass combinations.

Some embodiments of a method comprise specifying fluid-dispense ports of a fluid dispenser that are usable to eject fluid and fluid-dispense ports of the fluid dispenser that are not usable to eject fluid; specifying a plurality of pass combinations, wherein each pass combination, of the plurality of pass combinations, respectively includes two or more passes, and wherein the two or more passes are shifted relative to each other according to shift values; determining, for each pass combination of the plurality of pass combinations, a respective maximum coverage range, and wherein at least one of the fluid-dispense ports that are usable to eject fluid can eject fluid in each drop location encompassed by the respective maximum coverage range; and selecting a selected pass combination from among the plurality of pass combinations based on the respective maximum coverage ranges.

Some embodiments of a device comprise one or more memories storing instructions and one or more processors. The one or more processors and the one or more memories are configured to obtain information indicating fluid-dispense ports of a collection of fluid-dispense ports that are usable to eject fluid and fluid-dispense ports of the collection of fluid-dispense ports that are not usable to eject fluid; specify a largest contiguous fluid-dispense port group of the fluid-dispense ports that are usable to eject fluid; specify, for each pass combination of a plurality of pass combinations, a respective maximum coverage range, wherein each pass combination, of the plurality of pass combinations, respectively includes two or more passes, and wherein the two or more passes are shifted relative to each other according to shift values, and wherein at least one of the fluid-dispense ports that are usable to eject fluid can eject fluid in each drop location encompassed by the respective maximum coverage range; and select, as a selected basis of a scanning pattern, the largest contiguous fluid-dispense port group or one of the plurality of pass combinations based on a height of the largest contiguous fluid-dispense port group and respective heights of the maximum coverage ranges.

DESCRIPTION

Figure 1:
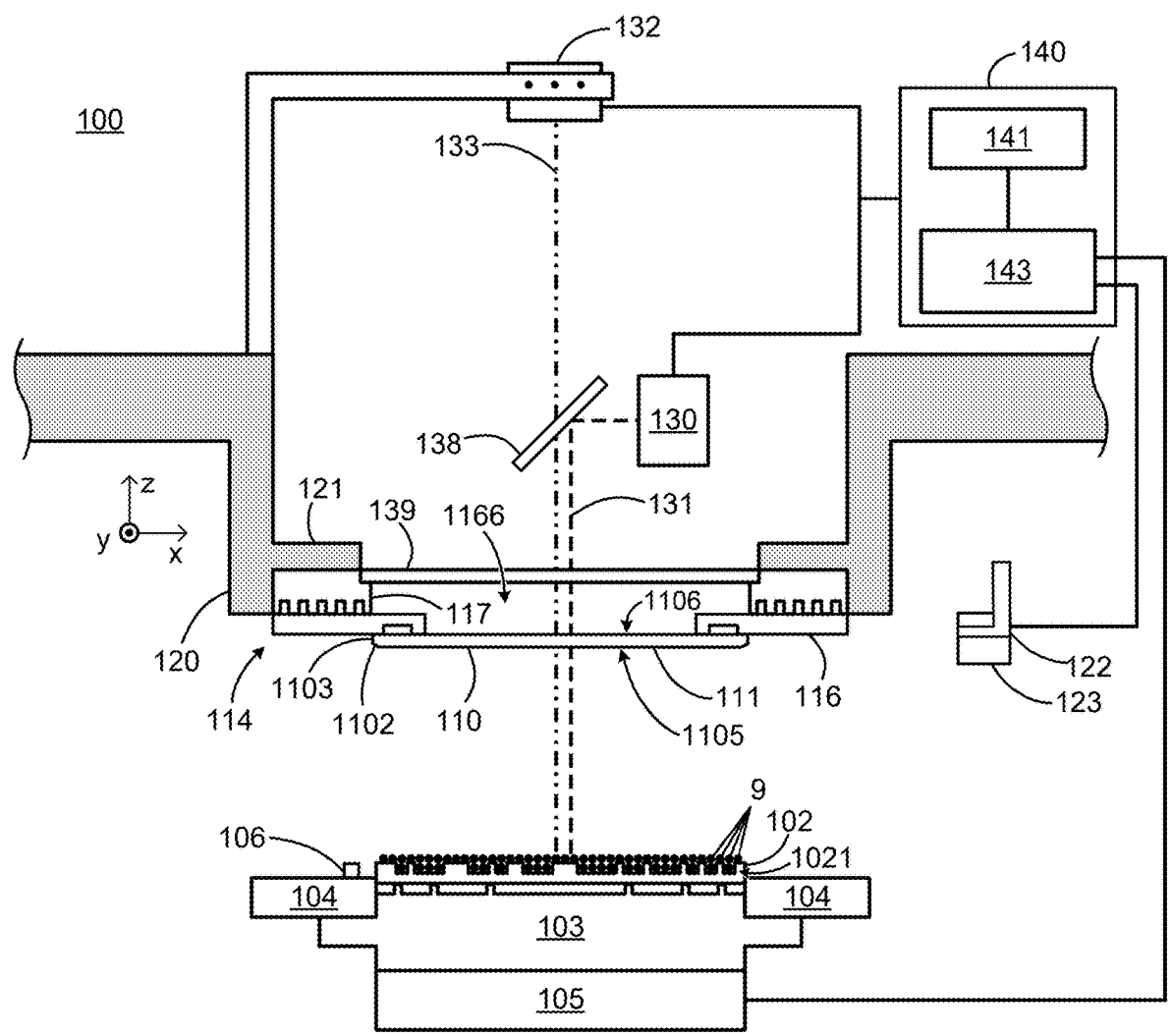
FIG. 1 illustrates an example embodiment of an imprint system.

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein. Furthermore, some embodiments include features from two or more of the following explanatory embodiments. Thus, features from various embodiments may be combined and substituted as appropriate.

Also, as used herein, the conjunction "or" generally refers to an inclusive "or," although "or" may refer to an exclusive "or" if expressly indicated or if the context indicates that the "or" must be an exclusive "or."

Moreover, as used herein, the terms "first," "second," and so on, do not necessarily denote any ordinal, sequential, or priority relation and may be used to more clearly distinguish one member, operation, element, group, collection, set, region, section, etc. from another without expressing any ordinal, sequential, or priority relation. Thus, a first member, operation, element, group, collection, set, region, section, etc. discussed below could be termed a second member, operation, element, group, collection, set, region, section, etc. without departing from the teachings herein.

And in the following description and in the drawings, like reference numbers designate identical or corresponding members throughout the several views.

Additionally, in this description and the drawings, an alphabetic suffix on a reference number may be used to indicate a specific instance of the feature identified by the reference number. For example, the fluid-dispense ports in a group of fluid-dispense ports may be identified with the reference number 124 when a specific fluid-dispense port is not being distinguished. However, 124A may be used to identify a specific fluid-dispense port when the specific fluid-dispense port is being distinguished from the rest of the fluid-dispense ports.

FIG. 1 illustrates an example embodiment of an imprint system 100 (e.g., a nanoimprint lithography system). Also, in some embodiments, the imprint system 100 is implemented as a single imprint device. When operating, the imprint system 100 deposits drops of formable material 9 (e.g., resist) on a substrate 102 and uses a plate (e.g., a superstrate 110) to, for example, planarize the formable material 9.

The substrate 102 may include a topography 1021 on a surface that is proximal to the superstrate 110. In FIG. 1, the topography 1021 is a feature pattern (e.g., a relief pattern). The topography 1021 may be composed of doped regions, etched regions, or other modifications. And the topography 1021 may also be composed of cured formable material (e.g., resist, planarization material), films of insulating material, or metal. For example, the topography 1021 may be composed of etchings in one or more underlying layers. And in some embodiments, the substrate 102 is in the form of a wafer.

In the embodiment of the imprint system 100 in FIG. 1, the perimeter of the substrate 102 is surrounded by an applique 104. The applique 104 may be configured to stabilize the local gas environment beneath the superstrate 110 or to help protect the substrate 102 and the formable material 9 from particles, for example when the superstrate 110 is separated from the formable material 9 and the substrate 102. Furthermore, a back surface of the applique 104 may be below (as shown in FIG. 1) or coplanar with the substrate surface.

Also, the substrate 102 is coupled to a substrate chuck 103, which also supports the applique 104. Examples of substrate chucks 104 include the following: vacuum chucks, pin-type chucks, groove-type chucks, electrostatic chucks, and electromagnetic chucks. In some embodiments, such as the embodiment shown in FIG. 1, the applique 104 is mounted on the substrate chuck 103 without any part of the applique being sandwiched between the substrate chuck 103 and the substrate 102. The substrate chuck 103 is supported by the substrate-positioning stage 105.

The substrate-positioning stage 105 may provide translational and/or rotational motion along one or more of the x, y, and z axes, and the rotational motion may be defined by the $\theta$, $\psi$, and $\phi$ angles. The substrate-positioning stage 105, the substrate 102, and the substrate chuck 103 may also be positioned on a base (not shown). Additionally, the substrate-positioning stage 105 may be a part of a positioning system or a positioning subsystem.

The imprint system 100 also includes at least one sensor 106, which is mounted on the applique 104 in this embodiment (although the sensor 106 may be mounted on the substrate chuck 103 in some embodiments). For example, the sensor 106 may be a spectral-interference displacement sensor (e.g., a spectral-interference laser displacement meter, such as a micro-head spectral-interference laser displacement meter), a capacitance sensor, an air-gauge sensor, an optical-phase sensor, a polarization sensor, or the like. Also, the sensor 106 may include a light emitter that emits light, as well as a corresponding light sensor that measures an intensity of the light. The sensor 106 generates signals that can be used to detect contaminants (e.g., particles) on a front surface 1105 of the superstrate 110, for example by moving the sensor 106 relative to the superstrate 110 such that the sensor 106 scans the front surface 1105 of the superstrate 110. Furthermore, the sensor 106 can generate signals that can be used to measure the relative movement of a reflective (or partially reflective) face of the superstrate 110 relative to another component, such as the substrate chuck 103. Also, the sensor 106 can generate signals that can be used to detect an edge of the superstrate 110 or to detect a transition boundary on the superstrate 110. For ease of illustration, the sensor 106 is illustrated as being above the applique 104. But, in some embodiments, a sensing surface of the sensor 106 is coplanar with a gas-controlling surface of the applique 104, below a gas-controlling surface of the applique 104, or below or coplanar with a chucking surface of the substrate chuck 103.

In some embodiments, the superstrate 110 is readily transparent to ultraviolet (UV) light. And examples of materials that may constitute the superstrate 110 include the following: fused-silica, quartz, silicon, organic polymers, siloxane polymers, borosilicate glass, fluorocarbon polymers, metal, and hardened sapphire.

The front surface 1105 of the superstrate 110 faces the substrate 102, and the front surface 1105 includes a contact surface 111. The superstrate 110 also has a back surface 1106 that faces away from the substrate 102. The contact surface 111 may generally be of the same area or size as, or slightly smaller than, the front surface 1105 of the superstrate 110. The contact surface 111 of the superstrate 110 may be or may include a planar contact surface. In some embodiments (e.g., embodiments that perform Inkjet-based Adaptive Planarization (IAP)), including the embodiment in FIG. 1, the contact surface 111 of the plate (the superstrate 110 in this example embodiment) is featureless. And, in some embodiments, the contact surface 111 of the superstrate 110 includes features that define a pattern that forms the basis of (e.g., an inverse of) a pattern to be formed on the substrate 102. In some embodiments, the contact surface 111 is on a mesa of the superstrate 110. Also, in some embodiments, an area of the contact surface 111 is smaller than an area of the substrate 102, and a step-and-repeat process is used to shape a surface of formable material 9 on the substrate 102.

The superstrate 110 may have a tapered edge. For example, the periphery of the front surface 1105 of the superstrate 110 may include a tapered region 1102. The tapered region 1102 surrounds the contact surface 111 and forms a border between the edge 1103 and the contact surface 111. In a radial direction from the center of the superstrate 110 toward the edge 1103 of the superstrate 110, the tapered region 1102 slopes away from the contact surface 111.

The superstrate 110 is held by a superstrate chuck assembly 114. The superstrate chuck assembly 114 is coupled to an imprint head 120, which in turn is moveably coupled to a frame 121 such that the superstrate chuck assembly 114, the imprint head 120, and the superstrate 110 are moveable in at least the z-axis direction. For example, the imprint head 120 may include one or more actuators, such as voice coil motors, piezoelectric motors, linear motors, nut and screw motors, etc., that are configured to move the superstrate chuck assembly 114 and the superstrate 110 in the z-axis direction. And in some embodiments, the superstrate chuck assembly 114, the imprint head 120, and the superstrate 110 are also movable in one or more of the x- and y-axes directions and one or more of the $\theta$, $\psi$, and $\phi$ angles.

The imprint system 100 may include one or more motors or actuators that move the superstrate 110, the superstrate chuck assembly 114, or the imprint head 120. For example, one or more motors may rotate the superstrate 110 about an axis in the x-y plane of the superstrate 110. Rotation of superstrate 110 about an axis in the x-y plane (e.g., a rotation about the x axis, a rotation about the x axis) of the superstrate 110 changes an angle between the x-y plane of the superstrate 110 and the x-y plane of substrate 102, and may be referred herein to as "tilting" the superstrate 110 with respect to the substrate 102, changing a "tilt" or "tilt angle" of the superstrate 110 with respect to the substrate 102, or adjusting the "tilt" or "tilt angle" of the superstrate 110 relative to the substrate 102.

The imprint system 100 also includes a fluid dispenser 122. The fluid dispenser 122 may also be moveably coupled to the frame 121. In some embodiments, the fluid dispenser 122 and the superstrate chuck assembly 114 share one or more positioning components. And in some embodiments, the fluid dispenser 122 and the superstrate chuck assembly 114 move independently of each other. Also, in some embodiments, the fluid dispenser 122 and the superstrate chuck assembly 114 are located in different subsystems of the imprint system 100, and the substrate 102 is moved between the different subsystems.

Different fluid dispensers 122 may use different technologies to dispense the drops of formable material 9. When the formable material is jettable, ink-jet-type fluid dispensers 122 may be used to dispense the drops of formable material 9. For example, thermal ink jetting, microelectromechanical-systems-based (MEMS-based) ink jetting, and piezoelectric ink jetting are technologies for dispensing jettable liquids.

The fluid dispenser 122 may include a fluid-dispense head 123 and fluid-dispense ports (e.g., nozzles). When operating, the fluid-dispense ports of the fluid dispenser 122 deposit drops of liquid formable material 9 onto the substrate 102 with the volume of formable material 9 varying over the area of the substrate 102 based at least in part on its topography profile. And the fluid dispenser 122 may deposit the drops of liquid formable material 9 onto the substrate 102 according to a drop pattern, which can define the distribution of the liquid formable material 9 (e.g., drop locations and drop volumes of the drops of the liquid formable material 9) on the substrate 102. The formable material 9 may be, for example, a resist (e.g., photo resist) or another polymerizable material, and the formable material 9 may comprise a mixture that includes a monomer. The drops of formable material 9 may be dispensed upon the substrate 102 before or after a desired field volume is defined between the contact surface 111 and the substrate 102, depending on the embodiment. The field volume indicates the volume of formable material 9 required to produce all of the desired features on the substrate 102 (e.g., the volume required to cover the topography 1021 with, for example, a planar surface).

Furthermore, additional formable material may be added to the substrate 102 using various techniques, for example drop dispense, spin-coating, dip coating, chemical vapor deposition (CVD), physical vapor deposition (PVD), thin film deposition, thick film deposition, or the like.

The imprint system 100 also includes an energy source 130 that directs actinic energy (e.g., ultraviolet (UV) radiation or other energy that initiates a substantial chemical reaction in the formable material 9) along an exposure path 131. In this embodiment, a reflecting plate 138 is positioned on the exposure path 131, and the reflecting plate 138 guides actinic energy from the energy source 130 to the substrate 102. The imprint head 120 and the substrate-positioning stage 105 may be configured to position the superstrate 110 and the substrate 102 on (e.g., in superimposition with) the exposure path 131. The energy source 130 sends the actinic energy along the exposure path 131 after the superstrate 110 has contacted the formable material 9. For illustrative purposes, FIG. 1 shows the exposure path 131 when the superstrate 110 is not in contact with the formable material 9 so that the relative positions of the individual components can be easily identified. However, the exposure path 131 does not substantially change when the superstrate 110 is brought into contact with the formable material 9.

The imprint system 100 also includes at least one imaging device 132 (e.g., camera). FIG. 1 illustrates an optical axis 133 of the imaging device's imaging field. As illustrated in FIG. 1, the imprint system 100 may include one or more optical components (e.g., dichroic mirrors, beam combiners, prisms, lenses, mirrors) that combine the actinic energy with light to be detected by the imaging device 132. Also, the imaging device 132 may be positioned such that an imaging field of the imaging device 132 includes the superstrate 110 and such that the imaging field is in superimposition with at least part of the exposure path 131. Accordingly, the imaging device 132 may be positioned to view the spread of formable material 9 as the superstrate 110 contacts the formable material 9 during the planarization process.

Additionally, the imaging device 132 may include one or more of a CCD sensor, a CMOS sensor, a sensor array, a line camera, and a photodetector that are configured to gather light at a wavelength that shows a contrast between regions underneath the superstrate 110 and in contact with the formable material 9 and regions underneath the superstrate 110 but not in contact with the formable material 9. And the imaging device 132 may be configured to provide images of the spread of formable material 9 underneath the superstrate 110 or of the separation of the superstrate 110 from cured formable material 9. The imaging device 132 may also be configured to measure interference fringes, which change as the formable material 9 spreads between the gap between the contact surface 111 and the substrate surface.

In operation, once the drops of formable material 9 have been deposited on the substrate 102, either the imprint head 120, the substrate-positioning stage 105, or both vary a distance between the superstrate 110 and the substrate 102 to define a desired space (a field volume) that is filled by the formable material 9. For example, the imprint head 120 can apply a force to the superstrate 110 that moves the contact surface 111 of the superstrate 110 into contact with the drops of formable material 9 that are on the substrate 102 such that the formable material 9 spreads on the substrate 102. As the superstrate 110 contacts the drops of formable material 9, the drops merge to form a formable-material film that fills the space between the superstrate 110 and the substrate 102. Preferably, the filling process happens in a uniform manner without any air or gas bubbles being trapped between the superstrate 110 and the substrate 102 in order to minimize non-fill defects.

After the desired field volume is filled with the formable material 9, the energy source 130 produces energy (e.g., actinic radiation) that is directed along the exposure path 131 to the formable material 9 and that causes the formable material 9 to cure (e.g., solidify, cross-link) in conformance to a shape of the substrate's topography 1021 and a shape of the contact surface 111. The formable material 9 can be cured while the superstrate 110 is in contact with the formable material 9, thereby forming a planarized surface on the substrate 102. Once a cured, planarized layer is formed on the substrate 102, the superstrate 110 can be separated therefrom. And the substrate 102 and the cured, planarized layer may then be subjected to additional known steps and processes for device (article) fabrication, including, for example, patterning, curing, oxidation, layer formation, deposition, doping, planarization, etching, formable material removal, dicing, bonding, and packaging, and the like. The substrate 102 may be processed to produce a plurality of articles (devices).

Figure 2A:
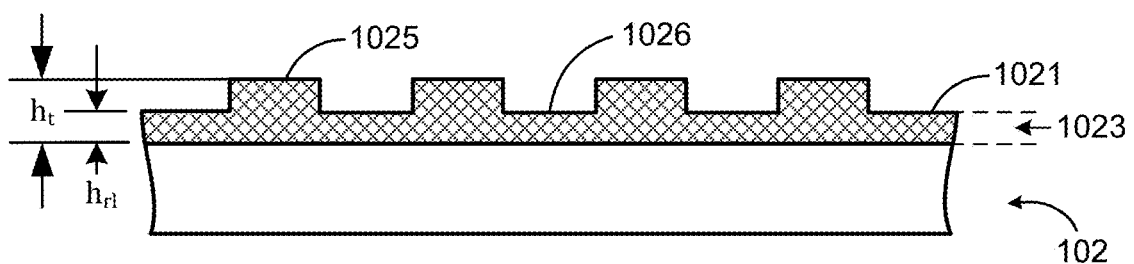
FIG. 2A illustrates an example embodiment of a topography on a substrate.

In embodiments of the imprint system 100 that perform IAP, the substrate 102 may have a topography 1021 (e.g., feature pattern) on its surface. For example, FIG. 2A illustrates an example embodiment of a topography 1021 on a substrate 102. The imprint system 100 may have been used to form the topography 1021 on the substrate 102. The topography 1021 may, for example, be made of cured formable material. In FIG. 2A, the substrate 102 has a topography 1021 on its back surface (which is the surface that is proximal to the superstrate 110). The topography 1021 includes a residual layer 1023 and a plurality of features that are shown as protrusions 1025 and recesses 1026 and that are a mirror image of a pattern on the superstrate 110. The protrusions 1025 have an imprint thickness $h_f$, which matches the depth of features in the superstrate 110.

Figure 2B:
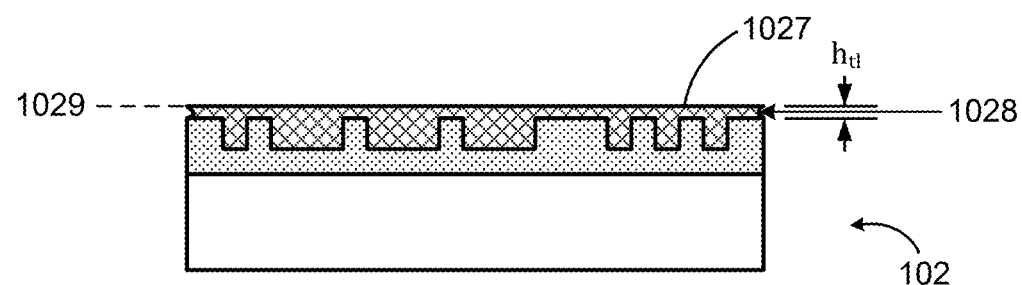
FIG. 2B illustrates an example embodiment of a planarized surface.

The drops of formable material 9 may form a patterned layer that fills the topography 1021 on the substrate 102, and the patterned layer may have a top layer that extends above the substrate 102 and that has a top layer thickness (TLT). Furthermore, the back surface of the top layer may be featureless and planar. For example, FIG. 2B illustrates an example embodiment of a planarized surface. FIG. 2B shows a planarized patterned layer 1027 that has been formed on a substrate 102, which includes recesses and protrusions. The planarized patterned layer 1027 fills in the recesses and protrusions in the substrate 102. The top layer 1028 of the planarized patterned layer 1027, which may be referred to as the overburden, is formed above the substrate 102 and has a top layer thickness (TLT) $h_{tl}$. Also, a back surface 1029 of the top layer 1028 is featureless and planar.

Furthermore, the imaging device 132 can detect (capture images of) alignment marks and overlay marks. Substrates 102 and superstrates 110 may include corresponding pairs of alignment marks that allow real-time alignment of the superstrates 110 and the substrates 102. After a superstrate 110 is positioned over a substrate 102 (e.g., superimposed over the substrate 102), a control device 140 determines an alignment of the superstrate-alignment marks with respect to the substrate-alignment marks based on the signals (e.g., images) from the imaging device 132. Alignment schemes may include measurement of alignment errors associated with pairs of corresponding alignment marks, followed by compensation of these errors to achieve accurate alignment of the superstrate 110 and a desired imprint location on the substrate 102.

And, as noted above, one or both of the substrate-positioning stage 105 and the imprint head 120 can be moved (e.g., translated, rotated) to change the relative positions of the substrate 102 and the superstrate 110. Also, the tilt of the superstrate 110 (or, in some embodiments, the tilt of the substrate 102) can be adjusted. For example, the imprint system 100 may include actuators (or other devices) that can translate the superstrate 110 about orthogonal axes (the x and y axes in FIG. 1) in the plane of the superstrate 110, rotate the superstrate 110 about an axis orthogonal to the plane (the z axis in FIG. 1), or both. Also for example, some embodiments of the imprint system 100 may translate the superstrate 110 along the z axis and rotate the superstrate 110 about an axis in the plane of the superstrate 110 (the x and y axes in FIG. 1).

As noted above, the imprint system 100 also includes a superstrate chuck assembly 114. The superstrate chuck assembly 114 includes a member 116 (e.g., a flexible ring portion), which may have an annular shape (e.g., a circular shape) or another shape that is formed from the region between two concentric polygons (e.g., squares, rectangles). Thus, the member 116 has both an inner perimeter and an outer perimeter and has a central opening. And the shape of the outer perimeter or the inner perimeter of the member 116 may be the same as, or similar to, the shape of the superstrate 110. Also, the member 116 may be made of a transparent material that allows UV light to pass through or may not be made of a transparent material that allows for UV light to pass through. Thus, the member 116 may or may not be composed of a material that is opaque to UV light. Also, the member 116 may be composed of a plastic (e.g., acrylic), a glass (e.g., fused silica, borosilicate), metal (e.g., aluminum, stainless steel), or a ceramic (e.g., zirconia, sapphire, alumina).

The member 116 may include a flexible portion. And the size or shape of the flexible portion of the member 116 may be varied, for example while performing the planarization process or while registering the substrate 102 to the superstrate 110.

The member 116 may further include a superstrate-holding cavity configured to hold a portion of the superstrate 110 to the flexible portion of the member 116. For example, in some embodiments the superstrate-holding cavity is an annular cavity that concentrically surrounds a central opening of the member 116. The superstrate-holding cavity may be located adjacent to the edge of the inner perimeter of the member 116. And the superstrate-holding cavity may be formed as a recessed portion in the flexible portion. In some embodiments, the inner diameter of the member 116 is smaller or the superstrate-holding cavity has additional lands.

The superstrate 110 may be held by the flexible portion by reducing the pressure in the superstrate-holding cavity. One manner of reducing the pressure in the superstrate-holding cavity is to produce a vacuum in the superstrate-holding cavity. In order to also produce a vacuum in the superstrate-holding cavity of the member 116, the chuck assembly 114 may further include a path (also referred herein as a vacuum path) in communication with the superstrate-holding cavity and in communication with a vacuum source. In a case that there is already a pressure differential within the assembly relative to the atmosphere around the assembly, the vacuum path can be used as a manner of reducing pressure in the superstrate-holding cavity without being coupled to a vacuum source. The vacuum path may include components (e.g., valves) that together allow the superstrate-holding cavity to impart a vacuum onto the superstrate 110.

In some embodiments, the superstrate-holding cavity and the vacuum path are replaced with another mechanism for coupling the member 116 with a superstrate 110. For example, in place of a cavity-vacuum arrangement, an electrode that applies an electrostatic force may be included. Another option is mechanical latching where a mechanical structure on the underside of the member 116 is mateable with the superstrate 110.

The chuck assembly 114 may further include a support ring 117. The support ring 117 does not need to be made of a transparent material that allows for UV light to pass through. Thus, the support ring 117 may be composed of a material that is opaque to UV light. For example, the support ring 117 may be composed of plastic (e.g., acrylic), glass (e.g., fused silica, borosilicate), metal (e.g., aluminum, stainless steel), or ceramic (e.g., zirconia, sapphire, alumina). In some embodiments, the support ring 117 is composed of the same material as the member 116.

The support ring 117 may include a circular (or polygonal shaped) main body defining an open central area, and the shape of the support ring 117 may be the same as, or similar to, the shape of the member 116. The outer circumference of the support ring 117 may be uniform. The inner circumference of the support ring 117 may include a step that provides a receiving surface for receiving a light-transmitting member 139. Accordingly, the light-transmitting member 139 may be placed onto the receiving surface of the step, thereby covering the central area. The light-transmitting member 139 may be secured onto the receiving surface, for example using an adhesive. Thus, when the light-transmitting member 139 is placed or secured onto the receiving surface and when a superstrate 110 is held by the member 116, a second cavity 1166 is defined by the underside surface of the light-transmitting member 139, the inner circumference of the support ring 117, the back surface of the member 116, and the back surface 1106 of the superstrate 110.

The member 116 may be coupled to the underside surface of the support ring 117 using a coupling member (not shown), such as a screw, nut, bolt, adhesive, and the like. The coupling member may be located adjacent to the outer edge of the support ring 117 and adjacent to the outer edge of the member 116.

Additional surface area of the member 116 may be selectively coupled to the support ring 117. The chuck assembly 114 may include additional vacuum paths that allow the member 116 to be selectively secured to the underside surface of the support ring 117. The additional vacuum paths that allow the member 116 to be selectively secured to the underside surface of the support ring 117 may be annular cavities in the support ring 117 that are open on the underside surface of the support ring 117. When the additional vacuum paths are connected to a vacuum source (e.g., a vacuum pump), and the upper side surface of the member 116 is in contact with the underside surface of the support ring 117, a vacuum can be applied to the annular cavities of the support ring 117 to secure the member 116 to the support ring 117. Because the annular cavities have different radial locations, each of the annular cavities will apply a suction force to a different section of the upper side surface of the member 116.

The light-transmitting member 139 covers the central opening of the member 116. In some embodiments, the light-transmitting member 139 is transparent to UV light with high UV light transmissivity. That is, the material composition of the light-transmitting member 139 may be selected such that UV light used to cure the formable material passes through the light-transmitting member 139. In some embodiments in which the light-transmitting member 139 transmits UV light, the light-transmitting member 139 is composed of a material (e.g., sapphire, fused silica) that transmits greater than 80% of light having a wavelength of 310-700 nm (i.e., UV light and visible light). And in some embodiments, the light-transmitting member 139 is not transparent to UV light. When the light-transmitting member 139 is not transparent to UV light, the light-transmitting member 139 may be composed of a material (e.g., glass, borosilicate) that transmits greater than 80% of light having a wavelength of 400-700 nm (i.e., visible light). That is, in embodiments in which it does not transmit UV light, the light-transmitting member 139 may be able to transmit visible light. Also, the light-transmitting member 139 may transmit light that is emitted by the heating-light source 136.

And the chuck assembly 114 may further include a fluid path in communication with the second cavity 1166 for pressurizing the second cavity 1166. As used herein, pressurizing includes both positive pressurizing and negative pressurizing. The fluid path can also be used to open the second cavity 1166 to the surrounding atmosphere. Also, the fluid path is in communication with one or more pressure sources or vacuum sources (e.g., pumps) or includes one or more ports that can be coupled to pressure sources or vacuum sources. And the fluid path may include components (e.g., one or more valves) that together allow the second cavity 1166 to selectively be positively or negatively pressurized.

The shape of the superstrate 110 may be changed by pressurizing (e.g., positively pressurizing, negatively pressurizing) the second cavity 1166. The amount of pressure may be selected such that it is sufficient to outwardly bow the superstrate 110 with a desired curvature. When the superstrate 110 is outwardly bowed, the back surface 1106 of the superstrate 110 forms a concave surface, and the front surface 1105 of the superstrate 110 forms a convex surface. Also, the second cavity 1166 may be negatively pressurized to inwardly bow the superstrate 110 with a desired curvature and to inwardly bend or bow the flexible portion of the member 116. When the superstrate 110 is inwardly bowed, the back surface 1106 of the superstrate 110 forms a convex surface, and the front surface 1105 of the superstrate 110 forms a concave surface.

The imprint system 100 may be regulated, controlled, or directed by one or more processors 141 (e.g., controllers) in communication with one or more other components or subsystems, such as the substrate-positioning stage 105, the imprint head 120, the fluid dispenser 122, the energy source 130, the imaging device 132, or the sensor 106, and may operate based on instructions in one or more programs stored in one or more computer-readable media 143. In some embodiments, including the embodiment in FIG. 1, the one or more processors 141 and the one or more computer-readable media 143 are included in a control device 140. The control device 140 regulates, controls, or directs the operations of the imprint system 100.

Each of the one or more processors 141 may be or may include one or more of the following: a central processing unit (CPU), which may include microprocessors (e.g., a single core microprocessor, a multi-core microprocessor); a graphics processing unit (GPUs); an application-specific integrated circuit (ASIC); a field-programmable-gate array (FPGA); a digital signal processor (DSP); and other electronic circuitry (e.g., other integrated circuits). For example, a processor 141 may be a purpose-built controller or may be a general-purpose controller that has been specially configured to be an imprint-system controller.

Examples of computer-readable media 143 include, but are not limited to, a magnetic disk (e.g., a floppy disk, a hard disk), an optical disc (e.g., a CD, a DVD, a Blu-ray), a magneto-optical disk, magnetic tape, semiconductor memory (e.g., a non-volatile memory card, flash memory, a solid-state drive, SRAM, DRAM, EPROM, EEPROM), a networked attached storage (NAS), an intranet-connected computer-readable storage device, and an internet-connected computer-readable storage device.

In the embodiment in FIG. 1, the control device 140 may operate as a drop-pattern-generation device, which generates one or more drop patterns (dispense patterns), and the control device 140 may obtain the one or more drop patterns from another device (e.g., a drop-pattern-generation device) that generated (or that store) the one or more drop patterns. For example, the one or more processors 141 may be in communication with a networked computer on which analysis is performed and control files, such as drop patterns, are generated. A drop pattern indicates where the fluid dispenser 122 should deposit drops of liquid formable material 9 onto the substrate 102. A drop pattern may be generated based, at least in part, on a field volume or on a feature pattern 1021 of the substrate 102. Also, to account for the feature pattern 1021 of the substrate 102, the drop density of the drop pattern may vary across the substrate 102. And the drop pattern may have a uniform drop density over regions of the substrate 102 that have a uniform density (e.g., blank areas, or areas where the feature pattern 1021 has a uniform feature density).

Figure 3:
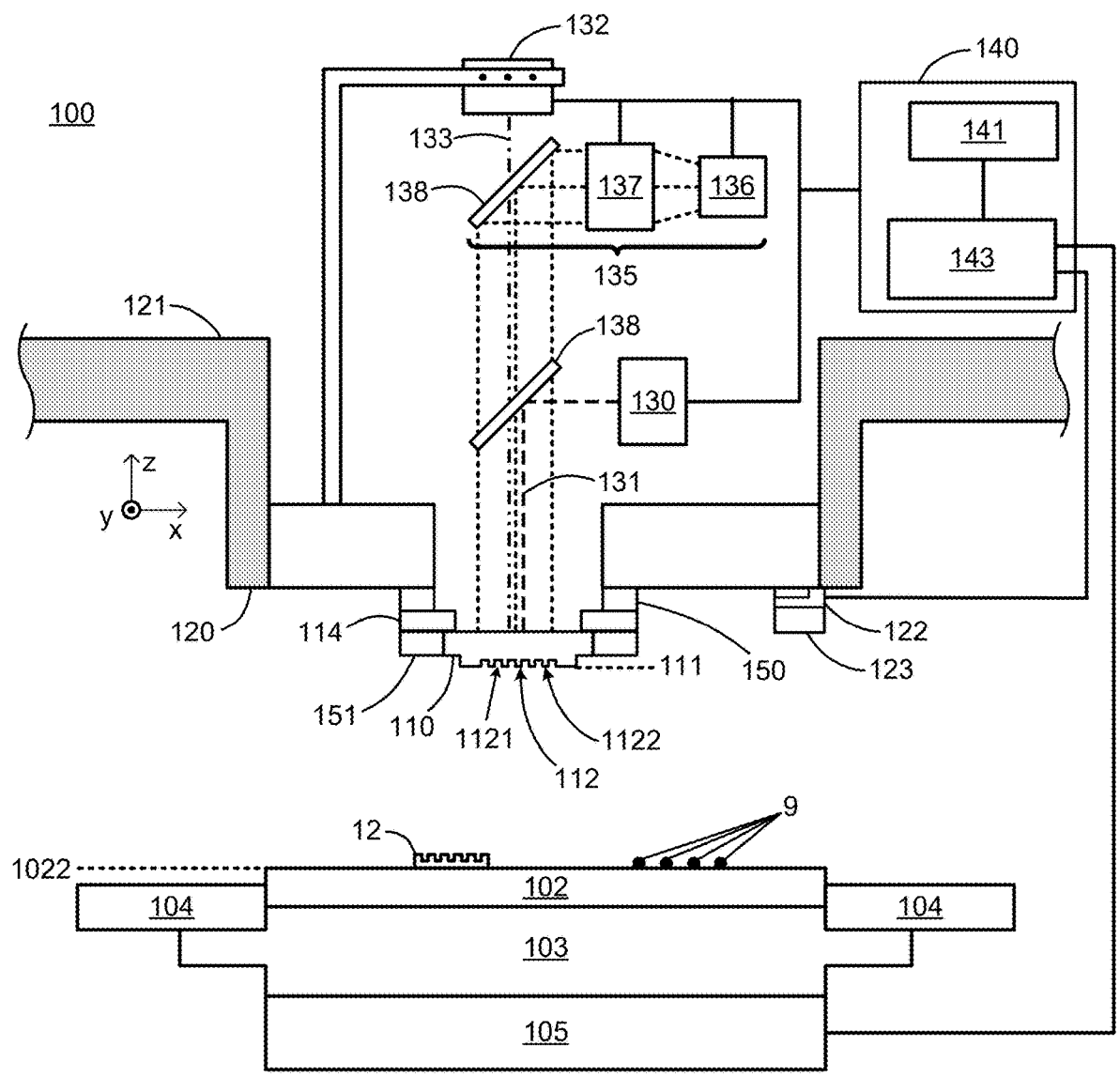
FIG. 3 illustrates an example embodiment of an imprint system.

FIG. 3 illustrates an example embodiment of an imprint system. Also, in some embodiments, the imprint system 100 is implemented as a single imprint device.

The imprint system 100 includes a substrate chuck 103; an applique 104; a substrate-positioning stage 105; a superstrate 110; a superstrate chuck assemblies 114; a fluid dispenser 122, which includes a fluid-dispense head 123; an energy source 130; an imaging device 132; a substrate-heating subsystem 135 (which is an example of a substrate heating unit), which includes a heating-light source 136, an adjusting unit 137, and a reflecting plate 138; one or more processors 141; and one or more computer-readable media 143. The one or more processors 141 and the one or more computer-readable media 143 are included in a control device 140.

Examples of the superstrate chuck assembly 114 include the following: vacuum chucks, pin-type chucks, groove-type chucks, electrostatic chucks, and electromagnetic chucks. The superstrate chuck assembly 114 may be configured to apply a force to the superstrate 110 that varies across the superstrate 110.

The contact surface 111 of the superstrate 110 has a pattern area 112. And a single pattern area 112 may be used to imprint the formable material 9 in a plurality of imprint fields on a single substrate 102 or a plurality of substrates 102. The pattern area 112 extends toward the substrate 102 along the z axis. Thus, in some embodiments, the contact surface 111 of the superstrate 110 functions as a mold, and the pattern area 112 is included on the surface of the superstrate 110 that faces the substrate 102. Examples of materials that may constitute the superstrate 110 include the following: fused-silica, quartz, silicon, organic polymers, siloxane polymers, borosilicate glass, fluorocarbon polymers, metal, and hardened sapphire.

The pattern area 112 has features that are defined by a plurality of spaced-apart recesses 1121 or protrusions 1122. The pattern area 112 defines a pattern that forms the basis (e.g., an inverse) of the relief pattern of a patterned layer 12 (such as the topography 1021 in FIG. 2A), which is formed from the drops of formable material 9 on the substrate 102. And the relief pattern has a residual layer, which has a residual layer thickness (RLT). For example, in NIL, the topography 1021 in FIG. 2A (which is a relief pattern) has a residual layer 1023, and the RLT is shown as hr in FIG. 2A.

The imprint system 100 can also include a substrate-heating subsystem 135 (which is an example of a substrate heating unit). The substrate-heating subsystem 135 deforms a region on the substrate 102 by heating the region on the substrate 102, and the heating may be performed before any formable material 9 has been deposited on the substrate 102, before formable material 9 that has been deposited on the substrate 102 is imprinted, before formable material 9 that has been deposited on the substrate 102 is cured, or while formable material 9 that has been deposited on the substrate 102 is cured.

The substrate-heating subsystem 135 includes a heating-light source 136, which irradiates the substrate 102 with light to heat the substrate 102; an adjusting unit 137, which adjusts the irradiation amount (irradiation amount distribution) of the light; and a reflecting plate 138, which defines an optical path to guide light from the adjusting unit 137 to the substrate 102. In an alternative embodiment, the substrate-heating subsystem 135 is a heat source which may or may not include the heating-light source 136 and is incorporated into the substrate chuck 103.

The heating-light source 136 emits light that has a wavelength to which the formable material 9, as an ultraviolet curing resin material, is not photosensitive (not cured), for example, light in a wavelength band of 400 nm to 2,000 nm. For heating efficiency, some embodiments of the heating-light source 136 emit light in a wavelength band of 500 nm to 800 nm. However, some embodiments of the heating-light source 136 emit light in other wavelength bands. Also, in some embodiments, the heating-light source 136 is a laser, such as a high-power laser.

The adjusting unit 137 allows only specific light of the emitted light to irradiate the substrate 102 in order to form a predetermined irradiation-amount distribution on the substrate 102. In some embodiments, the adjusting unit 137 includes one or more spatial light modulators (SLMs). An example of an SLM is a mirror array having an array of a plurality of mirrors, each including a drive axis, which may be referred to as digital mirror device (DMD), such as a digital micro-mirror device. A DMD can control (change) an irradiation amount distribution by individually adjusting the plane direction of each mirror.

Additionally, substrates 102 and superstrates 110 (when used for patterning) may include corresponding pairs of overlay marks that allow for assessment of and compensation for overlay errors in imprinted substrates 102. Overlay marks in a superstrate 110 are transferred to the polymeric layer (patterned layer 1021) during polymerization of the formable material 9, yielding an imprinted substrate 102 with corresponding pairs of overlay marks. The control device 140 may assess overlay errors of corresponding pairs of overlay marks in an imprinted substrate 102 to determine in-plane and out-of-plane contributions to overlay errors. In some alternative embodiments, the superstrate 110 does not have any superstrate-alignment marks, and alignment is based on a superstrate edge 1103 or a contact surface 111 of the superstrate 110. Also, some embodiments include superstrate-alignment marks and also can perform alignment based on a superstrate edge 1103 or a contact surface 111 of the superstrate 110.

This embodiment of the imprint system 100 also includes various components and features that can be used to compensate for distortions and reduce (or eliminate) overlay errors.

First, the imprint system 100 includes one or more load sensors 150 that detect forces applied to the superstrate 110 (e.g., applied to specific regions of the superstrate 110) in the contact process or the separation process. And the imprint system 100 can control (e.g., adjust) the forces that are applied to the superstrate 110 (e.g., applied to specific regions of the superstrate 110) in the contact process or the separation process. In some embodiments, the imprint system 100 estimates the forces applied to the superstrate 110 based on actuator control signals (current, voltage, etc.) of the imprint head 120 that are used to move the superstrate chuck assembly 114 towards the substrate chuck 103.

And the imprint system 100 includes a deformation device 151, which can deform the superstrate 110 (e.g., a pattern area 112 of the superstrate 110) of the superstrate 110. The deformation device 151 may deform the superstrate 110 such that a shape (including a size) of the superstrate 110 in a plane parallel to the x-y plane is changed. The deformation device 151 may deform the superstrate 110 by applying forces to at least some of the four side surfaces of the superstrate 110, for example. Accordingly, the deformation device 151 is a correction mechanism that physically deforms the superstrate 110 by applying external forces from the sides of the superstrate 110. By applying forces to the sides of the superstrate 110, the shape of the pattern area 112 of the superstrate 110 can be corrected. By making the pattern area 112 a desired shape through this correction, the difference between the shape of the pattern (shot area) formed on the substrate 102 and the shape of the pattern area 112 formed in the superstrate 110 can be reduced.

Also, the imprint system 100 may include one or more pressure mechanisms that apply forces to a surface of the superstrate 110 on a side opposite to the contact surface 111 (e.g., apply forces along the direction of the negative z axis in FIG. 1) to deform the pattern area 112 of the superstrate 110 such that the pattern area 112 of the superstrate 110 becomes convex toward the substrate 102 in the contact process.

When operating, the imprint system 100 deposits drops of formable material 9 (e.g., resist, functional material, etc.) on the substrate 102 (e.g., a wafer, replica template, etc.) and forms the patterned layer 12, which has a relief pattern, in the formable material 9 in an imprint field on the substrate 102 by using the superstrate 110 to imprint the formable material 9 on the substrate 102. The drops of formable material 9 may be dispensed upon the substrate 102 before or after a desired field volume is defined between the pattern area 112 and the substrate 102, depending on the embodiment. The field volume indicates the volume of formable material 9 required to produce all of the desired features of the patterned layer 12 (e.g., all of the features of the patterned layer 12 in an imprint field).

Figure 4A:
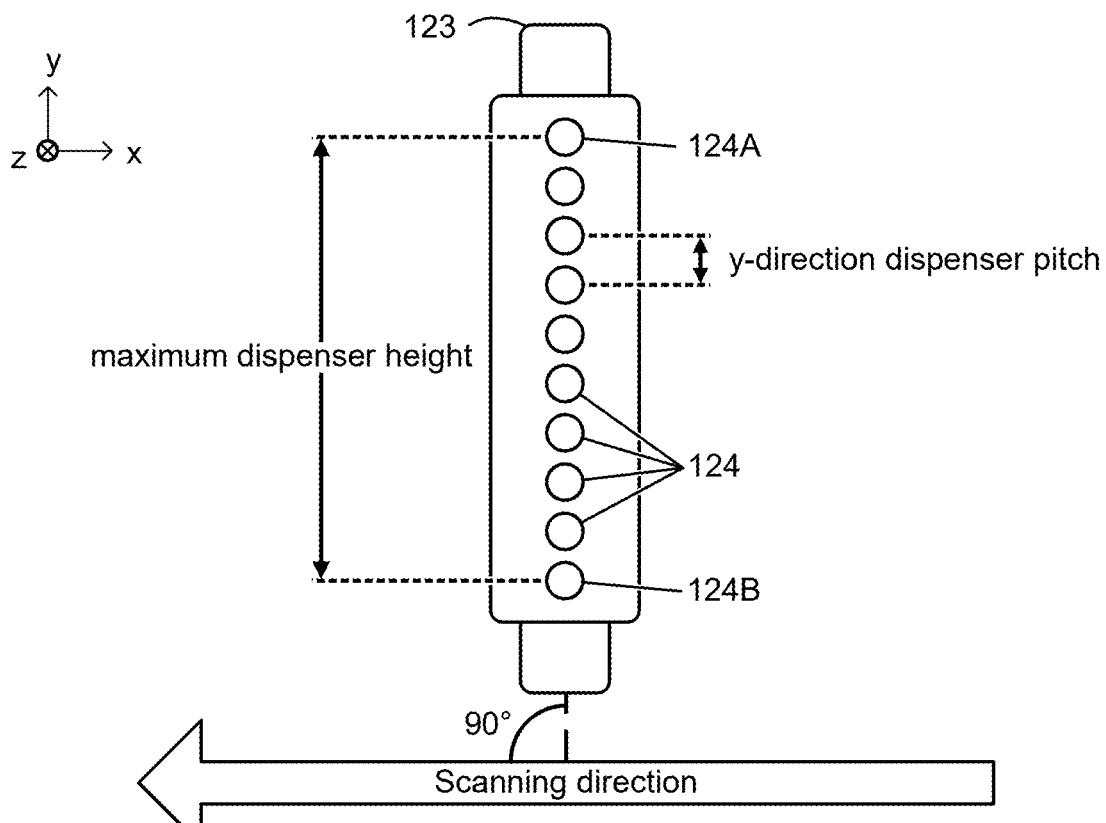
FIG. 4A illustrates an example embodiment of a fluid-dispense head and fluid-dispense ports.

FIG. 4A illustrates an example embodiment of a fluid-dispense head 123. The fluid-dispense head 123 includes fluid-dispense ports 124. The fluid-dispense ports 124 may have a fixed configuration such that the fluid-dispense head 123 and fluid-dispense ports move as a unit and do not move independently of each other. Thus, the fluid-dispense ports 124 may be fixed relative to one another on the fluid-dispense head 123.

The dispense ports 124 include a first end dispense port 124A and a second end dispense port 124B. And the distance between the first end dispense port 124A and the second end dispense port 124B is the maximum dispenser height.

The number of fluid-dispense ports 124 can vary between embodiments. For example, some embodiments have at least two fluid-dispense ports 124, at least three fluid-dispense ports 124, at least four fluid-dispense ports 124, at least five fluid-dispense ports 124, at least ten fluid-dispense ports 124, at least twenty fluid-dispense ports 124, or over a hundred fluid-dispense ports 124. In some embodiments, the fluid-dispense ports 124 include a set of at least three fluid-dispense ports 124 that lie along a line. In some embodiments, the fluid-dispense head 123 includes hundreds of fluid-dispense ports 124 that lie along multiple parallel lines.

Additionally, the dispenser pitch may be fixed in either or both of the x direction and the y direction, and some embodiments of the imprint system 100 have a dispenser pitch that is not fixed in either of the x direction and the y direction. As used herein, the term "pitch" is a distance from the center of a feature to the center of an adjacent feature. Accordingly, a dispenser pitch is a distance from the center of a location where an imprint system 100 can dispense a drop of formable material 9 to the center of an adjacent location where the imprint system 100 can dispense a drop of formable material 9. In Cartesian coordinates, a two-dimensional pattern (a pattern as seen from a top view) can have a pitch in the x direction that corresponds to the distance between the centers of the features as measured in the x direction and can have a pitch in the y direction that corresponds to the distance between the centers of the features as measured in the y direction.

In some embodiments of the imprint system 100, a y-direction dispenser pitch is fixed by a distance between centers of adjacent fluid-dispense ports 124, and therefore, the y-direction dispenser pitch is determined by the physical layout of the fluid-dispense ports 124 in the fluid-dispense head 123.

The x-direction dispenser pitch may be the same as or different from the y-direction dispenser pitch. Also, the x-direction dispenser pitch may be based on the physical layout of the fluid-dispense ports 124 in the fluid-dispense head 123, on the physical capabilities of other members of the imprint system 100, or on software that controls the imprint system 100. For example, in some embodiments, the x-direction dispenser pitch can be adjusted by controlling the relative velocity between the substrate 102 and the fluid-dispense ports 124 during dispensing when the fluid-drop-dispense rate (e.g., dispensings per millisecond) from the fluid-dispense ports 124 is known. As the relative velocity between the substrate 102 and the fluid-dispense ports 124 increases, the x-direction dispenser pitch increases, and as the relative velocity between the substrate 102 and the fluid-dispense ports 124 decreases, the x-direction dispenser pitch decreases, assuming that the fluid-drop-dispense rate remains constant.

Figure 4B:
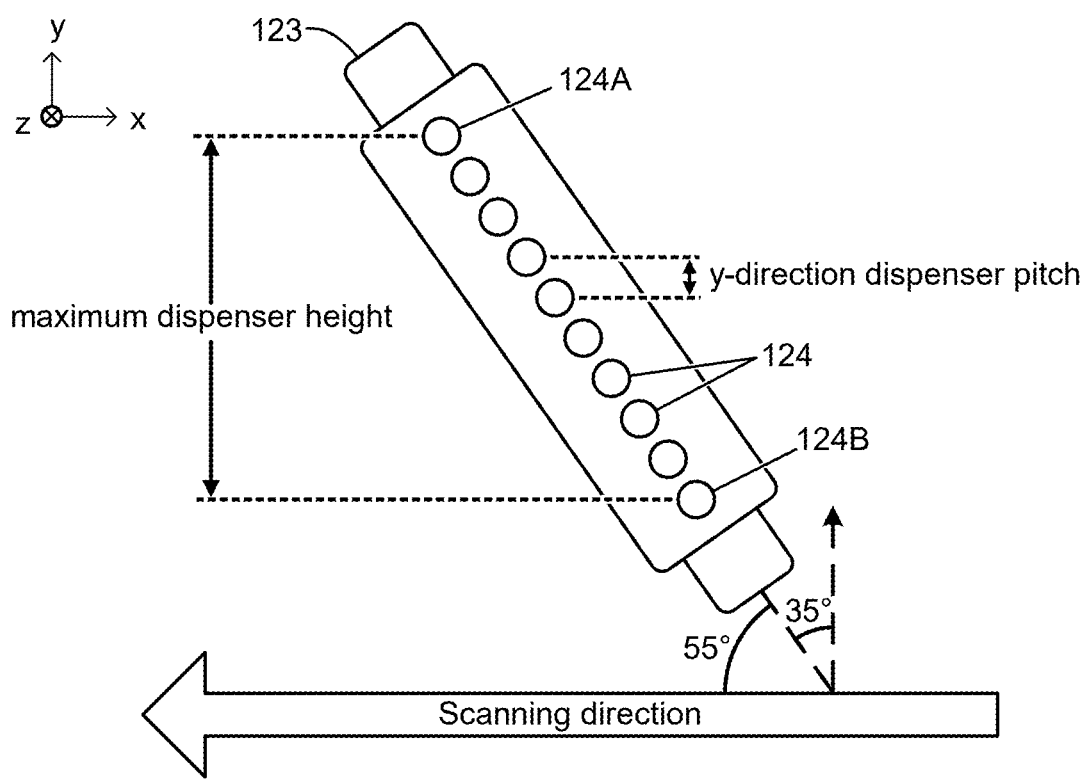
FIG. 4B illustrates an example embodiment of a fluid-dispense head that has been rotated to change the y-direction dispenser pitch.

Because in some embodiments the y-direction dispenser pitch is dependent on the spacing and organization of the fluid-dispense ports 124, adjusting the y-direction dispenser pitch can be more challenging than adjusting the x-direction dispenser pitch. In some embodiments, the fluid-dispense head 123 and the fluid-dispense ports 124 can be rotated while the fluid-dispense ports 124 remain in the fixed position relative to one another to achieve a variety of different y-direction dispenser pitches. For example, FIG. 4B illustrates an example embodiment of a fluid-dispense head that has been rotated to change the y-direction dispenser pitch. Although the fluid-dispense head 123 in FIG. 4B has the same scanning direction as the fluid-dispense head 123 in FIG. 4A, the fluid-dispense head 123 in FIG. 4B has been rotated counter clockwise by 35° relative to the fluid-dispense head 123 in FIG. 4A. Accordingly, longitudinal axis of the fluid-dispense head 123 in FIG. 4A is rotated 90° relative to the scanning pattern, and the longitudinal axis of the fluid-dispense head 123 in FIG. 4B is rotated 55° relative to the scanning pattern. Thus, along the scanning direction, the fluid-dispense head 123 in FIG. 4B has a smaller y-direction dispenser pitch and a smaller maximum dispenser height.

Figure 5:
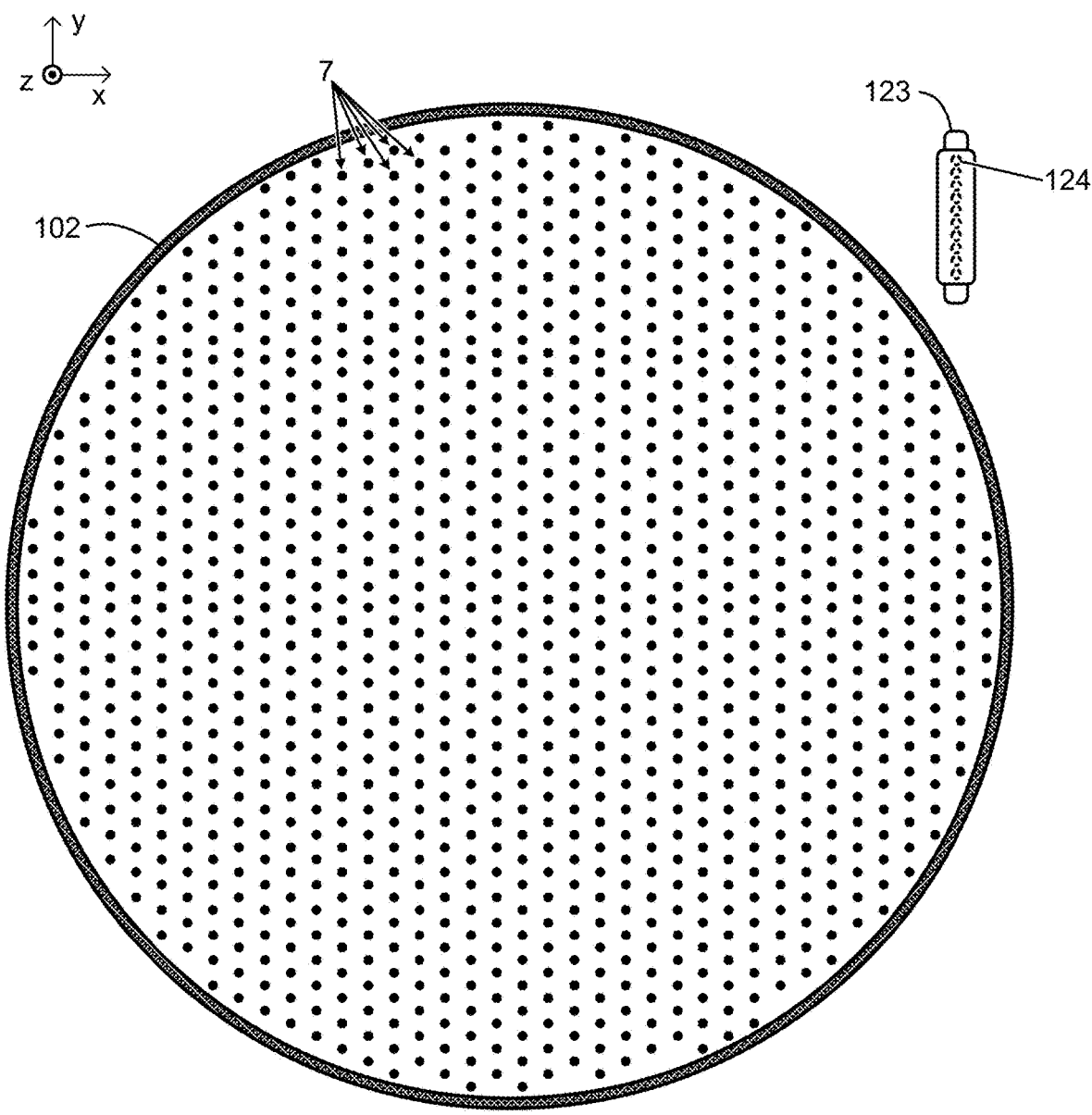
FIG. 5 illustrates an example embodiment of drop locations on a substrate.

FIG. 5 illustrates an example embodiment of drop locations on a substrate. The drop locations 7 are the locations where a drop pattern indicates that respective drops are to be placed. When an imprint system dispenses drops of formable material 9 on the substrate 102 according to the drop pattern, the imprint system dispenses the drops in the drop locations 7.

However, the fluid-dispense head 123 is too small to dispense a drop of fluid in each drop location 7 in one pass. A pass may include one scan of the fluid-dispense head 123 relative to the substrate 102. Also, a pass may include a forward scan of the fluid-dispense head 123 relative to the substrate 102 and a backward scan of the fluid-dispense head 123 relative to the substrate 102 that is offset from the forward scan by approximately a half of the y-direction dispenser pitch (e.g., half of a y-direction distance between fluid-dispense ports). To place a drop of fluid in each drop location 7, the imprint system scans the fluid-dispense head 123 over the substrate 102 (by moving one or both of the fluid-dispense head 123 and the substrate 102) according to a scanning pattern.

Figure 6A:
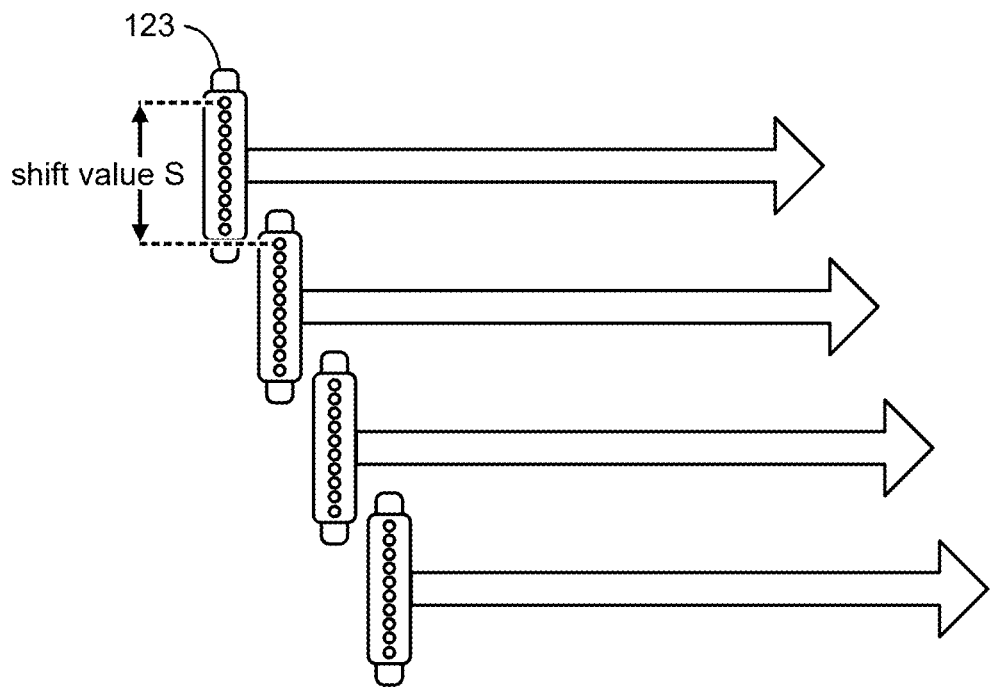
FIGS. 6A and 6B illustrate example embodiments of scanning patterns.
Figure 6B:
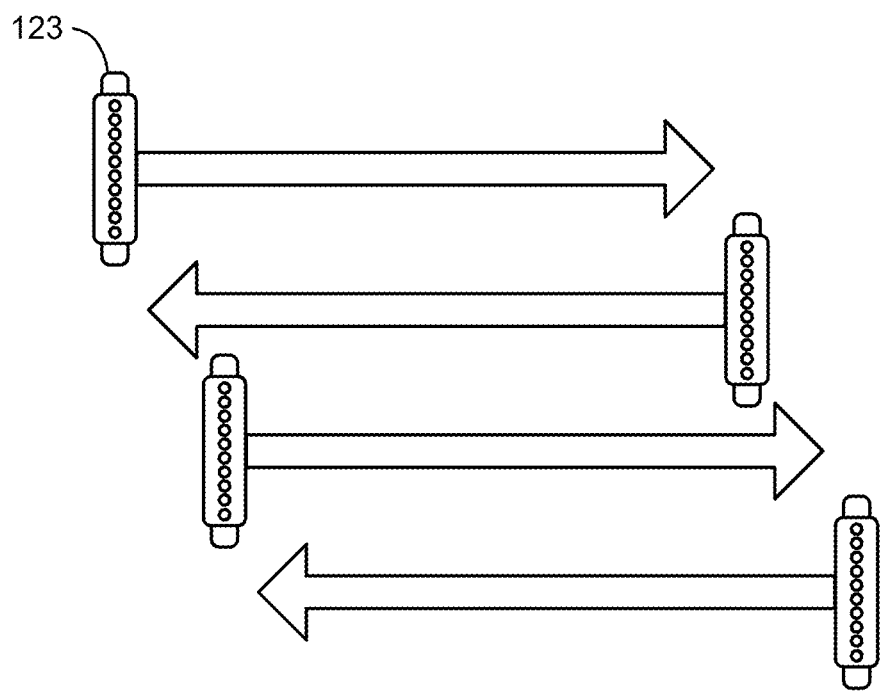

FIGS. 6A and 6B illustrate example embodiments of scanning patterns. In FIGS. 6A and 6B, the fluid dispenser includes only one fluid-dispense head 123. In FIG. 6A, the scanning pattern includes multiple passes of the fluid-dispense head 123 that are in the same direction (left to right in FIG. 6A). In each pass, the fluid-dispense head 123 is shifted (offset) from the previous pass by shift value S (offset value S). If all the fluid-dispense ports 124 are functioning properly, then the shift value S may be the maximum shift value. For example, the maximum shift value may be equal to the following: maximum dispenser height+y-direction dispenser pitch.

However, because of wear, use, and environmental conditions, some of the fluid-dispense ports 124 may not function with the accuracy or precision required to satisfy the tolerances required by a drop pattern or imprint process. Fluid-dispense ports 124 that do dispense drops of fluid with the accuracy or precision required to satisfy the tolerances required by a drop pattern or imprint process are referred to herein as "effective." Fluid-dispense ports 124 that do not dispense drops of fluid with the accuracy or precision required to satisfy the tolerances required by a drop pattern or imprint process are referred to herein as "less-effective." A less-effective fluid-dispense port 124 may be able to dispense drops of fluid, but not with the accuracy or precision required to satisfy the tolerances required by a drop pattern or imprint process.

Figure 7:
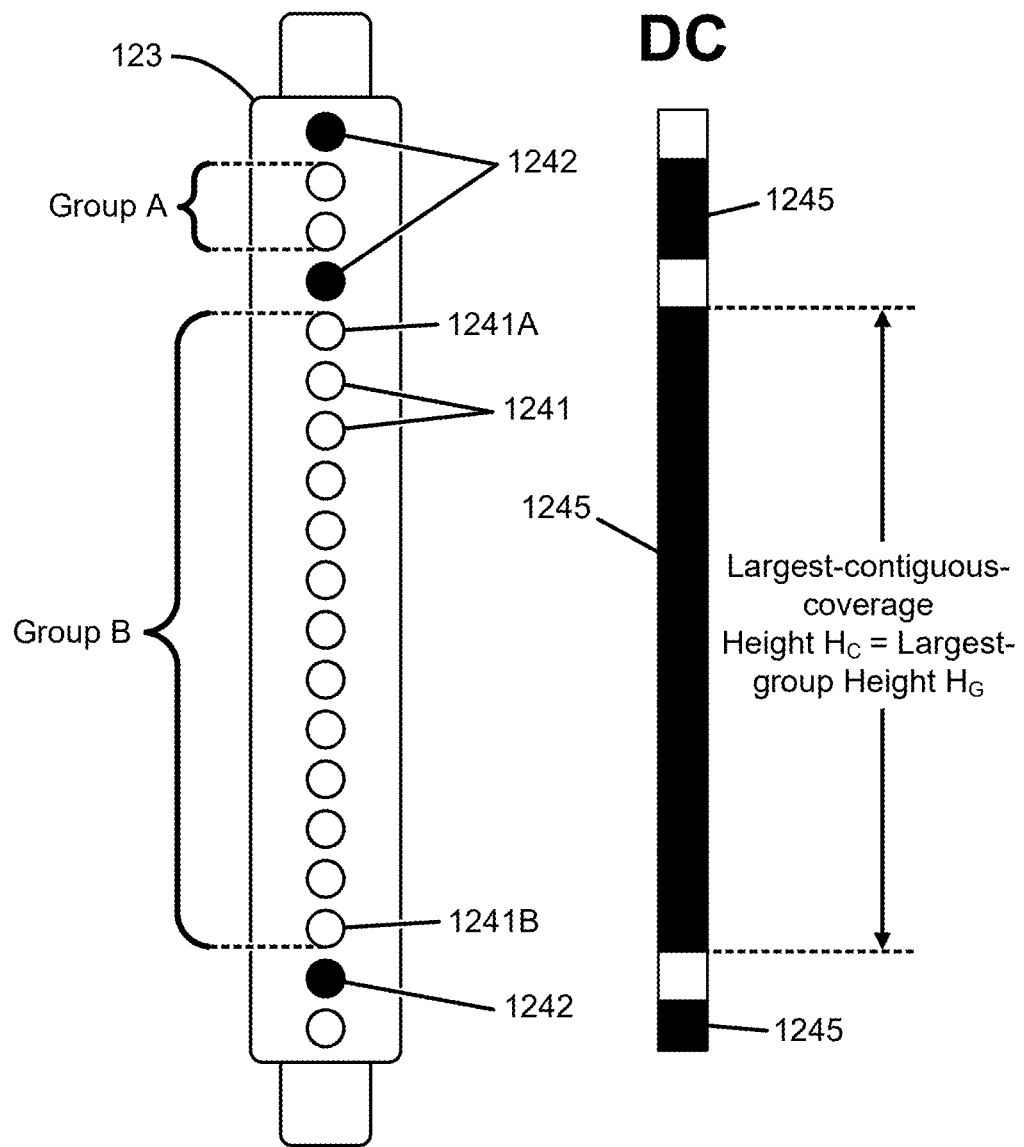
FIG. 7 illustrates an example embodiment of a fluid-dispense head that includes less-effective fluid-dispense ports.

For example, FIG. 7 illustrates an example embodiment of a fluid-dispense head that includes less-effective fluid-dispense ports. In FIG. 7, the effective fluid-dispense ports 1241 of the fluid-dispense head 123 are not filled, and the less-effective fluid-dispense ports 1242 are completely filled.

If one or more of the fluid-dispense ports 124 are less-effective, then the shift value S between passes of the fluid-dispense head 123 will be less than the maximum offset because the fluid-dispense head 123 cannot accurately or precisely deposit drops in any drop location that is in the range of a less-effective fluid-dispense port 1242. Thus, covering the drop locations that are in the range of a less-effective fluid-dispense port 1242 requires a pass of the fluid-dispense head 123 that partially overlap with at least one other pass of the fluid-dispense head 123.

An imprint system may use only the largest group of contiguous effective fluid-dispense ports 1241 to deposit drops of fluid. The effective fluid-dispense ports 1241 that are farthest apart in a group of contiguous effective fluid-dispense ports 1241 (the "edge fluid-dispense ports") are not separated from each other by any less-effective fluid-dispense port 1242. For example, the fluid-dispense head 123 in FIG. 7 includes two groups of contiguous effective fluid-dispense ports 1241, Group A and Group B, which is the largest. And a first effective fluid-dispense port 1241A and a second effective fluid-dispense port 1241B are the two edge fluid-dispense ports in Group B, and are thus the effective fluid-dispense ports 1241 that are farthest apart in Group B (are the effective fluid-dispense ports 1241 in Group B that have the greatest distance between them). The first effective fluid-dispense port 1241A and the second effective fluid-dispense port 1241B are not separated from each other by any less-effective fluid-dispense port 1242.

An imprint system that uses only the largest group of contiguous effective fluid-dispense ports 1241 to deposit drops of fluid would thus use only the effective fluid-dispense ports 1241 in Group B to dispense drops of fluid.

The dispenser coverage DC of the fluid-dispense head 123 is also illustrated in FIG. 7. The areas of the dispenser coverage DC that are filled indicate the coverage ranges, which are the ranges that are covered by effective fluid-dispense ports 1241. A coverage range encompasses only drop locations where at least one of the effective fluid-dispense ports 1241 will be able to deposit a drop during a pass, and thus at least one of the effective fluid-dispense ports 1241 can eject fluid in each drop location encompassed by a coverage range. The areas of the dispenser coverage DC that are not filled are the ranges that are covered by less-effective fluid-dispense ports 1242, not the effective fluid-dispense ports 1241 (i.e., the effective fluid-dispense ports 1241 cannot dispense drops of fluid in these ranges), and these areas are not included in any coverage range. The dispenser coverage DC in FIG. 7 includes three coverage ranges 1245. For one pass of the fluid-dispense head 123, the height of the largest group of contiguous effective fluid-dispense ports 1241 (largest-group height $H_G$), which is the height of Group B, is equal to the largest coverage range 1245, which may be referred to herein as the largest-contiguous-coverage height $H_G$.

Figure 8:
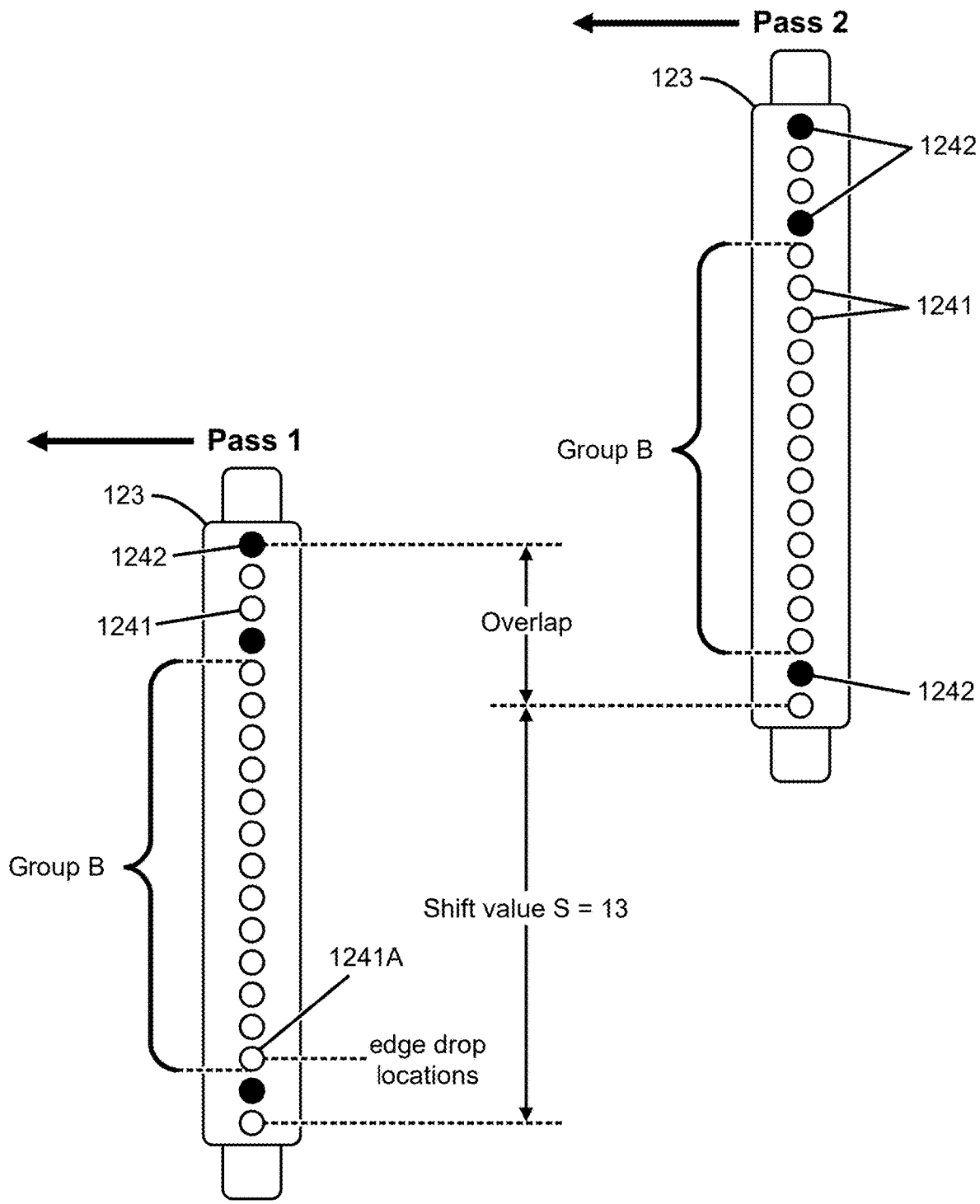
FIG. 8 illustrates an example of a shift and an example of an overlap between two passes of the fluid-dispense head in FIG. 7.

FIG. 8 illustrates an example of a shift and an example of an overlap between two passes of the fluid-dispense head 123 in FIG. 7. The two passes use only the largest group of contiguous effective fluid-dispense ports 1241 to deposit drops of fluid. The second effective fluid-dispense port 1241B may be aligned with the lower edge drop locations in a drop pattern (the edge drop locations are the drop locations that are closest to an edge of the drop pattern).

Because only the largest group of contiguous effective fluid-dispense ports 1241 is used to deposit drops of fluid, the shift value S between Pass 1 and Pass 2 is less than the maximum shift value, and Pass 2 overlaps Pass 1. Also, the number of passes required to deposit the entire drop pattern can be described by the following:

$$N_C = \text{ceiling}\left(\frac{T}{H_G}\right), \qquad (1)$$

where $N_C$ is the number of passes required to deposit the entire drop pattern if only the largest group of contiguous effective fluid-dispense ports 1241 is used, where T is the height of the drop pattern (drop-pattern height T), and where $H_G$ is the height of the largest group of contiguous effective fluid-dispense ports 1241 (largest-group height $H_G$). The drop-pattern height T, the shift value S, the maximum offset, and the largest-group height $H_G$ can be defined in various units of measurement, such as units of fluid-dispense ports 124, units of the y-direction dispenser pitch, metric units (e.g., millimeters), and English units. Although other units of measurement may be used, the following description describes the various heights in units of fluid-dispense ports 124, which are also equal to units of the y-direction dispenser pitch. And, as measured in units of fluid-dispense ports 124, in FIGS. 7 and 8 the largest-group height $H_G$ is 13 fluid-dispense ports 124.

However, the imprint systems can determine whether there are shift values S between passes that enable the imprint systems to deposit the entire drop pattern in fewer passes than $N_C$.

Figure 9:
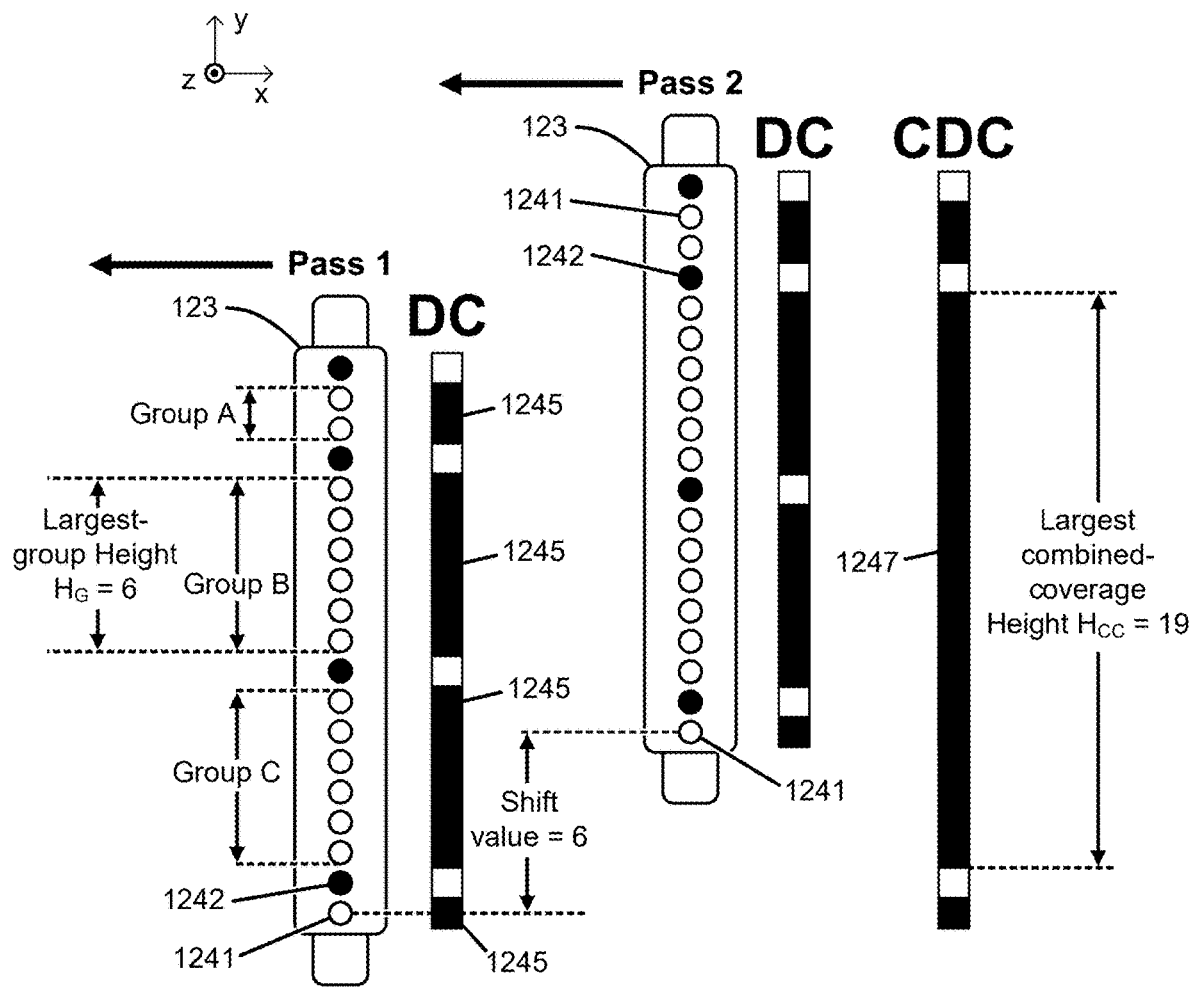
FIG. 9 illustrates an example of two passes of a fluid-dispense head, their respective dispenser coverages, and their combined dispenser coverage.

For example, FIG. 9 illustrates an example of two passes of a fluid-dispense head, their respective dispenser coverages, and their combined dispenser coverage. The fluid-dispense head includes three groups of contiguous effective fluid-dispense ports 1241: Group A, Group B, and Group C. The largest-group height $H_G$ is 6, which is the height of both Group B and Group C. And, for one pass of the fluid-dispense head 123, the largest-contiguous-coverage height $H_C$ in the dispenser coverage DC is 6.

However, if the fluid-dispense head 123 performs two passes, Pass 1 and Pass 2, and Pass 2 is shifted by 6 relative to Pass 1, then the largest combined coverage range 1247 (which is also the largest-combined-coverage height H cc) is 19. Thus, the largest-combined-coverage height $H_{CC}$ is the largest combined coverage range 1247 of a pass combination that includes Pass 1 and Pass 2, and the largest-combined-coverage height $H_{CC}$ in this example is 19.

As used herein, a pass combination includes two or more passes, and at least one of the passes is shifted relative to the other pass or passes. For example, a pass combination may include Pass 1 and Pass 2 in FIG. 9, or a pass combination may include the two passes (Pass 1 and Pass 2) that are shown in FIG. 10.

Also, although the shifts in FIG. 9 and the other drawings are shown as shifts in the +y direction, the shifts may also be in the −y direction.

For a drop-pattern height T of 100, the fluid-dispense head 123 would need to perform 17 passes to deposit the drops if only the largest group of contiguous effective fluid-dispense ports 1241 (either Group B or Group C) was used. However, using passes of a pass combination that includes Pass 1 and Pass 2, which has a largest-combined-coverage height $H_{CC}$ of 19, the fluid-dispense head 123 would need to perform 11 total passes to deposit the drops. In terms of passes of the pass combination, the fluid-dispense head 123 would need to perform 6 passes of the pass combination or, alternatively, 5 passes of the pass combination, plus one solo pass (a pass that is not part of a pass combination).

Figure 10:
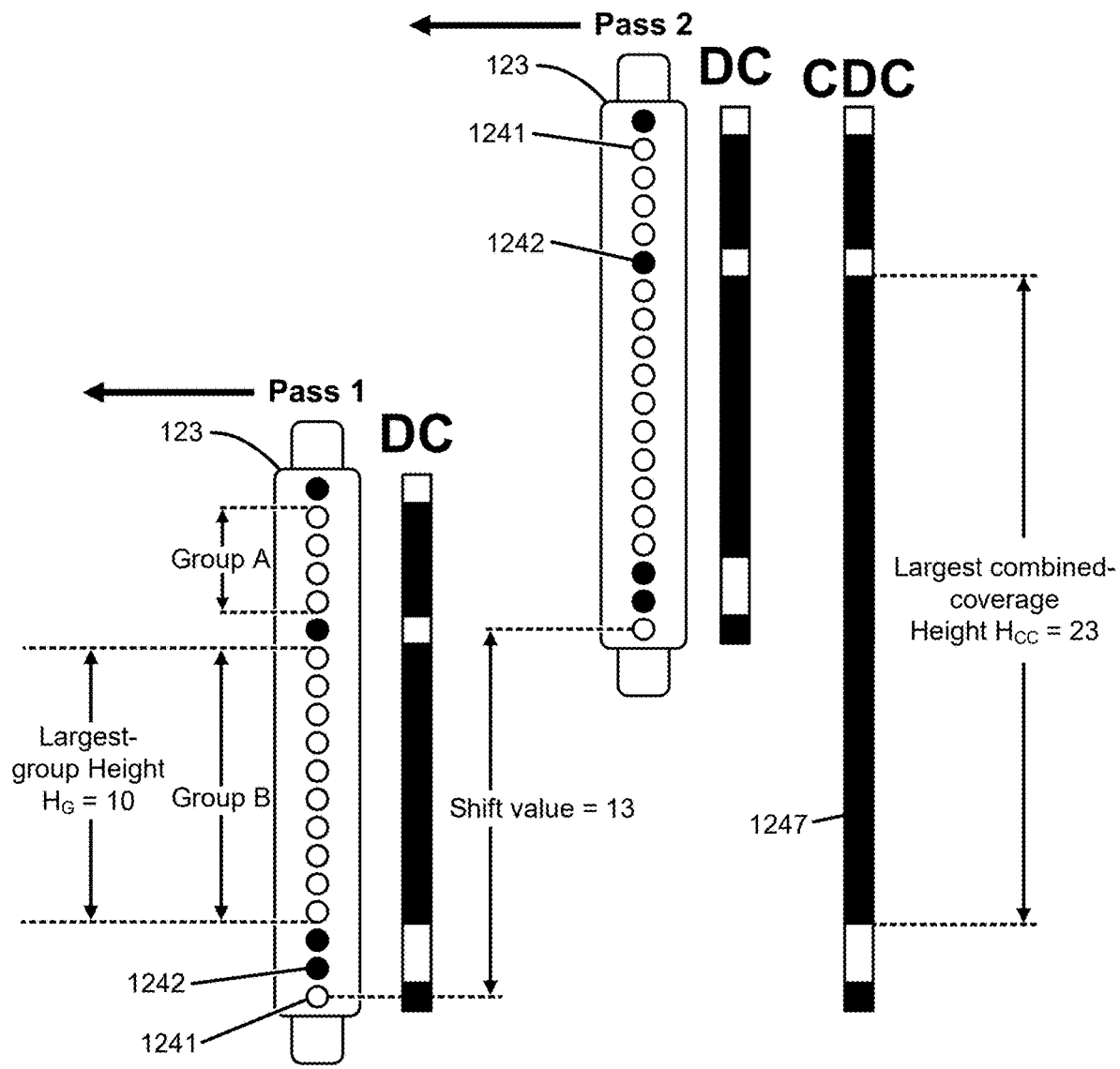
FIG. 10 illustrates an example of two passes of a fluid-dispense head, their respective dispenser coverages, and their combined dispenser coverage.

Also for example, FIG. 10 illustrates an example of two passes of a fluid-dispense head, their respective dispenser coverages, and their combined dispenser coverage. The fluid-dispense head includes two groups of contiguous effective fluid-dispense ports 1241: Group A, and Group B. The largest-group height $H_G$ is 10, which is the height of Group B. And, for one pass of the fluid-dispense head 123, the largest-contiguous-coverage height $H_C$ in the dispenser coverage DC is 10.

But, if the fluid-dispense head 123 performs a pass combination that includes two passes (Pass 1 and Pass 2), the second of which is shifted by 13 relative to the first pass, then the height of the largest-combined-coverage height $H_{CC}$ 1247 is 23.

Thus, for a drop-pattern height T of 100, the fluid-dispense head 123 would need to perform 10 passes to deposit the drops if only the largest group of contiguous effective fluid-dispense ports 1241 (Group B) was used. However, using passes of a pass combination that includes Pass 1 and Pass 2, which has a largest-combined-coverage height $H_{CC}$ of 23, the fluid-dispense head 123 would need to perform 9 total passes to deposit the drops. In terms of passes of the pass combination, the fluid-dispense head 123 would need to perform 5 passes of the pass combination or, alternatively, 4 passes of the pass combination, plus one solo pass.

Figure 11:
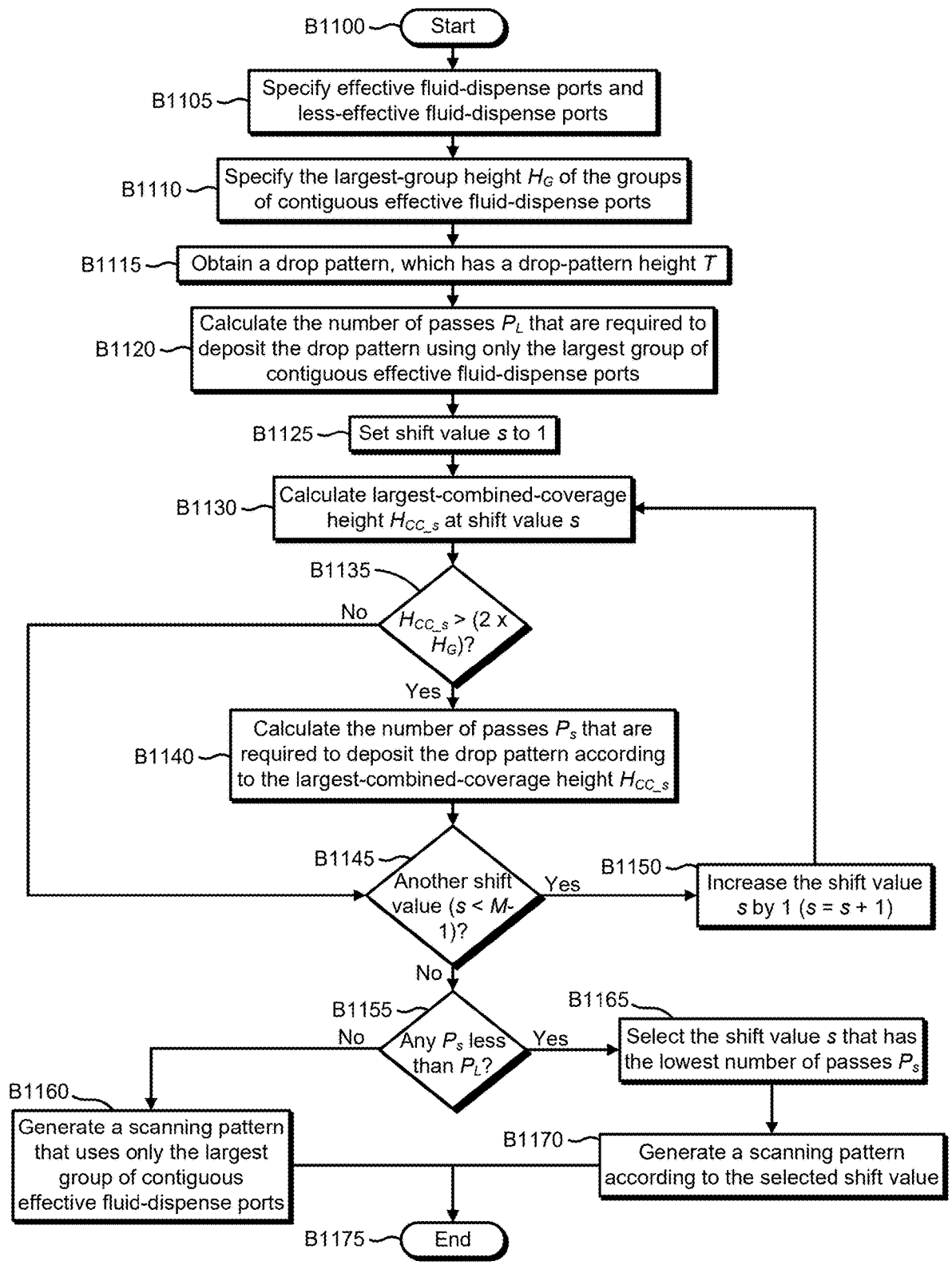
FIG. 11 illustrates an example embodiment of an operational flow for generating a scanning pattern.

FIG. 11 illustrates an example embodiment of an operational flow for generating a scanning pattern. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by a control device 140, some embodiments of these operational flows are performed by two or more control devices 140 or by one or more specially-configured computing devices (e.g., servers, laptops, desktop computers).

The flow starts in block B1100 and then moves to block B1105, where a control device specifies effective fluid-dispense ports and less-effective fluid-dispense ports of a fluid dispenser. A single fluid-dispense head may include all of the fluid-dispense ports, or, alternatively, the fluid-dispense ports may be distributed among multiple fluid-dispense heads. For example, the fluid dispenser may include 1-10 fluid-dispense heads. Specifying the effective fluid-dispense ports and the less-effective fluid-dispense ports may include generating or receiving an effectiveness array that includes a respective effectiveness identifier (for example a binary identifier) for each fluid-dispense port that specifies whether the fluid-dispense port is an effective fluid-dispense port or, alternatively, a less-effective fluid-dispense port. The effectiveness array may be ordered according to the arrangement of the fluid-dispense ports. The effectiveness array may include a port identifier that specifies the location of the fluid-dispense port in the fluid dispenser.

Next, in block B1110, the control device specifies the largest-group height $H_G$ of the groups of contiguous effective fluid-dispense ports. In some embodiments, multiple fluid-dispense heads are arranged in the fluid dispenser to have groups of contiguous effective fluid-dispense ports that include effective fluid-dispense ports from different fluid-dispense heads. In some embodiments, the fluid dispenser includes multiple fluid-dispense heads that are arranged such that they are physically displaced from one another. In such embodiments, the drop-pattern height T is divided into drop-pattern sections among the physically separated multiple fluid-dispense heads. For each shift s, the coverage range is equal to the minimum of the drop-pattern sections associated with the different physically separated multiple dispense heads.

Then, in block B1115, the control device obtains a drop pattern, which has a drop-pattern height T as measured in fluid-dispense ports. The control device may calculate the drop-pattern height T, for example according to the following:

$$T = \frac{DH}{T_{pitch}}, \quad (2)$$

where DH is the height of the drop pattern, and where $T_{pitch}$ is the fluid-dispense pitch.

The flow then proceeds to block B1120, where the control device calculates the number of passes $P_L$ that are required to deposit the drop pattern using only the largest group of contiguous effective fluid-dispense ports. For example, the calculation of the number of passes $P_L$ that are required to deposit the drop pattern using only the largest group of contiguous effective fluid-dispense ports can be described by the following:

$$P_L = \text{ceiling}\left(\frac{T}{H_G}\right), \quad (3)$$

where T is the drop-pattern height, and where $H_G$ is the height of the largest group of contiguous effective fluid-dispense ports.

Next, in block B1125, the control device sets shift value s to 1. In this description, the shift value s is described in terms of fluid-dispense ports, although the shift value s can also be described in terms of other units of measurement (e.g., millimeters).

And, in block B1130, the control device calculates the largest-combined-coverage height $H_{CC\_s}$ of a pass combination that uses shift value s. The largest-combined-coverage height $H_{CC\_s}$ may be calculated by, for example, first forming an enlarged effectiveness array by performing a binary OR operation on an effectiveness array and a copy of the effectiveness array that has been shifted by shift value s (e.g., by s elements, such as by s fluid-dispense ports or s y-direction dispenser pitches). The second step may include counting contiguous fluid-dispense ports in the enlarged effectiveness array until the largest number (e.g., group) of contiguous fluid-dispense ports is identified. It may be possible to skip the first step and use a virtual enlarged effectiveness array. Other methods may be used for counting the number of fluid-dispense ports in the largest-combined-coverage height $H_{CC\_s}$.

The flow then moves to block B1135, where the control device determines whether the largest-combined-coverage height $H_{CC\_s}$ (largest-combined-coverage range) at shift value s is greater than twice the largest-group height $H_G$ (whether $H_{CC\_s} > 2 \times H_G$). If the largest-combined-coverage height $H_{CC\_s}$ at shift value s is not greater than twice the largest-group height $H_G$ (B1135=No), then the flow moves to block B1145. If the largest-combined-coverage height $H_{CC\_s}$ at shift value s is greater than twice the largest-group height $H_G$ (B1135=Yes), then the flow moves to block B1140. Furthermore, in some embodiments, if the largest-combined-coverage height $H_{CC\_s}$ at shift value s is equal to the largest-group height $H_G$, then the flow moves to block B1140.

In block B1140, the control device calculates the number of passes $P_s$ that are required to deposit the drop pattern according to the largest-combined-coverage height $H_{CC\_s}$. For example, the calculation of the number of passes $P_s$ may be described by the following:

$$P_s = \text{ceiling}\left(\frac{T}{H_{CC\_s}}\right), \quad (4)$$

where T is the drop-pattern height. The flow then proceeds to block B1145.

In block B1145, the control device determines whether to perform blocks B1130-B1140 for another shift value. For example, the control device may determine whether the shift value s<M−1, where M is the number of fluid-dispense ports. If the control device determines to perform blocks B1130-B1140 for another shift value (B1145=Yes), then the flow moves to block B1150. In block B1150, the control device increases the shift value s by 1 (s=s+1), and then the flow returns to block B1130. If the control device determines not to perform blocks B1130-B1140 for another shift value (B1145=No), then the flow proceeds to block B1155.

In block B1155, the control device determines whether there is a shift value s for which the number of passes $P_s$ is less than the number of passes $P_L$ that are required to deposit the drop pattern using only the largest group of contiguous effective fluid-dispense ports (whether $P_s < P_L$ for any s∈ {1, 2, ..., M−1}).

If there is no shift value s∈{1, 2, ..., M−1} for which the number of passes $P_s$ is less than the number of passes $P_L$ that are required to deposit the drop pattern using only the largest group of contiguous effective fluid-dispense ports (B1155=No), then the flow advances to block B1160. In block B1160, the control device generates a scanning pattern that deposits the drops in the drop pattern using only the largest group of contiguous effective fluid-dispense ports. Thus, the largest group of contiguous effective fluid-dispense ports is selected and used as a basis of a scanning pattern. Also, the control device may control a fluid dispenser, as well as an imprint system that includes a fluid dispenser, to deposit drops on a substrate according to the scanning pattern. Then the flow ends in block B1175.

If there is at least one shift value s∈{1, 2, ..., M−1} for which the number of passes $P_s$ is less than the number of passes $P_L$ that are required to deposit the drop pattern using only the largest group of contiguous effective fluid-dispense ports (B1155=Yes), then the flow proceeds to block B1165. In block B1165, the control device selects the shift value s∈{1, 2, ..., M−1} that has the lowest number of passes $P_s$. If multiple shift values are tied for the lowest number of passes, then the control device may select a shift value from among these shift values based on one or more criteria (e.g., by performing the operational flow in FIG. 17).

Then, in block B1170, the control device generates a scanning pattern that deposits the drops in the drop pattern according to the selected shift value and the pass combination that corresponds to the selected shift value. Thus, the shift value and the corresponding pass combination are selected and used as a basis of a scanning pattern. For example, in this embodiment, because the pass combination includes only one shift value, the scanning pattern includes passes of a pass combination that includes two passes, one of which is shifted by the selected shift value relative to the other. Furthermore, the control device may control a fluid dispenser, as well as an imprint system that includes a fluid dispenser, to deposit drops on a substrate according to the scanning pattern. Then the flow ends in block B1175.

Figure 12:
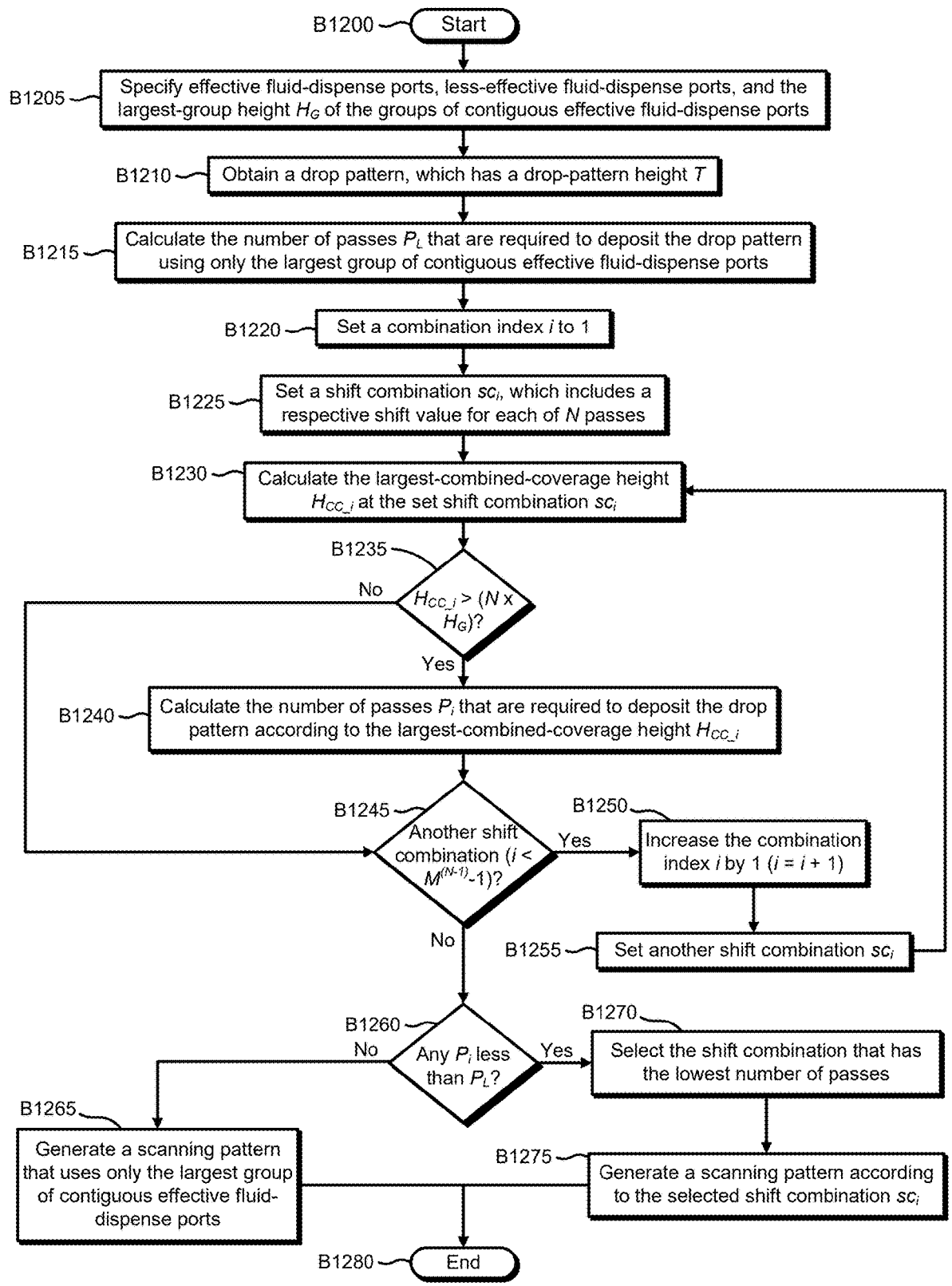
FIG. 12 illustrates an example embodiment of an operational flow for generating a scanning pattern.

FIG. 12 illustrates an example embodiment of an operational flow for generating a scanning pattern. The flow starts in block B1200 and then moves to block B1205, where a control device specifies effective fluid-dispense ports, less-effective fluid-dispense ports, and the largest-group height $H_G$ of the groups of contiguous effective fluid-dispense ports. A single fluid-dispense head may include all of the fluid-dispense ports, or, alternatively, the fluid-dispense ports may be distributed among multiple fluid-dispense heads. Next, in block B1210, the control device obtains a drop pattern, which has a drop-pattern height T as measured in fluid-dispense ports.

The flow then proceeds to block B1215, where the control device calculates the number of passes $P_L$ that are required to deposit the drop pattern using only the largest group of contiguous effective fluid-dispense ports.

Then, in block B1220, the control device sets a combination index i to 1. The flow then moves to block B1225, where the control device sets a shift combination $sc_i$, which includes N−1 shifts for a corresponding pass combination that includes N passes of a fluid dispenser, which may include one or more fluid-dispense heads (where N is an integer that is 2 or greater). Each shift value indicates the shift of a respective pass that is not the first pass (the first pass is assumed to have a shift value of 0 in this example). For example, if N=5, then the control device sets 4 shift values for a pass combination that includes 5 passes. Also for example, every shift value may be set to 0. Or the shift value of each pass may increase by 1 relative to the previous shift value. For example, if N=6, then the initial shift values may be 1, 2, 3, 4, 5, where all of the shift values are relative to the first pass or to the same coordinate system (if each shift value is relative to the previous pass, then these initial shift values would be 1, 1, 1, 1, 1).

And, in block B1230, the control device calculates the largest-combined-coverage height $H_{CC\_i}$ of the pass combination that includes the set shift combination $sc_i$. The largest-combined-coverage height $H_{CC\_i}$ may be calculated by, for example, first forming an enlarged effectiveness array by performing a binary OR operation on N copies of an effectiveness array that are shifted according to shift combination $sc_i$. Thus, copies of the effectiveness array have the same relative arrangement as the passes. Second, the contiguous fluid-dispense ports in the enlarged effectiveness array are counted until the largest number (e.g., group) of contiguous fluid-dispense ports is identified. As noted above, it may be possible to skip the binary OR operation and use a virtual enlarged effectiveness array. And other methods may be used for calculating the largest-combined-coverage height $H_{CC\_i}$.

Figure 13:
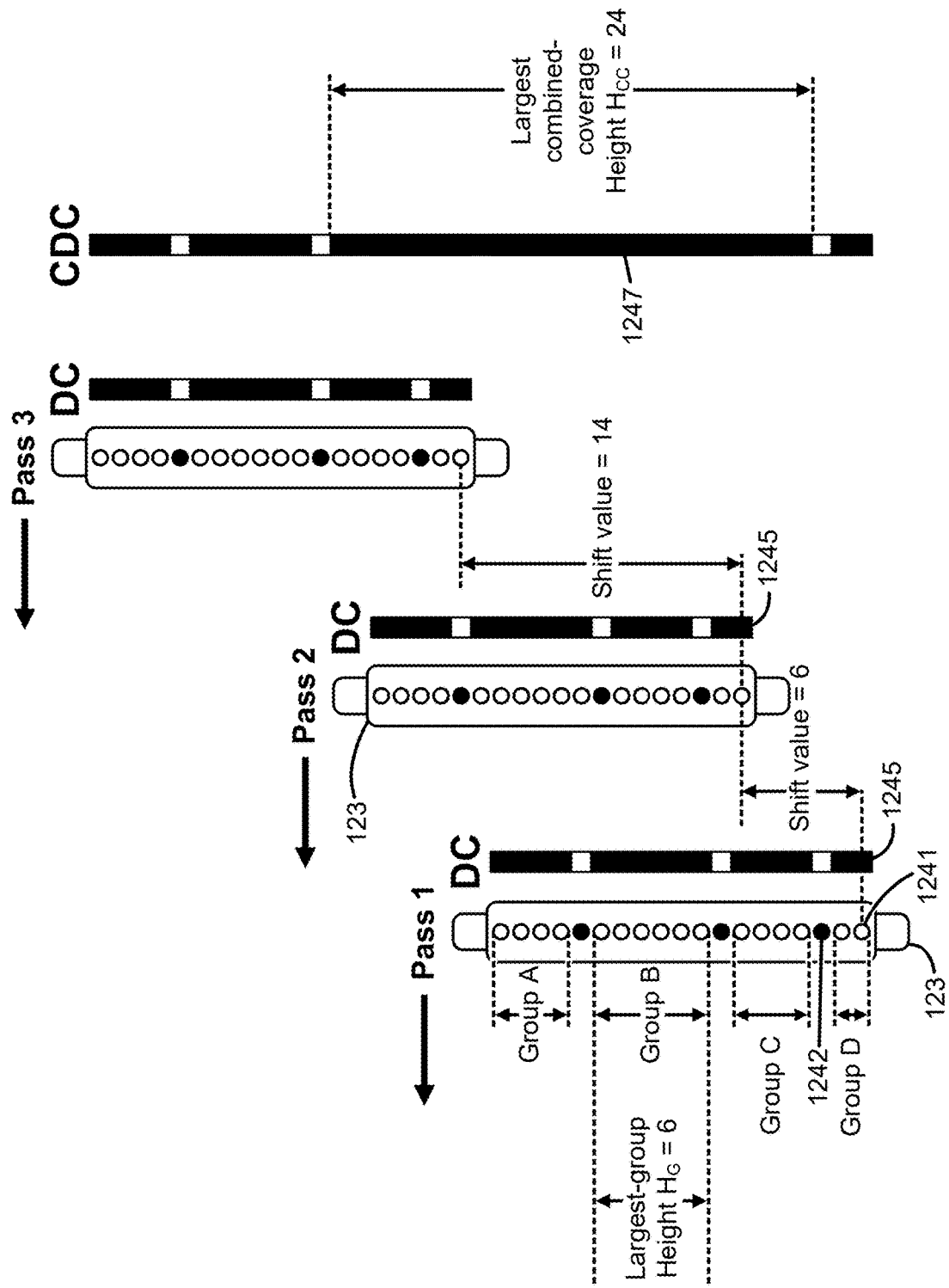
FIG. 13 illustrates an example of three passes of a fluid-dispense head, their respective dispenser coverages, and their combined dispenser coverage.

For example, FIG. 13 illustrates an example of three passes of a fluid dispenser that includes only one fluid-dispense head, the respective dispenser coverages (DC) of the passes, and their combined dispenser coverage (CDC). In this example, the shift value of Pass 1 is 0, the shift value of Pass 2 is 6, and the shift value of Pass 3 is 20 (when the shift values are measured relative to the first pass). And the largest-combined-coverage height $H_{CC\_i}$ of a pass combination that includes passes that are shifted according to the set shift combination $sc_i$ is 24.

The flow then moves to block B1235, where the control device determines whether the largest-combined-coverage height $H_{CC\_i}$ (largest-combined-coverage range) of the pass combination that includes the set shift combination $sc_i$ is greater than N (the number of passes) multiplied by the largest-group height $H_G$ (whether $H_{CC\_i} > N \times H_G$). If the largest-combined-coverage height $H_{CC\_i}$ of the pass combination that includes the set shift combination $sc_i$ is not greater than N multiplied by the largest-group height $H_G$ (B1235=No), then the flow moves to block B1245. If the largest-combined-coverage height $H_{CC\_i}$ of the pass combination that includes the set shift combination $s_{ci}$ is greater than N multiplied by the largest-group height $H_G$ (B1235=Yes), then the flow moves to block B1240. Furthermore, in some embodiments, if the largest-combined-coverage height $H_{CC\_i}$ of the pass combination that includes the set shift combination $sc_i$ is equal to N multiplied by the largest-group height $H_G$, then the flow moves to block B1240.

In block B1240, the control device calculates the number of passes $P_i$ that are required to deposit the drop pattern according to the largest-combined-coverage height $H_{CC\_i}$.

Next, in block B1245, the control device determines whether to perform blocks B1230-B1240 for another shift combination. For example, the control device may determine whether the shift index $i < M^{N-1} - 1$, where M is the number of fluid-dispense ports, and where N is the number of passes. If the control device determines to perform blocks B1230-B1240 for another shift combination (B1245=Yes), then the flow moves to block B1250. In block B1250, the control device increases the shift combination index i by 1 (i=i+1). Then, in block B1255, the control device sets another shift combination $sc_i$, which is a shift combination that has not been previously set. For example, the control device may sequentially traverse the set of every possible shift combination. After block B1255, the flow returns to block 1230.

If the control device determines not to perform blocks B1230-B1240 for another shift combination (B1245=No), then the flow proceeds to block B1260.

In block B1260, the control device determines whether there is a shift combination $sc_i$ for which the number of passes $P_i$ is less than the number of passes $P_L$ that are required to deposit the drop pattern using only the largest group of contiguous effective fluid-dispense ports (whether $P_i < P_L$ for any $i \in \{1, 2, \ldots, I\}$, where I is the total number of shift combinations).

If there is no shift combination $sc_i$ for which $P_i$ is less than $P_L$ (B1260=No), then the flow advances to block B1265. In block B1265, the control device generates a scanning pattern that deposits the drops in the drop pattern using only the largest group of contiguous effective fluid-dispense ports. Thus, the largest group of contiguous effective fluid-dispense ports is selected and used as a basis of a scanning pattern. Also, the control device may control a fluid dispenser, as well as an imprint system that includes the fluid dispenser, to deposit drops on a substrate according to the scanning pattern. Then the flow ends in block B1280.

If there is at least one shift combination $sc_i$ for which $P_i$ is less than $P_L$ (B1260=Yes), then the flow proceeds to block B1270. In block B1270, the control device selects a shift combination that has the lowest number of passes. If multiple shift combinations are tied for the lowest number of passes, then the control device may select a shift combination from among these shift combinations based on one or more criteria (e.g., by performing the operational flow in FIG. 17).

Then, in block B1275, the control device generates a scanning pattern that deposits the drops in the drop pattern according to the selected shift combination. Thus, the scanning pattern includes sets of passes that are offset according to the selected shift combination. Also, the shift combination and the corresponding pass combination are selected and used as a basis of a scanning pattern. And the scanning pattern includes passes of a pass combination that includes multiple passes that are shifted according to the selected shift combination.

Furthermore, the control device may control a fluid dispenser, as well as an imprint system that includes the fluid dispenser, to deposit drops on a substrate according to the scanning pattern. Then the flow ends in block B1280.

Also, in block B1270, the control device may determine whether the selected shift combination has a periodic cycle.

And the control device may select a pass combination that corresponds to one period of the cycle, and the control device may also shift the first pass of each pass combination relative to the last pass of the previous pass combination based on the periodic cycle. For example, for six passes of the fluid-dispense head in FIG. 13, the shift combination may include the following shifts (in order of the passes, where each shift value is measured relative to the previous pass): 0, 6, 14, 6, 14, 6. And the control device may select a pass combination that includes two passes, the second of which is shifted by 6 relative to the first. Also, relative to the last pass in one pass combination, the control device may shift the first pass of the following pass combination by 14.

Figure 14:
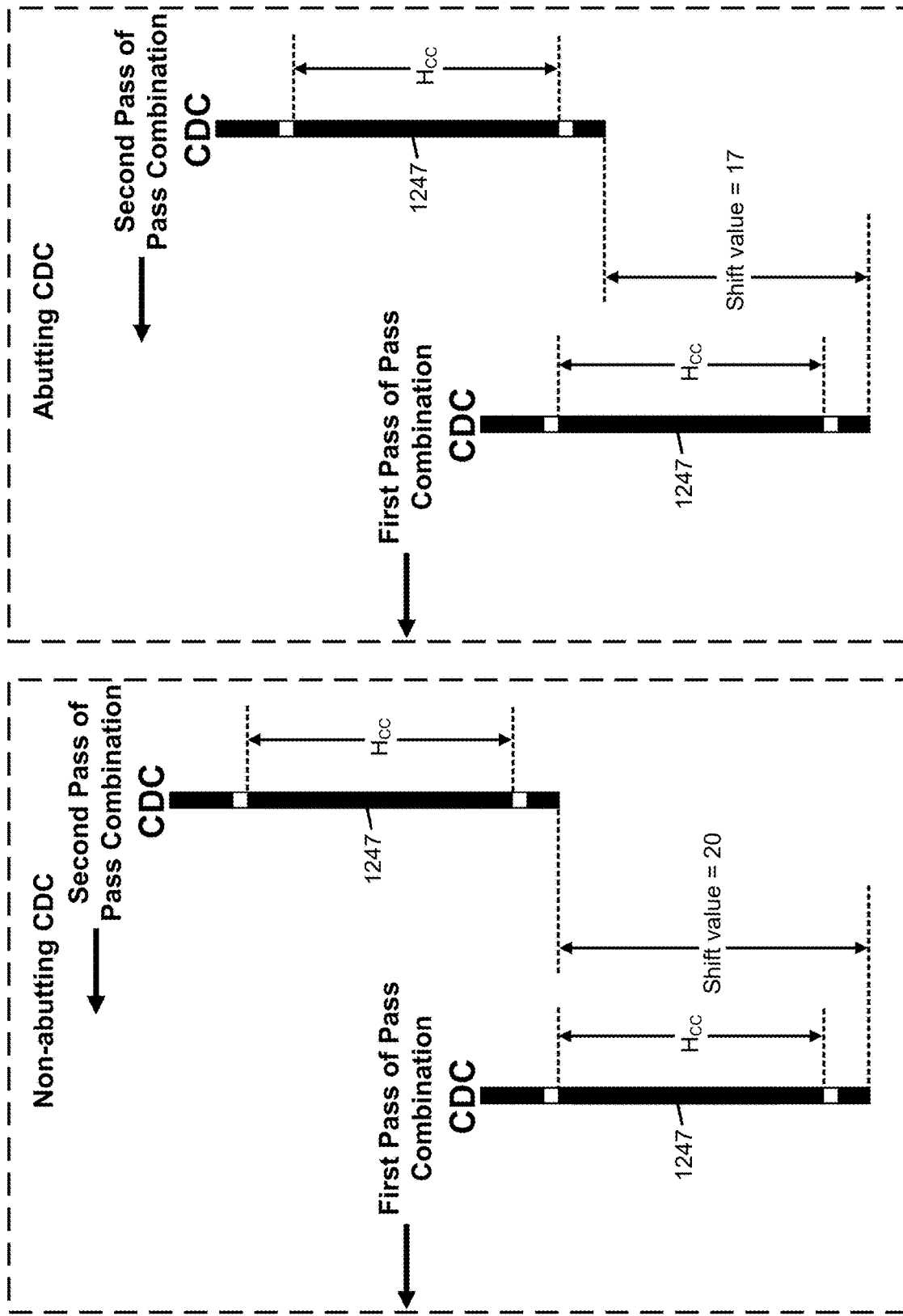
FIG. 14 illustrates examples of the combined drop coverage of a pass combination and examples of the shifts between passes of the pass combination.

For example, FIG. 14 illustrates examples of the combined drop coverage (CDC) of a pass combination and examples of the shifts between passes of the pass combination. The pass combination includes Pass 1 and Pass 2 from FIG. 13, and the largest-combined-coverage height $H_{CC}$ of the pass combination is 17. Thus, each pass combination includes a second pass that is shifted by a shift value of 6 relative to the first pass. In the non-abutting CDC, the region covered by the largest-combined-coverage height $H_{CC}$ in the first pass of the pass combination does not abut the region covered by the largest-combined-coverage height $H_{CC}$ in the second pass of the pass combination. In contrast, in the abutting CDC, the region covered by the largest-combined-coverage height $H_{CC}$ in the first pass of the pass combination does abut the region covered by the largest-combined-coverage height $H_{CC}$ in the second pass of the pass combination. In the non-abutting CDC, the second pass of the pass combination is shifted by a shift value of 20 relative to the first pass of the pass combination. In the abutting CDC, the second pass of the pass combination is shifted by a shift value of 17 (the largest-combined-coverage height $H_{CC}$) relative to the first pass of the pass combination. Consequently, the combination of the first and second passes of the pass combination in the non-abutting CDC has a drop coverage height that is 3 fluid-dispense ports higher than the drop coverage height of the combination of the first and second passes of the pass combination in the abutting CDC, and the combination of the first and second passes of the pass combination in the non-abutting CDC has a coverage range that is larger than the coverage range of the combination of the first and second passes of the pass combination in the abutting CDC.

Figure 15:
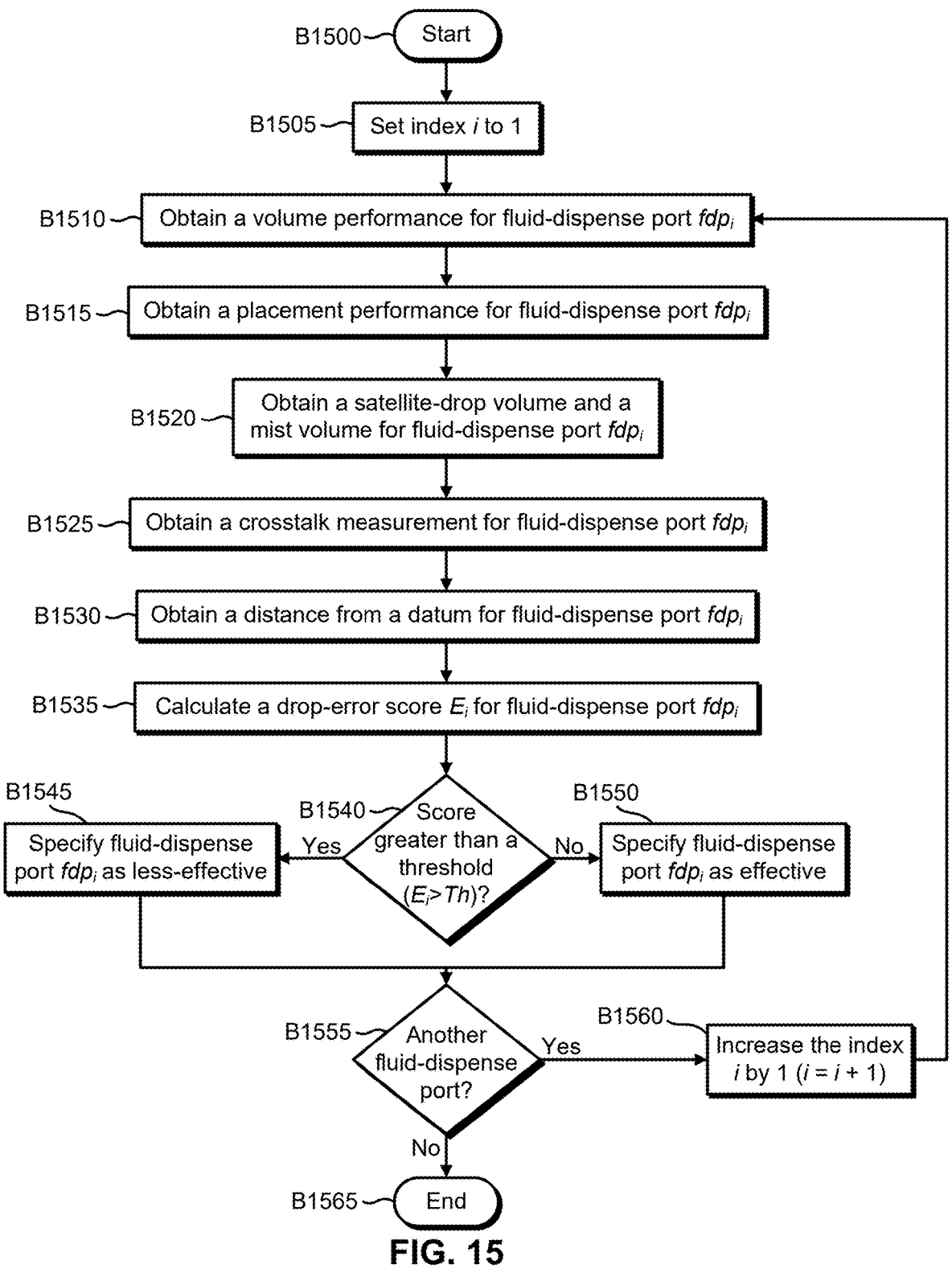
FIG. 15 illustrates an example embodiment of an operational flow for calculating drop-error scores for fluid-dispense ports and determining whether fluid-dispense ports are effective or less-effective.

FIG. 15 illustrates an example embodiment of an operational flow for calculating drop-error scores for fluid-dispense ports and determining whether fluid-dispense ports are effective or less-effective. The flow starts in block B1500 and then moves to block B1505, where a control device sets an index i to 1 (i=1).

Next, in block B1510, the control device obtains a volume performance (volume error) for fluid-dispense port $fdp_i$. The volume performance is generated through empirical measurements. And the volume performance indicates one or more of the following: a standard deviation of the volume dispensed from a particular fluid-dispense port relative to the average volume of the particular fluid-dispense port for a given target volume or local map density; a standard deviation of the volume dispensed from a particular fluid-dispense port relative to the average volume of all of the fluid-dispense ports for a given target volume or local map density; and a standard deviation of the volume dispensed from a particular fluid-dispense port relative to the given target volume or, in some embodiments, relative to the local map density.

The flow then proceeds to block B1515, where the control device obtains a placement performance (placement error) for fluid-dispense port $fdp_i$. The placement performance indicates the standard deviation, relative to a target placement, of the fluid-dispense port's droplet placement on a substrate in a scanning direction and a direction of a longitudinal axis of a fluid-dispense-head that is orthogonal to the scanning direction (e.g., indicates the standard deviation, relative to a target placement, of the fluid-dispense port's droplet placement on a substrate on the x and y axes in FIGS. 1-5).

Then, in block B1520, the control device obtains a satellite-drop volume and a mist volume for fluid-dispense port $fdp_i$. The satellite-drop volume indicates the combined volume of any satellite drops that are released with a primary drop. A satellite drop is sub-droplet that has separated from a main droplet after being ejected by a nozzle and can be associated with a specific nozzle. For a fluid-dispense port used for an imprint system, a satellite droplet will have a volume that is less than 20% and preferably less than 1% of the drop volume of the main droplet. And mist volume indicates the volume of mist released with a primary drop.

Figure 16:
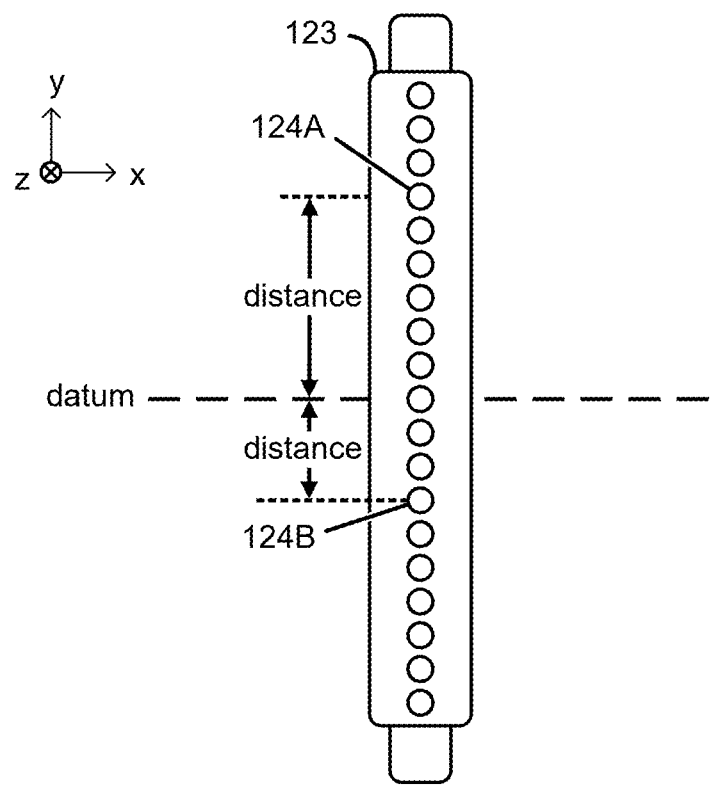
FIG. 16 illustrates an example embodiment of the distances from a datum of two fluid-dispense ports.

The flow then advances to block B1525, where the control device obtains a crosstalk measurement for fluid-dispense port $fdp_i$. Then, in block B1530, the control device obtains a distance from a datum for fluid-dispense port $fdp_i$. The datum may be located at the center of the fluid-dispense head. For example, FIG. 16 illustrates an example embodiment of the distances from a datum of two fluid-dispense ports. In FIG. 16, the datum is located at the center of the fluid-dispense head 123. And a first fluid-dispense port 124A is located farther from the datum than a second fluid-dispense port 124B. If the fluid-dispense head 123 is misaligned, for example by an angular deviation in the x-y plane, then the position bias of the fluid-dispense ports 124 may increase in proportion to the distance from the center of the fluid-dispense head. Thus, if the fluid-dispense head 123 has an angular deviation in the x-y plane, then the first fluid-dispense port 124A may have a larger positional bias than the second fluid-dispense port 124B.

Next, in block B1535, the control device calculates a drop-error score for fluid-dispense port $fdp_i$ based on the volume performance, the placement performance, the satellite-drop volume, the mist volume, the crosstalk measurement, and the distance from the datum. Also, some embodiments do not obtain one or more of the following: the volume performance, the placement performance, the satellite-drop volume, the mist volume, the crosstalk measurement, and the distance from the datum. For example, some embodiments obtain only the distance from the datum, and thus omit blocks B1510-B1525. And some embodiments obtain the volume performance and the placement performance but omit blocks B1520-B1530. And some embodiments obtain the volume performance, the placement performance, and the distance from the datum, but omit blocks B1525-B1530. The drop-error score may also be calculated based partially on information obtained from inspection of the fluid-dispense port $fdp_i$ or reported from a self-analysis that fluid-dispense port $fdp_i$ performs on itself.

For example, some embodiments of a drop-error score $E_i$ for fluid-dispense port $fdp_i$ that is calculated based on only placement performance and distance from the datum can be described by the following:

$$E_i = \alpha(Pl_i)^2 + \beta(Dist_i * k_{max})^2, \quad (5)$$

where $Pl_i$ is the placement performance of fluid-dispense port $fdp_i$, where $Dist_i$ is the distance from fluid-dispense port $fdp_i$ to the datum, where $k_{max}$ is the maximum angular deviation allowed for the fluid-dispense head to be within specifications (e.g., 200 μRad), and where α and β are weights (the weights may have any value including zero). And $Dist_i * k_{max}$ is the positional bias of fluid-dispense port $fdp_i$. Also, in some embodiments, the measured angular deviation of the fluid-dispense head is obtained in block B1530, and the measured angular deviation can be used instead of $k_{max}$. In some cases, the performances of the fluid-dispense ports are not measured, in which case the distance ($Dist_i$) from the datum (at the center of a fluid-dispense head) can be a rough approximation of the drop-error score $E_i$ for fluid-dispense port $fdp_i$. Also, some fluid-dispense ports may be completely non-functioning or can become non-functioning (clogged), in which case the drop-error score $E_i$ for such fluid-dispense ports is set to a value representing the poorest possible performance (for example above a threshold Th).

Furthermore, in these example embodiments, the drop-error score increases as the effectiveness of a fluid-dispense port decreases. Thus, a lower drop-error score $E_i$ indicates that fluid-dispense port $fdp_i$ is more effective. However, in some embodiments, a higher drop-error score $E_i$ indicates that fluid-dispense port $fdp_i$ is more effective.

Additionally, some embodiments of a drop-error score $E_i$ for fluid-dispense port $fdp_i$ that is calculated based on only volume performance, placement performance, and distance from the datum can be described by the following:

$$E_i = \alpha(V_i)^2 + \beta(Pl_i)^2 + \delta(Dist_i * k_{max})^2, \qquad (6)$$

where $V_i$ is the volume performance of fluid-dispense port $fdp_i$, where $Pl_i$ is the placement performance of fluid-dispense port $fdp_i$, where $Dist_i$ is the distance from fluid-dispense port $fdp_i$ to the datum, where $k_{max}$ is the maximum angular deviation allowed for the fluid-dispense head to be within specifications, and where a, B, and 8 are weights (the weights may have any value including zero). In some embodiments, the drop-error score Et for fluid-dispense port $fdp_i$ is calculated based on a weighted sum of functions of (for example the square of) one or more of the following: a volume performance; a placement performance; a satellite-drop volume; a mist volume; and a crosstalk measurement.

The drop-error scores may be indicative of non-fill errors and thickness variations of a residual layer thickness (RLT) for nanoimprint (NIL) and of a top layer thickness (TLT) for inkjet adaptive planarization (IAP) that are caused by the fluid-dispense ports.

The flow then proceeds to block B1540, where the control device determines whether the drop-error score $E_i$ for fluid-dispense port $fdp_i$ exceeds a threshold Th (whether $E_i > Th$). If the drop-error score $E_i$ for fluid-dispense port $fdp_i$ exceeds the threshold Th ($E_i > Th$) (B1540=Yes), then the flow moves to block B1545, where the control device specifies (e.g., labels, marks) fluid-dispense port $fdp_i$ as less effective. And the flow then proceeds to block B1555. If the drop-error score $E_i$ for fluid-dispense port $fdp_i$ does not exceed the threshold Th ($E_i \leq Th$) (B1540=No), then the flow moves to block B1550, where the control device specifies fluid-dispense port $fdp_i$ as effective. And the flow then advances to block B1555.

In block B1555, the control device determines whether to mark another fluid-dispense port as effective or, alterna-tively, less-effective. For example, the control device may determine whether to mark another fluid-dispense port as effective or, alternatively, less-effective if there is an unmarked fluid-dispense port or if blocks B1510-B1550 have not been performed for every fluid-dispense port. If the control device determines to mark another fluid-dispense port as effective or, alternatively, less-effective (B1555=Yes), then the flow moves to block B1560. In block B1560, the control device increases the index i by 1, and then the flow returns to block B1510.

If the control device determines not to mark another fluid-dispense port (B1555=No), for example because all of the fluid-dispense ports have been marked, then the flow ends in block B1565. In block B1565, the control device may generate an effectiveness array that includes a respective effectiveness identifier (e.g., a binary identifier) for each fluid-dispense port that specifies whether the fluid-dispense port is an effective fluid-dispense port or, alternatively, a less-effective fluid-dispense port. Also, an effectiveness array may include the respective drop-error score Et of each fluid-dispense port.

Also, in blocks B1510-B1530, the control device may obtain one or more of the volume performance, the placement performance, the satellite-drop volume, the mist volume, the crosstalk measurement, and the distance from a datum via user entry, via retrieval from a storage device, or via reception from another computing device (e.g., a server).

Figure 17:
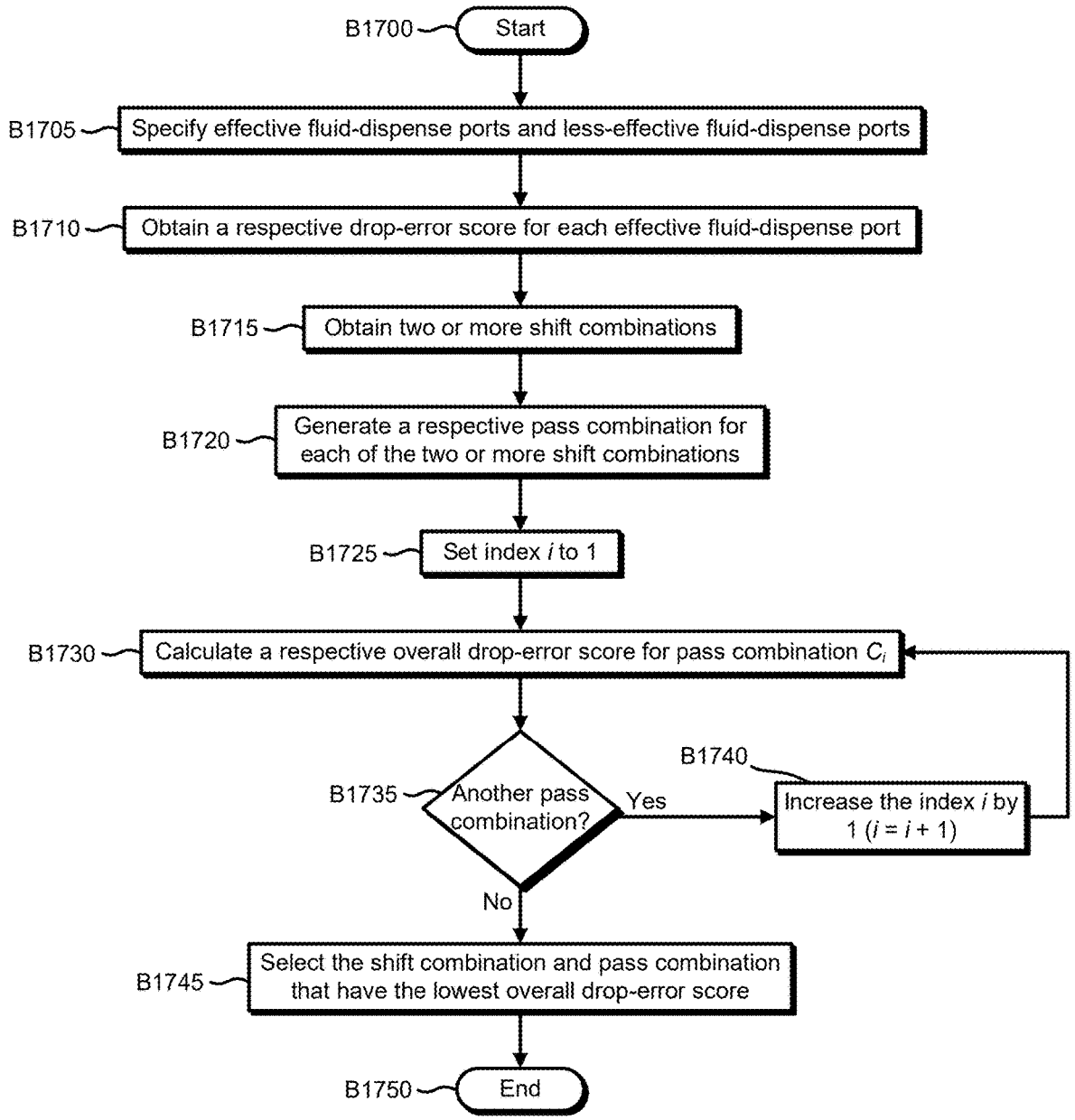
FIG. 17 illustrates an example embodiment of an operational flow for selecting a shift value or a shift combination.

FIG. 17 illustrates an example embodiment of an operational flow for selecting a shift combination.

The flow begins in block B1700. For example, the operational flow in FIG. 17 may be performed in block B1170 in FIG. 11 if multiple shift values are tied for the lowest number of passes or in block B1270 in FIG. 12 if multiple shift combinations are tied for the lowest number of passes. Also, the operational flow in FIG. 17 may be performed in block B1170 in FIG. 11 for some or all of the shift values (e.g., the shift values with respective numbers of passes that are in the lowest 50%) or in block B1270 in FIG. 12 for some or all of the shift combinations (e.g., the shift combinations with respective numbers of passes that are in the lowest 50%).

The flow then moves to block B1705, where a control device specifies effective fluid-dispense ports and less-effective fluid-dispense ports. For example, the control device may perform the operational flow in FIG. 16. Or the control device may receive information that specifies effective fluid-dispense ports and less-effective fluid-dispense ports from another computing device.

Then in block B1710, the control device obtains a respective drop-error score for each effective fluid-dispense port (and, in some embodiments, for each less-effective fluid-dispense port). If the control device already has the drop-error scores (e.g., because the control device performed the operational flow in FIG. 16), then block B1710 can be omitted.

Next, in block B1715, the control device obtains two or more shift combinations. As noted above, a shift combination includes N−1 shifts for a pass combination that includes N passes of a fluid dispenser (which includes one or more fluid-dispense heads), where N is an integer that is 2 or greater. And, in block B1720, the control device generates a respective pass combination for each of the obtained shift combinations. Also, in block B1715, the control device may obtain the shift combinations by obtaining pass combinations, which indicate their respective shift combinations. In such embodiments, block B1720 is omitted.

Then, in block B1725, the control device sets an index i to 1.

Next, in block B1730, the control device calculates a respective overall drop-error score for pass combination $C_i$. In this embodiment, the respective overall drop-error score for pass combination $C_i$ is based on the fluid-dispense-port subset $DP_{sub}$ that can deposit drops in the coverage range encompassed by the largest-combined-coverage height $H_{CC\_i}$ of pass combination $C_i$.

Figure 18:
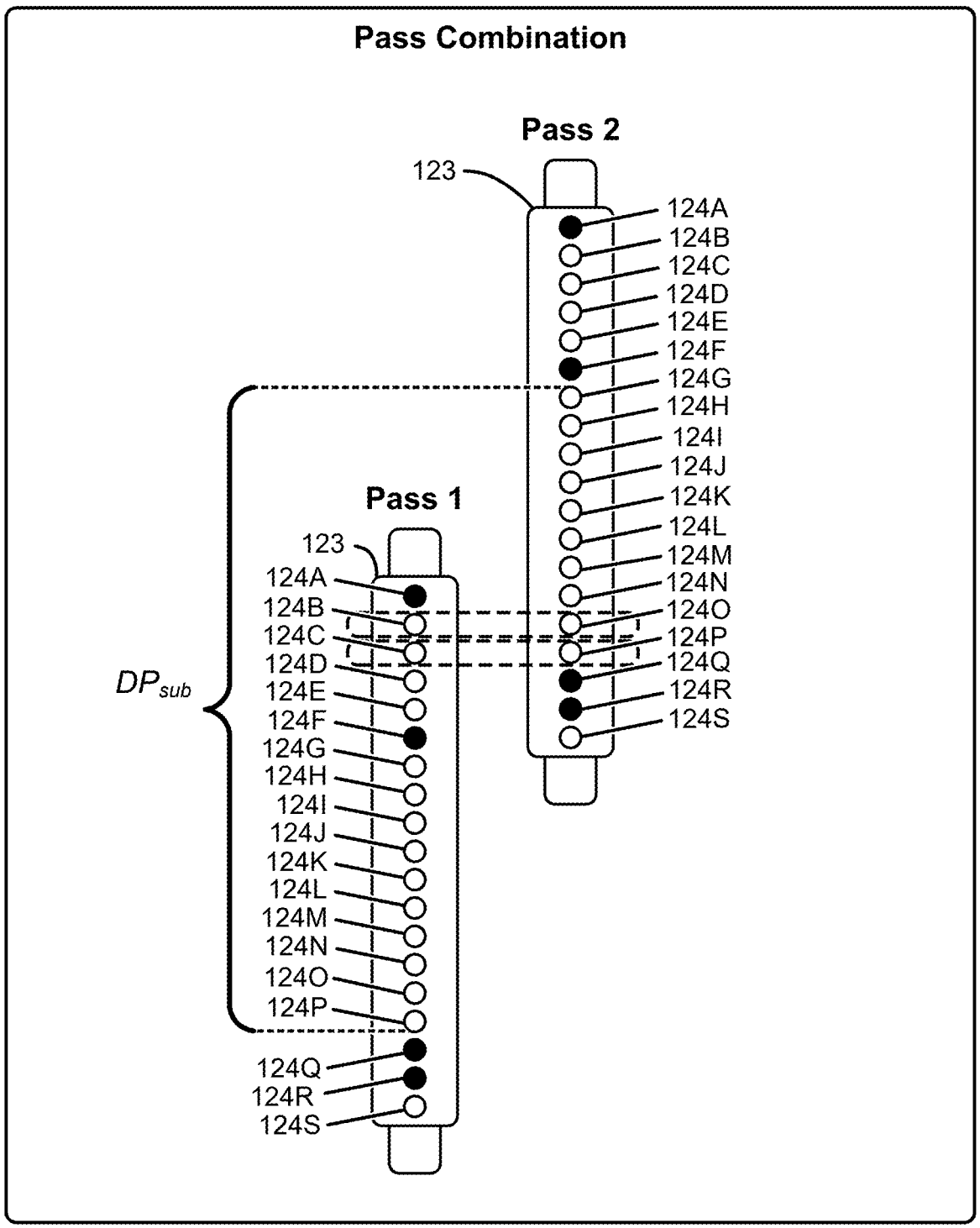
FIG. 18 illustrates an example embodiment of a fluid-dispense-port subset that can deposit drops in the range encompassed by the largest-combined-coverage height of a pass combination.

For example, FIG. 18 illustrates an example embodiment of a fluid-dispense-port subset $DP_{sub}$ that can deposit drops in the coverage range encompassed by the largest-combined-coverage height of a pass combination. The pass combination includes Pass 1 and Pass 2 from FIG. 10, and the largest-combined-coverage height $H_{CC}$ of the pass combination is 23.

Dispense-port subset $DP_{sub}$ includes fluid-dispense ports 124D-E and 124G-P in Pass 1 and fluid-dispense ports 124G-124N and 124S in Pass 2. Also, dispense-port subset $DP_{sub}$ includes either fluid-dispense port 124B in Pass 1 or, alternatively, fluid-dispense port 124O in Pass 2 and includes either fluid-dispense port 124C in Pass 1 or, alternatively, fluid-dispense port 124P in Pass 2. To determine which fluid-dispense port to use when more than one can be used, the control device may select the fluid-dispense port that has the lowest drop-error score. For example, if fluid-dispense port 124B has a drop-error score that is less than the drop-error score of fluid-dispense port 124O, then the control device may use fluid-dispense port 124B, but not fluid-dispense port 124O, in dispense-port subset $DP_{sub}$.

And, the respective overall drop-error score for dispense-port subset $DP_{sub}$ may be the sum of the drop-error scores of each fluid-dispense port in dispense-port subset $DP_{sub}$. For example, in some embodiments, the overall drop-error score ESO for fluid-dispense-port subset $DP_{sub}$ may be described by the following:

$$ESO = \sum_{j=1}^{J} E_j, \qquad (7)$$

where $E_j$ is the drop-error score of the j-th fluid-dispense port in the fluid-dispense-port subset, and where/is the number of fluid-dispense ports in the fluid-dispense-port subset.

Also, if a fluid-dispense port is used more than once in the pass combination, the drop-error score of the fluid-dispense port may have a greater contribution to the overall drop-error score. For example, in some embodiments, the overall drop-error score ESO for fluid-dispense-port subset $DP_{sub}$ may be described by the following:

$$ESO = \sum_{j=1}^{J} (E_j * u_j), \qquad (8)$$

where $E_j$ is the drop-error score of the j-th fluid-dispense port in the fluid-dispense-port subset, where $u_j$ is the number of uses of the j-th fluid-dispense port in the pass combination, and where J is the number of fluid-dispense ports in the fluid-dispense-port subset. For example, because fluid-dispense port 124H in FIG. 18 is used twice in the pass combination, the number of uses $u_j$ of fluid-dispense port 124H is two.

From block B1730, the flow moves to block B1735, where the control device determines whether to perform block B1730 for another pass combination. For example, the control device may determine to perform block B1730 for another pass combination if block B1730 has not been performed for every pass combination or shift combination. If the control device determines to perform block B1730 for another pass combination (B1735=Yes), then the flow proceeds to block B1740, where the control device increases the index i by 1, and then the flow returns to block B1730. If the control device determines not to perform block B1730 for another pass combination (B1735=No), then the flow advances to block B1745.

In block B1745, the control device selects the shift combination and corresponding pass combination that have the lowest overall drop-error score. And the flow ends in block B1750. Thus, when multiple shift combinations and their corresponding pass combinations can be used to generate the scanning pattern, the control device can use the scanning pattern that, overall, uses the most effective fluid-dispense ports.

Additionally, if there is a tie for fewest passes between one or more pass combinations or between a pass combination and passes that use only the largest group of contiguous effective fluid-dispense ports, then the control device may also calculate the overall drop-error score of the fluid-dispense ports that are included in the largest group of contiguous effective fluid-dispense ports. And then the control device can select the largest group of contiguous effective fluid-dispense ports if the largest group of contiguous effective fluid-dispense ports has an overall drop-error score that is lower, per pass, than the overall drop-error scores of the pass combinations. However, if a pass combination has a respective overall drop-error score that, per pass, is less than the overall drop-error score of the largest group of contiguous effective fluid-dispense ports, then the control device can select the pass combination with the lower overall drop-error score. For example, if a pass combination includes two passes and the pass combination is tied for fewest passes with the largest group of contiguous effective fluid-dispense ports, then the control device may select the pass combination if the overall drop-error score of the pass combination is less than two multiplied by the overall drop-error score of the largest group of contiguous effective fluid-dispense ports.

Also, if in block B1165 in FIG. 11 the control device has multiple shift values (i.e., shift combinations that include only 1 shift value) that are tied for the lowest number of passes, then the control device can perform blocks B1720-B1745 to specify and select the shift value that corresponds to the pass combination that has the lowest overall drop-error score, and then generate the scanning pattern based on the pass combination that corresponds to the selected shift value. Similarly, if in block B1270 in FIG. 12 the control device has multiple shift combinations that are tied for the lowest number of passes, the control device can perform blocks B1720-B1745 to specify and select the shift combination that corresponds to the pass combination that has the lowest overall drop-error score, and then generate the scanning pattern based on the pass combination that corresponds to the selected shift combination.

Figure 19:
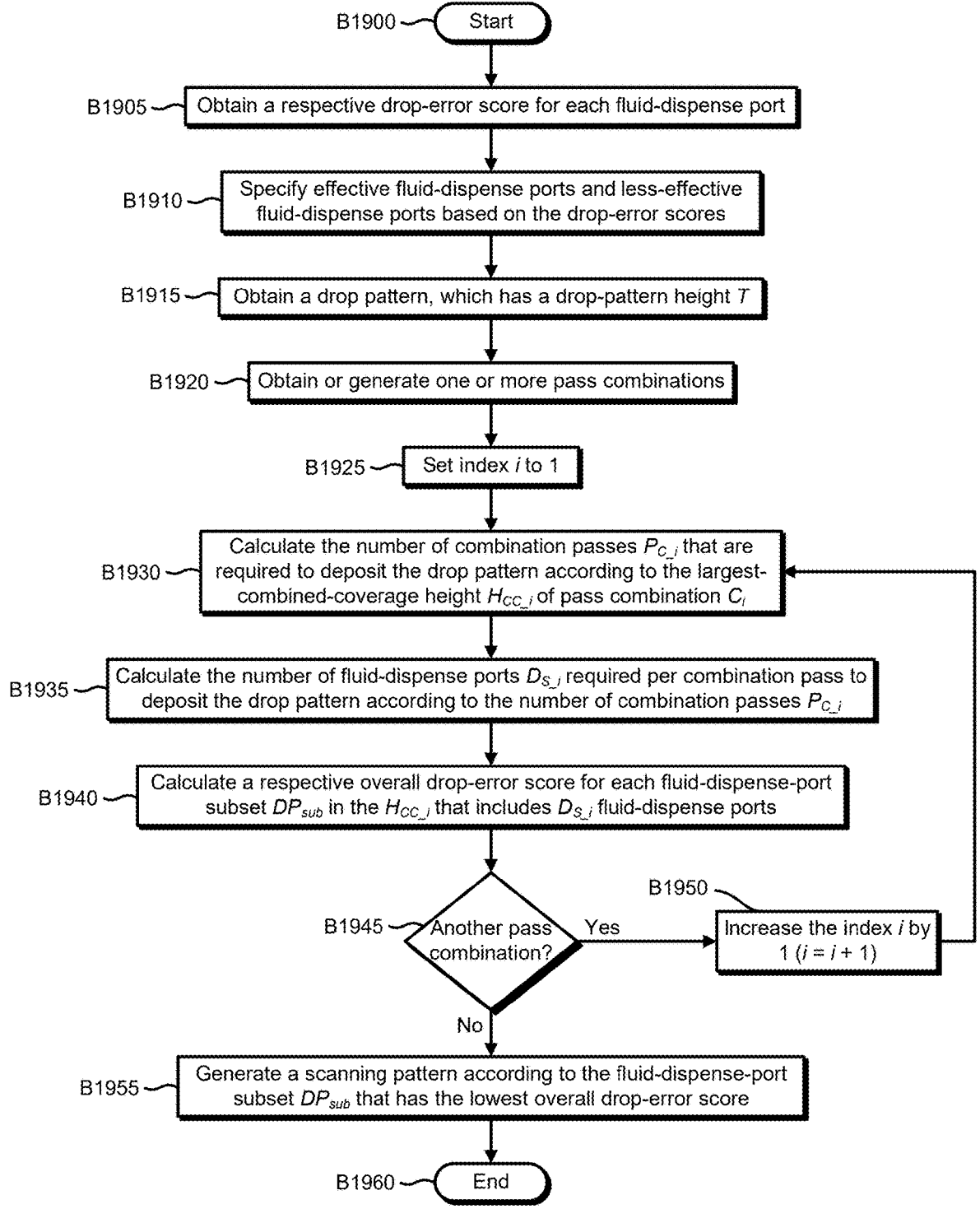
FIG. 19 illustrates an example embodiment of an operational flow for generating a scanning pattern.

FIG. 19 illustrates an example embodiment of an operational flow for generating a scanning pattern. The flow begins in block B1900. For example, the operational flow in FIG. 19 may be performed in block B1170 in FIG. 11 if multiple shift values are tied for the lowest number of passes or in block B1270 in FIG. 12 if multiple shift combinations are tied for the lowest number of passes. Also, the operational flow in FIG. 19 may be performed in block B1170 in FIG. 11 for some or all of the shift values (e.g., the shift values with respective numbers of passes that are in the lowest 50%) or in block B1270 in FIG. 12 for some or all of the shift combinations (e.g., the shift combinations with respective numbers of passes that are in the lowest 50%).

From block B1900, the flow moves to block B1905, where a control device obtains a respective drop-error score for each fluid-dispense port. For example, the control device may perform the operational flow in FIG. 15. And in block B1910, the control device specifies effective fluid-dispense ports and less-effective fluid-dispense ports based on the drop-error scores. For example, the control device may specify each fluid-dispense port that has a drop-error score that is less than a threshold as effective and specify each fluid-dispense port that has a drop-error score that is equal to or greater than the threshold as less-effective.

Next, in block B1915, the control device obtains a drop pattern, which has a drop-pattern height T. Also, if the control device has already obtained the drop pattern (e.g., if the operational flow in FIG. 19 is being performed in block B1170 in FIG. 11 or in block B1270 in FIG. 12), block B1915 may be omitted.

The flow then moves to block B1920, where the control device obtains or generates one or more pass combinations. For example, the pass combinations may have been previously generated by the control device. Or the control device may obtain or generate one or more shift values or shift combinations and generate the one or more pass combinations based on the shift values or shift combinations.

Then, in block B1925, the control device sets an index i to 1.

The flow then proceeds to block B1930, where the control device calculates the number of combination passes $P_{C\_i}$, where each combination pass is a pass of pass combination $C_i$, that are required to deposit the drop pattern according to the largest-combined-coverage height $H_{CC\_i}$ of pass combination $C_i$. For example, in some embodiments, the number of combination passes $P_{C\_i}$ may be described by the following:

$$P_{C\_i} = \text{ceiling}\left(\frac{T}{H_{CC\_i}}\right), \quad (9)$$

where T is the drop-pattern height. Also, if pass combination $C_i$ includes X passes of a fluid dispenser, then to make $P_{C\_i}$ combination passes, then the fluid dispenser will make $X \times P_{C\_i}$ passes. For example, if pass combination $C_i$ includes 4 passes of a fluid dispenser, and the number of combination passes $P_{C\_i}$ is 6, then the fluid dispenser will make 24 passes.

The flow then moves to block B1935, where the control device calculates the number of fluid-dispense ports $D_{S\_i}$ required per combination pass to deposit the drop pattern according to the number of combination passes $P_{C\_i}$. For example, in some embodiments, the number of fluid-dispense ports $D_{S\_i}$ may be described by the following:

$$D_{S\_i} = \text{ceiling}\left(\frac{T}{P_{C\_i}}\right), \quad (10)$$

where T is the drop-pattern height, and where $P_{C\_i}$ is the number of combination passes.

Then, in block B1940, the control device calculates a respective overall drop-error score for each fluid-dispense-port subset $DP_{sub}$ in the largest-combined-coverage height $H_{CC\_i}$ of pass combination C; that includes the number of fluid-dispense ports $D_{S\_i}$.

Figure 20:
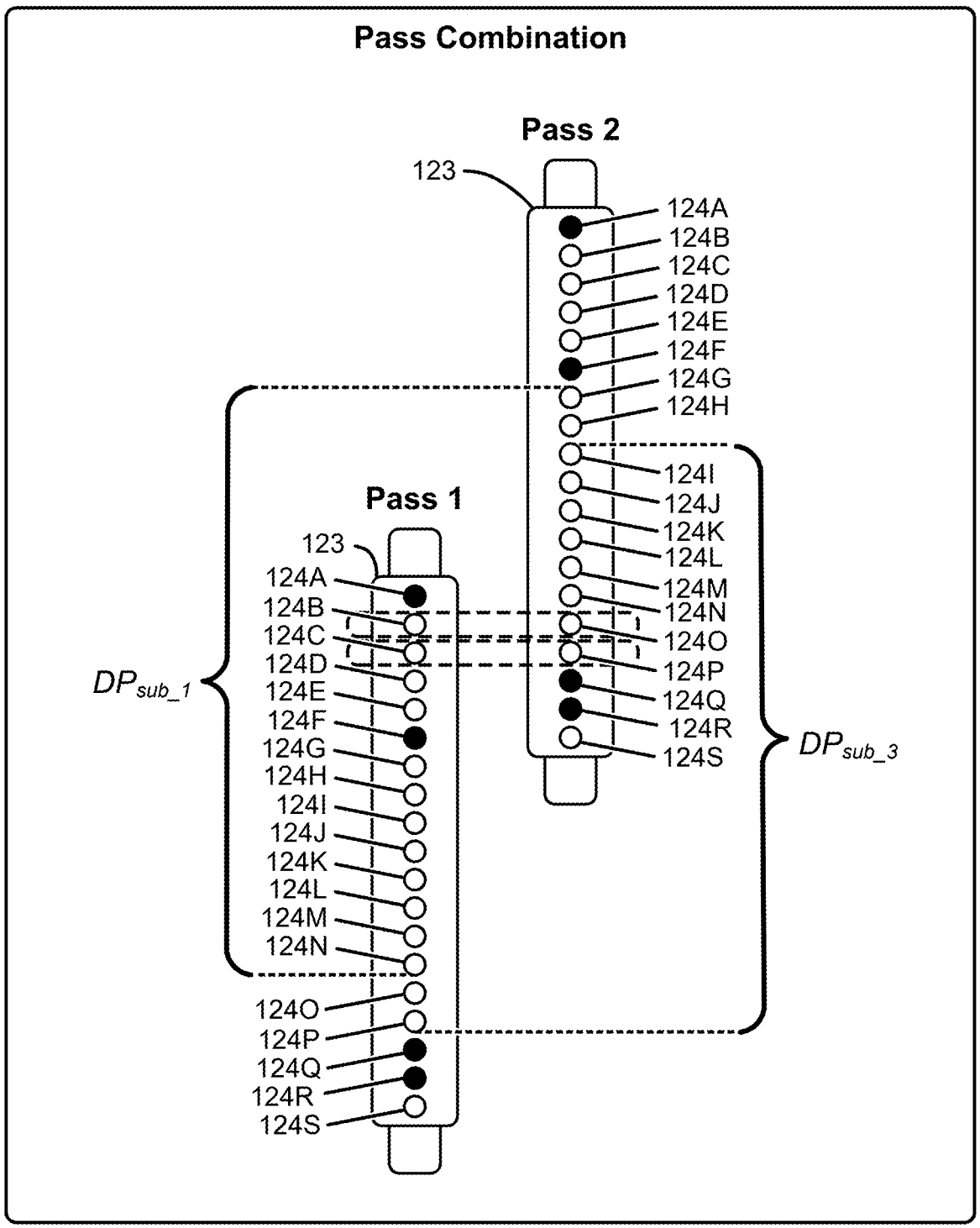
FIG. 20 illustrates example embodiments of fluid-dispense-port subsets that can deposit drops in the range encompassed by the largest-combined-coverage height of a pass combination.

For example, FIG. 20 illustrates example embodiments of fluid-dispense-port subsets in the largest-combined-coverage height of a pass combination. The pass combination includes Pass 1 and Pass 2 from FIG. 10, and the largest-combined-coverage height $H_{CC\_i}$ of the pass combination is 23. Also, the drop-pattern height is 105. Thus, the number of combination passes $P_{C\_i}$ that are required to deposit the drop pattern is 5. And the number of fluid-dispense ports $D_{S\_i}$ required per combination pass to deposit the drop pattern is 21, which is two fewer than the largest-combined-coverage height $H_{CC\_i}$ of the pass combination. Consequently, there are three fluid-dispense-port subsets, $DP_{sub\_1}$, $DP_{sub\_2}$, and $DP_{sub\_3}$ that include the number of fluid-dispense ports $D_{S\_i}$ required per combination pass. FIG. 20 illustrates dispense-port subsets $DP_{sub\_1}$ and $DP_{sub\_3}$. Dispense-port subset $DP_{sub\_1}$ includes fluid-dispense ports 124D-E and 124G-N in Pass 1 and fluid-dispense ports 124G-124N and 124S in Pass 2. Also, dispense-port subset $DP_{sub\_1}$ includes either fluid-dispense port 124B in Pass 1 or, alternatively, fluid-dispense port 124O in Pass 2 and includes either fluid-dispense port 124C in Pass 1 or, alternatively, fluid-dispense port 124P in Pass 2. To determine which fluid-dispense port to use when more than one can be used, the control device may select the fluid-dispense port that has the lowest drop-error score. For example, if fluid-dispense port 124B has a drop-error score that is less than the drop-error score of fluid-dispense port 124O, then the control device may use fluid-dispense port 124B, but not fluid-dispense port 124O.

Dispense-port subset $DP_{sub\_3}$ includes fluid-dispense ports 124D-E and 124G-P in Pass 1 and fluid-dispense ports 124I-124N and 124S in Pass 2. Also, dispense-port subset $DP_{sub\_3}$ includes either fluid-dispense port 124B in Pass 1 or, alternatively, fluid-dispense port 124O in Pass 2 and includes either fluid-dispense port 124C in Pass 1 or, alternatively, fluid-dispense port 124P in Pass 2.

And dispense-port subset $DP_{sub\_2}$ (not labeled in FIG. 20) includes fluid-dispense ports 124D-E and 124G-O in Pass 1 and fluid-dispense ports 124H-124N and 124S in Pass 2. Also, dispense-port subset $DP_{sub\_2}$ includes either fluid-dispense port 124B in Pass 1 or, alternatively, fluid-dispense port 124O in Pass 2 and includes either fluid-dispense port 124C in Pass 1 or, alternatively, fluid-dispense port 124P in Pass 2.

As noted above, to determine which fluid-dispense port to use when more than one can be used, the control device may select the fluid-dispense port that has the lowest drop-error score. And, the respective overall drop-error score for each fluid-dispense-port subset $DP_{sub}$ may be the sum of the drop-error scores of the fluid-dispense ports in the subset. For example, in some embodiments, the overall drop-error score ESO for a fluid-dispense-port subset $DP_{sub}$ (e.g., $DP_{sub\_1}$, $DP_{sub\_2}$, $DP_{sub\_3}$) may be described by equation (7) or equation (8).

Accordingly, the control device may calculate a respective overall drop-error score ESO for the three dispense-port subsets, $DP_{sub\_1}$, $DP_{sub\_2}$, and $DP_{sub\_3}$ in FIG. 20.

From block B1940, the flow moves to block B1945, where the control device determines whether to perform blocks B1930-B1940 for another pass combination. For example, the control device may determine to perform blocks B1930-B1940 for another pass combination if blocks B1930-B1940 have not been performed for every pass combination. If the control device determines to perform blocks B1930-B1940 for another pass combination (B1945=Yes), then the flow proceeds to block B1950, where the control device increases the index i by 1, and then the flow returns to block B1930. If the control device determines not to perform blocks B1930-B1940 for another pass combination (B1945=No), then the flow advances to block B1955.

In block B1955, the control device generates a scanning pattern according to the fluid-dispense-port subset $DP_{sub}$ that has the lowest overall drop-error score. The scanning pattern includes passes that use only the fluid-dispense ports in the fluid-dispense-port subset $DP_{sub}$. Thus, without adding additional passes (either solo passes or combined passes) to a scanning pattern, the control device can use only the fluid-dispense ports that, in the aggregate, most accurately and precisely deposit the drops. For example, if dispense-port subset $DP_{sub\_3}$ in FIG. 20 has the lowest overall drop-error score, then the scanning pattern may include 5 passes of a fluid dispenser that use only the fluid-dispense ports in dispense-port subset $DP_{sub\_3}$.

Figure 21:
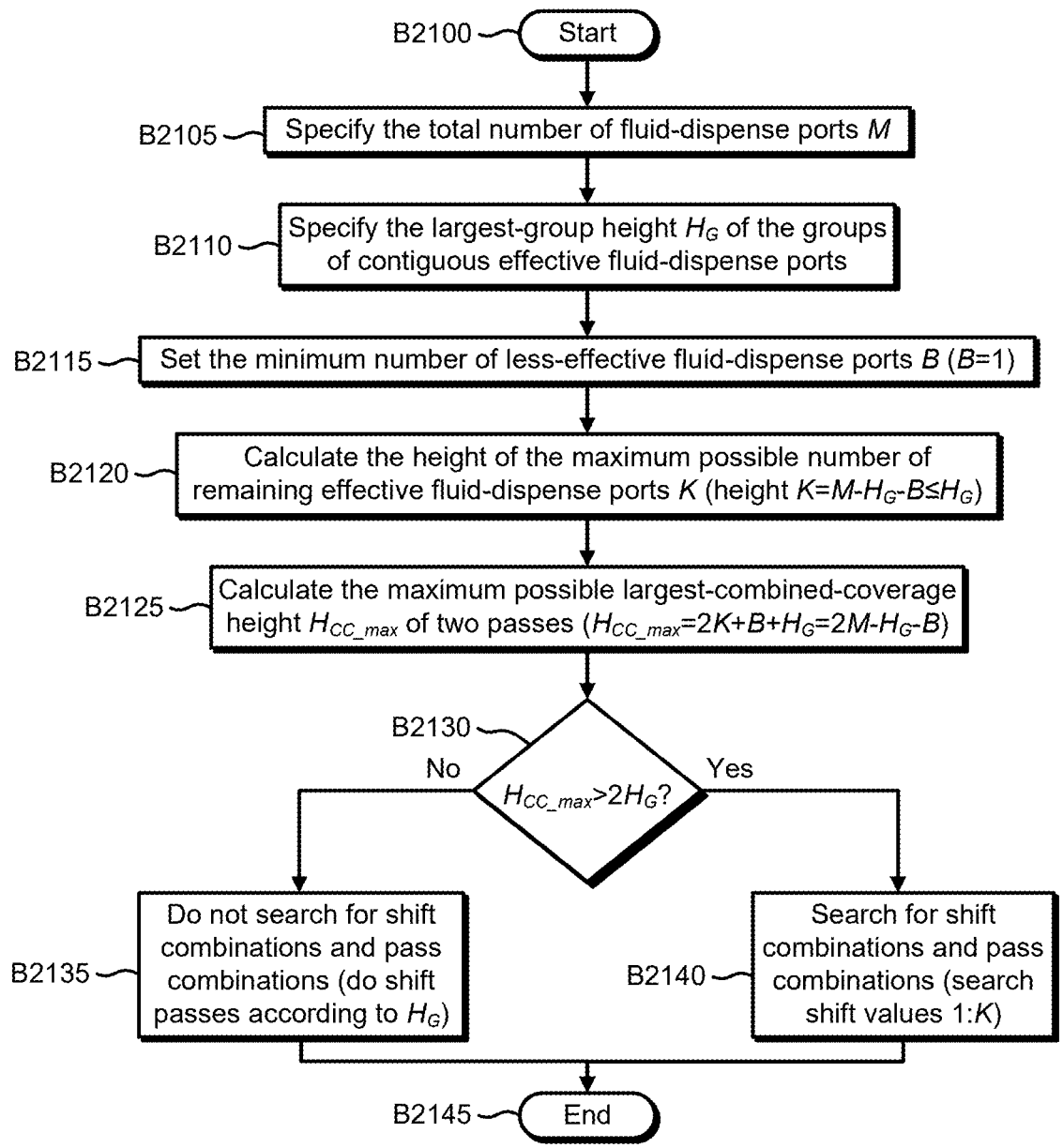
FIG. 21 illustrates an example embodiment of an operational flow for determining whether to search for shift values and pass combinations.
Figure 28A:
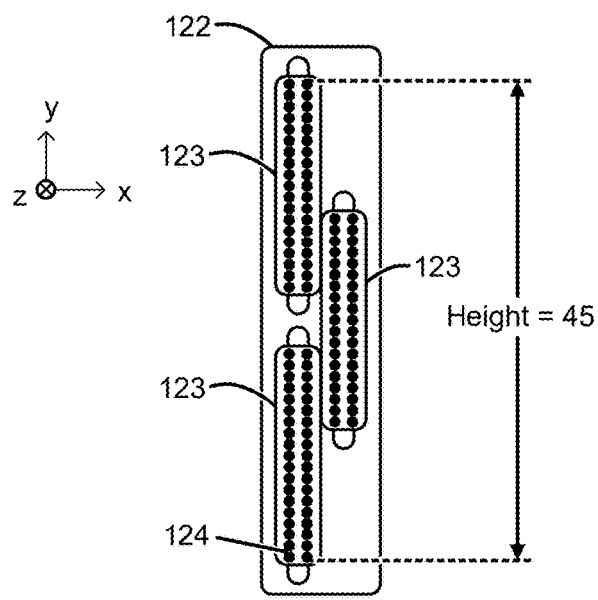
FIGS. 28A-C illustrate example embodiments of fluid dispensers that include multiple fluid-dispense heads.
Figure 28B:
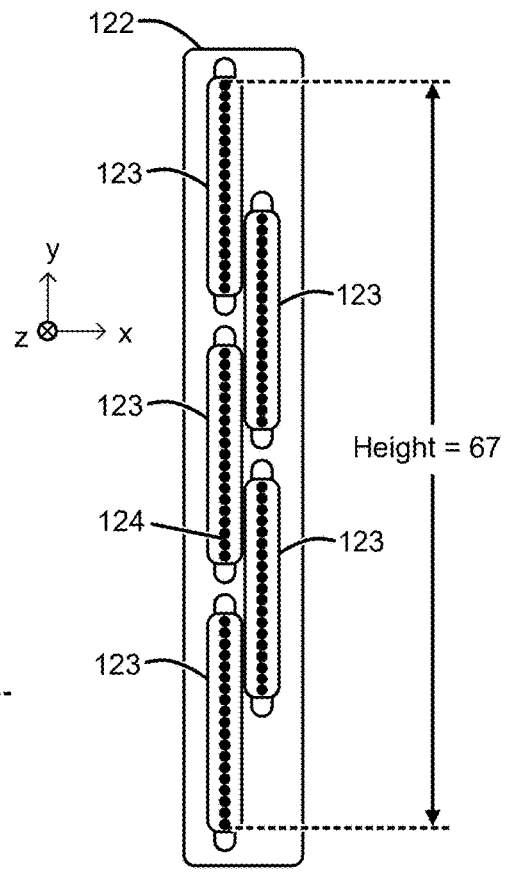
Figure 28C:
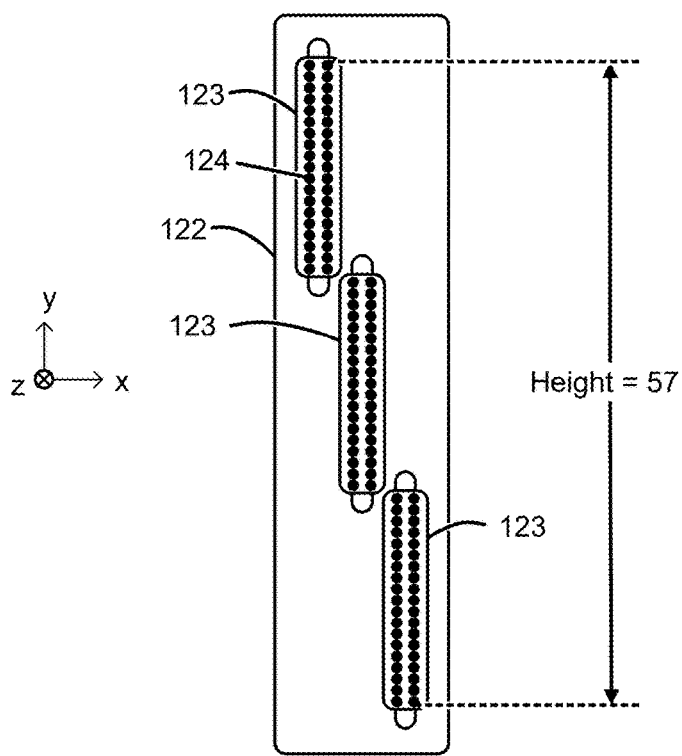

FIG. 21 illustrates an example embodiment of an operational flow for determining whether to search for shift values and pass combinations. The flow starts in block B2100 and then moves to block B2105, where a control device specifies or obtains the total number of fluid-dispense ports M in the fluid dispenser. If the fluid dispenser includes multiple fluid-dispense heads, or if a fluid-dispense head includes parallel rows of fluid-dispense ports, then the control device may specify or obtain the total number of fluid-dispense ports M in the height (e.g., the distance between the most distant edges of the two most-distant fluid-dispense ports, measured in fluid-dispense ports) of the fluid dispenser (for example, as shown in FIGS. 28A-C). The flow then moves to block B2110, where the control device specifies or obtains the largest-group height $H_G$ of the groups of contiguous effective fluid-dispense ports. Next, in block B2115, the control device sets a number of less-effective fluid-dispense ports B. Because the minimum number of less-effective fluid-dispense ports is one, B is set to one or more.

Then, in block B2120, the control device calculates the height of the maximum possible number of remaining effective fluid-dispense ports K (height K). In some embodiments, the calculation of height K can be described by the following:

$$K = M - H_G - B, \quad (11)$$

where M is the total number of fluid-dispense ports, where B is the number of less-effective fluid-dispense ports, and where $H_G$ is largest-group height of the groups of contiguous effective fluid-dispense ports. Also, by definition, $K \le H_G$.

Next, in block B2125, the control device calculates the maximum possible largest-combined-coverage height $H_{CC\_max}$ of two passes. In some embodiments, the calculation of the maximum possible largest-combined-coverage height $H_{CC\_max}$ of two passes can be described by the following:

$$H_{CC\_max} = 2K + B + H_G = 2M - H_G - B, \quad (12)$$

where M is the total number of fluid-dispense ports, where B is the number of less-effective fluid-dispense ports, where K is the height of the maximum possible number of remaining effective fluid-dispense ports, and where $H_G$ is largest-group height of the groups of contiguous effective fluid-dispense ports.

The flow then proceeds to block B2130, where the control device determines whether the maximum possible largest-combined-coverage height $H_{CC\_max}$ of two passes is greater than the largest-group height $H_G$ multiplied by two. If the control device determines that the maximum possible largest-combined-coverage height $H_{CC\_max}$ of two passes is not greater than the largest-group height $H_G$ multiplied by two (B2130=No), then the flow moves to block B2135, where the control device does not search for shift combinations and pass combinations (and thus shifts the passes according to the largest-group height $H_G$), and then the flow ends in block B2145.

If the control device determines that the maximum possible largest-combined-coverage height $H_{CC\_max}$ of two passes is greater than the largest-group height $H_G$ multiplied by two (B2130=Yes), then the flow moves to block B2140, where the control device searches for shift combinations and pass combinations (e.g., as described in FIG. 11 or in FIG. 12). In block B2140, the control device may search for shift values only in the range of 1:K. Thus, block B1145 in FIG. 11 may be modified such that the control device determines whether the shift value s<K, where K is the height of the maximum possible number of remaining effective fluid-dispense ports. And if the control device determines that s<K (B1145=Yes), then the flow moves to block B1150. But if the control device determines s≥K (B1145=No), then the flow proceeds to block B1155. Then the flow ends in block B2145 (where the control device may generate a scanning pattern and control a fluid dispenser to deposit drops according to the scanning pattern).

Figure 22:
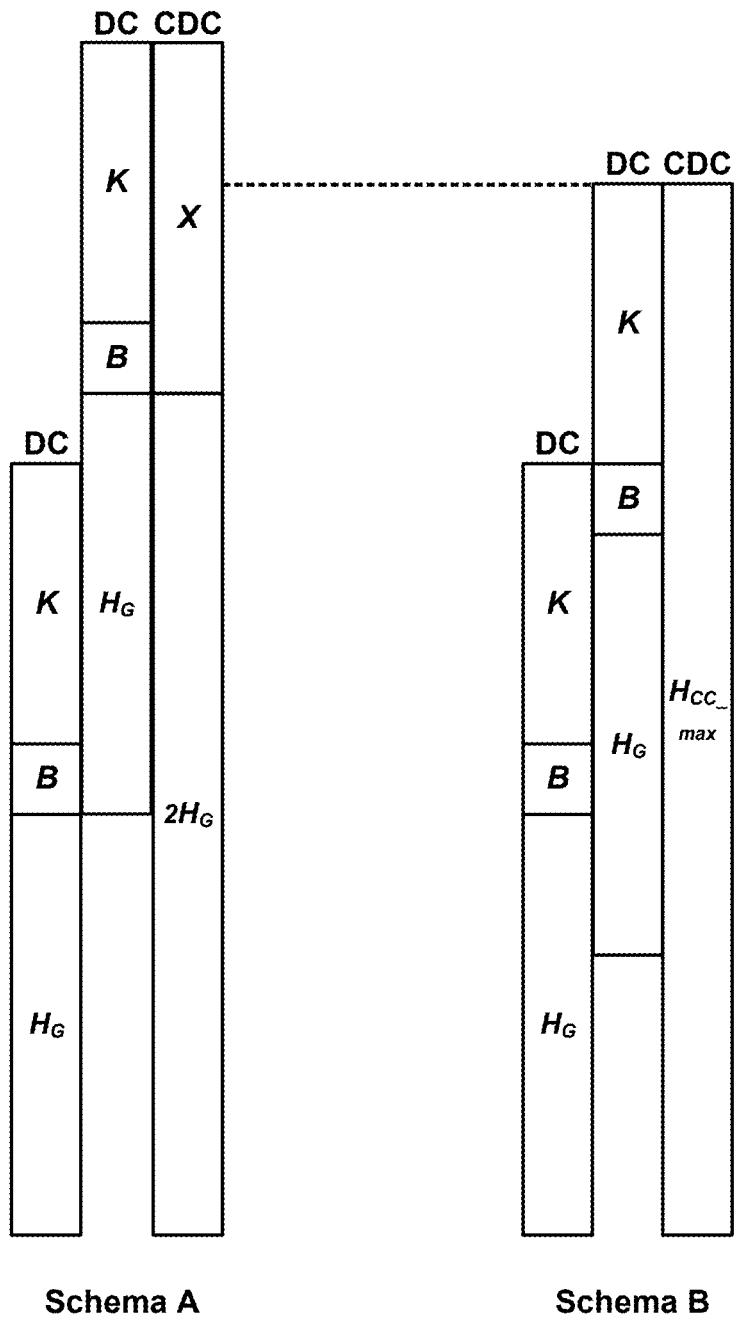
FIG. 22 illustrates example embodiments of drop coverages and combined drop coverages.

For example, FIG. 22 illustrates example embodiments of drop coverages and combined drop coverages. The drop coverages and combined drop coverages in Schema A and Schema B illustrate the height of the minimum number of less-effective fluid-dispense ports B (the height of one fluid-dispense port), the largest-group height $H_G$, and the height K of the maximum possible number of remaining effective fluid-dispense ports given the largest-group height $H_G$. Schema A also illustrates the largest-group height $H_G$ multiplied by two, and thus illustrates the combined drop coverage of two passes that use only the fluid-dispense ports in the largest-group height $H_G$ and that are shifted, relative to each other, by the largest-group height $H_G$. And Schema B illustrates the combined drop coverage of the maximum possible largest-combined-coverage height $H_{CC\_max}$. Because the maximum possible largest-combined-coverage height $H_{CC\_max}$ of two passes is greater than the largest-group height $H_G$ multiplied by two, from block B2130, the flow would move to block B2140, where the control device would search for shift combinations and pass combinations.

Figure 23:
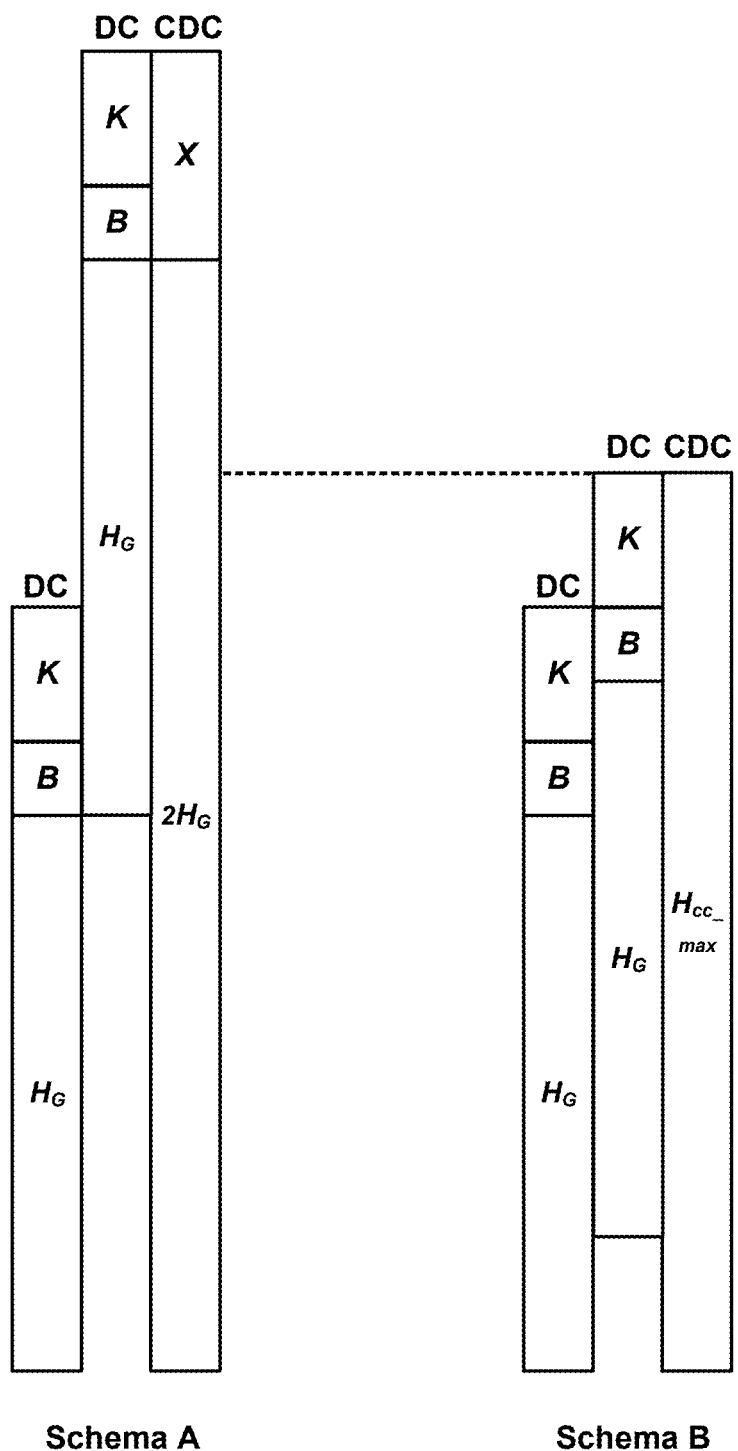
FIG. 23 illustrates example embodiments of drop coverages and combined drop coverages.

Also for example, FIG. 23 illustrates example embodiments of drop coverages and combined drop coverages. The drop coverages and combined drop coverages in Schema A and Schema B illustrate the height of the minimum number of less-effective fluid-dispense ports B (the height of one fluid-dispense port), the largest-group height $H_G$, and the height K of the maximum possible number of remaining effective fluid-dispense ports given the largest-group height $H_G$. Schema A also illustrates the largest-group height $H_G$ multiplied by two, and thus illustrates the combined drop coverage of two passes that use only the fluid-dispense ports in the largest-group height $H_G$ and that are shifted, relative to each other, by the largest-group height $H_G$. And Schema B illustrates the combined drop coverage of the maximum possible largest-combined-coverage height $H_{CC\_max}$. In contrast to FIG. 22, the maximum possible largest-combined-coverage height $H_{CC\_max}$ of two passes is not greater than the largest-group height $H_G$ multiplied by two. Thus, from block B2130 in FIG. 21, the flow would move to block B2135, where the control device would not search for shift combinations and pass combinations.

Figure 24:
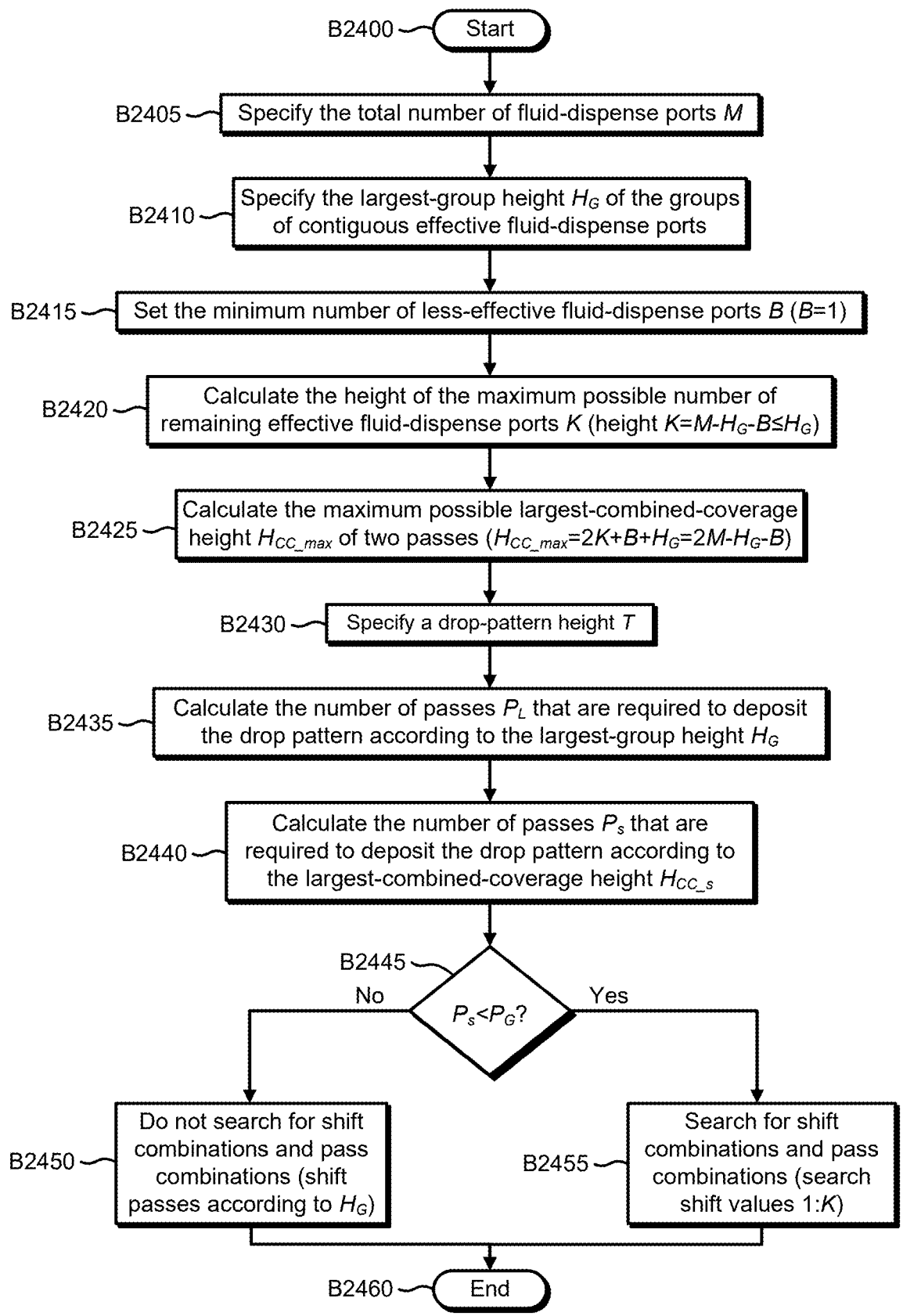
FIG. 24 illustrates an example embodiment of an operational flow for determining whether to search for shift values and pass combinations.

FIG. 24 illustrates an example embodiment of an operational flow for determining whether to search for shift values (e.g., shift combinations) and pass combinations. The flow starts in block B2400 and then moves to block B2405, where a control device specifies or obtains the total number of fluid-dispense ports M in the fluid dispenser (or the total number of fluid-dispense ports M in the height of the fluid dispenser). The flow then moves to block B2410, where the control device specifies or obtains the largest-group height $H_G$ of the groups of contiguous effective fluid-dispense ports. Next, in block B2415, the control device sets a height of a minimum number of less-effective fluid-dispense ports B. Because the minimum number is one, B is set to the height of one fluid-dispense port.

Then, in block B2420, the control device calculates the height of the maximum possible number of remaining effective fluid-dispense ports K (height K), for example as described by equation (11). Next, in block B2425, the control device calculates the maximum possible largest-combined-coverage height $H_{CC\_max}$ of two passes, for example as described by equation (12). And, in block B2430, the control device specifies or obtains a drop-pattern height T.

The flow then advances to block B2435, where the control device calculates the number of passes $P_L$ that are required to deposit the drop pattern according to the largest-group height $H_G$ (the number of passes $P_L$ that are required to deposit the drop pattern using only the largest group of contiguous effective fluid-dispense ports), for example as described by equation (3).

The flow then moves to block B2440, where the control device calculates the number of passes $P_s$ that are required to deposit the drop pattern according to the maximum possible largest-combined-coverage height $H_{CC\_max}$. For example, the calculation of the number of passes $P_s$ may be described by the following:

$$Q = 2 * \text{ceiling}\left(\frac{T}{H_{CC\_max}}\right), \quad (13)$$

$$R = 1 + 2 * \text{ceiling}\left(\frac{T - H_G}{H_{CC\_max}}\right), \text{ and}$$

$$P_s = \min(Q, R),$$

where T is the drop-pattern height, where Q is an even number of passes (all from combined passes), and where R is an odd number of passes (an even number of passes from combined passes plus one solo pass). The flow then proceeds to block B2445.

In block B2445, the control device determines whether the number of passes $P_s$ that are required to deposit the drop pattern according to the maximum possible largest-combined-coverage height $H_{CC\_max}$ is less than the number of passes $P_L$ that are required to deposit the drop pattern according to the largest-group height $H_G$ (whether $P_s<P_L$). If the control device determines that $P_s$ is not less than $P_L$ (B2445=No), then the flow moves to block B2450, where the control device does not search for shift combinations and pass combinations, and then the flow ends in block B2460. If the control device determines that that $P_s$ is less than $P_L$ (B2445=Yes), then the flow moves to block B2455, where the control device searches for shift combinations and pass combinations (e.g., as described in FIG. 11 or in FIG. 12), and then the flow ends in block B2460 (where the control device may generate a scanning pattern and control a fluid dispenser to deposit drops according to the scanning pattern).

Figure 25:
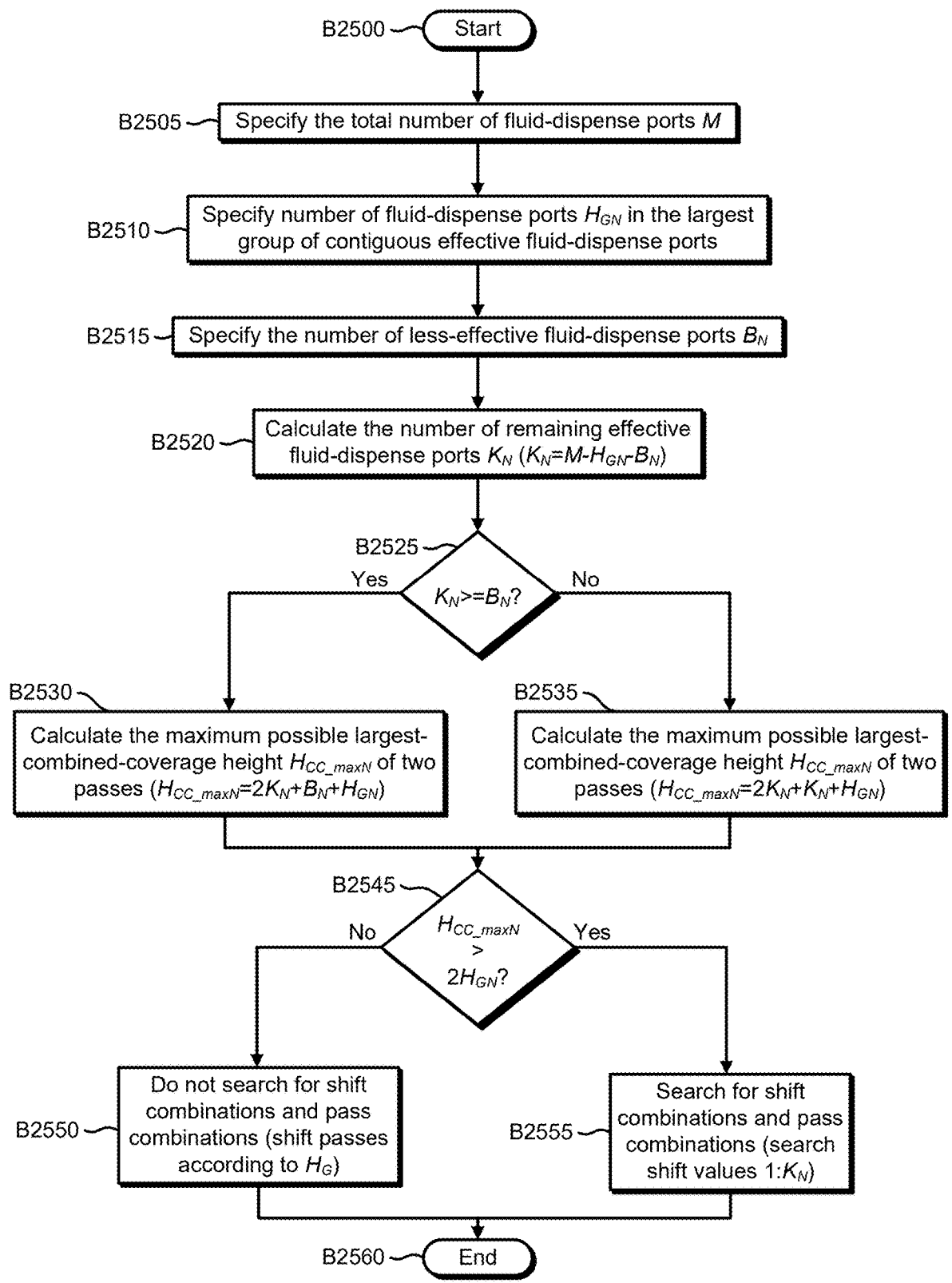
FIG. 25 illustrates an example embodiment of an operational flow for determining whether to search for shift values and pass combinations.

FIG. 25 illustrates an example embodiment of an operational flow for determining whether to search for shift values (e.g., shift combinations) and pass combinations. The flow starts in block B2500 and then moves to block B2505, where a control device specifies or obtains the total number of fluid-dispense ports M in the fluid dispenser (or the total number of fluid-dispense ports M in the height of the fluid dispenser). The flow then moves to block B2510, where the control device specifies or obtains the number of fluid-dispense ports $H_{GN}$ in the largest group of contiguous effective fluid-dispense ports. Next, in block B2515, the control device specifies or obtains the number of less-effective fluid-dispense ports $B_N$.

Then, in block B2520, the control device calculates the number of remaining effective fluid-dispense ports Ky. In some embodiments, the calculation of $K_N$ can be described by the following:

$$K_N = M - H_{GN} - B_N, \quad (14)$$

where M is the total number of fluid-dispense ports, where $B_N$ is the number of less-effective fluid-dispense ports, and where $H_{GN}$ is the number of fluid-dispense ports in the largest group of contiguous effective fluid-dispense ports. Also, by definition, $K_N \leq H_{GN}$.

The flow then proceeds to block B2525, where the control device determines whether the number of remaining effective fluid-dispense ports $K_N$ is greater than or equal to the number of less-effective fluid-dispense ports $B_N$. If $K_N \geq B_N$ (B2525=Yes), then the flow moves to block B2530. If $K_N<B_N$ (B2525=No), then the flow proceeds to block B2535.

In block B2530, the control device calculates the number of fluid-dispense ports in the maximum possible largest-combined-coverage height $H_{CC\_max}$ of two passes based on the number of remaining effective fluid-dispense ports $K_N$, on the number of less-effective fluid-dispense ports $B_N$, and on the number of fluid-dispense ports in the largest group of contiguous effective fluid-dispense ports $H_{GN}$. In some embodiments, the calculation of the number of fluid-dispense ports in the maximum possible largest-combined-coverage height $H_{CC\_maxN}$ of two passes can be described by the following:

$$H_{CC\_maxN} = 2K_N + B_N + H_{GN}.$$

The flow then advances to block B2545.

In block B2535, the control device calculates the number of fluid-dispense ports in the maximum possible largest-combined-coverage height $H_{CC\_maxN}$ of two passes based on the number of remaining effective fluid-dispense ports $K_N$ and on the number of fluid-dispense ports in the largest group of contiguous effective fluid-dispense ports $H_{GN}$. In some embodiments, the calculation of the number of fluid-dispense ports in the maximum possible largest-combined-coverage height $H_{CC\_maxN}$ of two passes can be described by the following:

$$H_{CC\_maxN} = 2K_N + K_N + H_{GN} = 3K_N + H_{GN}. \quad (16)$$

The flow then advances to block B2545.

In block B2545, the control device determines whether the number of fluid-dispense ports in the maximum possible largest-combined-coverage height $H_{CC\_maxN}$ of two passes is greater than the number of fluid-dispense ports in the largest-group height $H_{GN}$ multiplied by two. If the control device determines that $H_{CC\_maxN} \leq 2H_{GN}$ (B2545-No), then the flow moves to block B2550, where the control device does not search for shift combinations and pass combinations (and thus shifts the passes according to the number of fluid-dispense ports $H_{GN}$ in the largest group of contiguous fluid-dispense ports), and then the flow ends in block B2560.

If the control device determines that $H_{CC\_maxN} > 2H_{GN}$ (B2545=Yes), then the flow moves to block B2555, where the control device searches for shift combinations and pass combinations (e.g., as described in FIG. 11 or in FIG. 12). In block B2140, the control device may search for shift values only in the range of $1:K_N$. Then the flow ends in block B2560 (where the control device may generate a scanning pattern).

Figure 26:
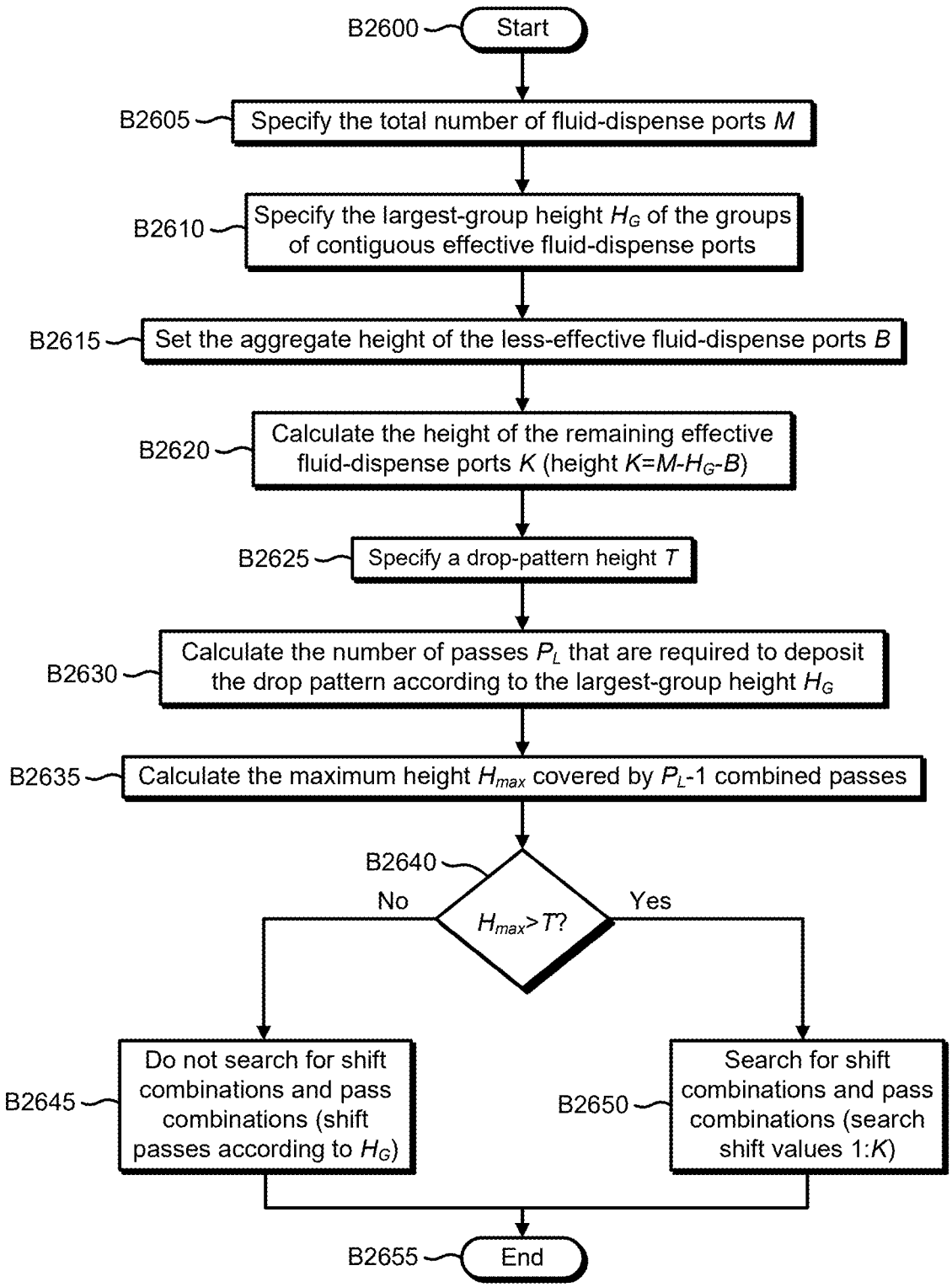
FIG. 26 illustrates an example embodiment of an operational flow for determining whether to search for shift values and pass combinations.

FIG. 26 illustrates an example embodiment of an operational flow for determining whether to search for shift values (e.g., shift combinations) and pass combinations. The flow starts in block B2600 and then moves to block B2605, where a control device specifies or obtains the total number of fluid-dispense ports M in the fluid dispenser (or the total number of fluid-dispense ports M in the height of the fluid dispenser). The flow then moves to block B2610, where the control device specifies or obtains the largest-group height $H_G$ of the groups of contiguous effective fluid-dispense ports. Next, in block B2615, the control device specifies or obtains the aggregate height of the less-effective fluid-dispense ports B.

Then, in block B2620, the control device calculates the height of the remaining effective fluid-dispense ports K, for example as described by equation (11). And, in block B2625, the control device specifies or obtains a drop-pattern height T. The flow then advances to block B2630, where the control device calculates the number of passes $P_L$ that are required to deposit the drop pattern according to the largest-group height $H_G$ (the number of passes $P_L$ that are required to deposit the drop pattern using only the largest group of contiguous effective fluid-dispense ports), for example as described by equation (3).

The flow then moves to block B2635, where the control device calculates the maximum height $H_{max}$ covered by $P_L-1$ combined passes. For example, the calculation of the maximum height $H_{max}$ covered by $P_L-1$ combined passes can be described by the following:

$$H_{max} = (P_L - 1) * H_G + (3K - H_G) * (P_L - 2), \quad (17)$$

where K is the height of the remaining effective fluid-dispense ports (the fluid-dispense ports that are not in the largest contiguous group), where $H_G$ is largest-group height of the groups of contiguous effective fluid-dispense ports, and where $P_L$ is the number of passes that are required to deposit the drop pattern according to the largest-group height $H_G$. Also, $3K-H_G$ describes the maximum advantage of a combined pass. The flow then proceeds to block B2640.

In block B2640, the control device determines whether the maximum height $H_{max}$ covered by $P_L-1$ combined passes is greater than the drop-pattern height T (whether $H_{max} > T$). If the control device determines that $H_{max}$ is not greater than T (B2640=No), then the flow moves to block B2645, where the control device does not search for shift combinations and pass combinations (and shifts passes according to the largest-group height $H_G$), and then the flow ends in block B2655. If the control device determines that $H_{max}$ is greater than T (B2640=Yes), then the flow moves to block B2650, where the control device searches for shift combinations and pass combinations (e.g., as described in FIG. 11 or in FIG. 12), and then the flow ends in block B2655 (where the control device may generate a scanning pattern and control a fluid dispenser to deposit drops according to the scanning pattern).

Figure 27:
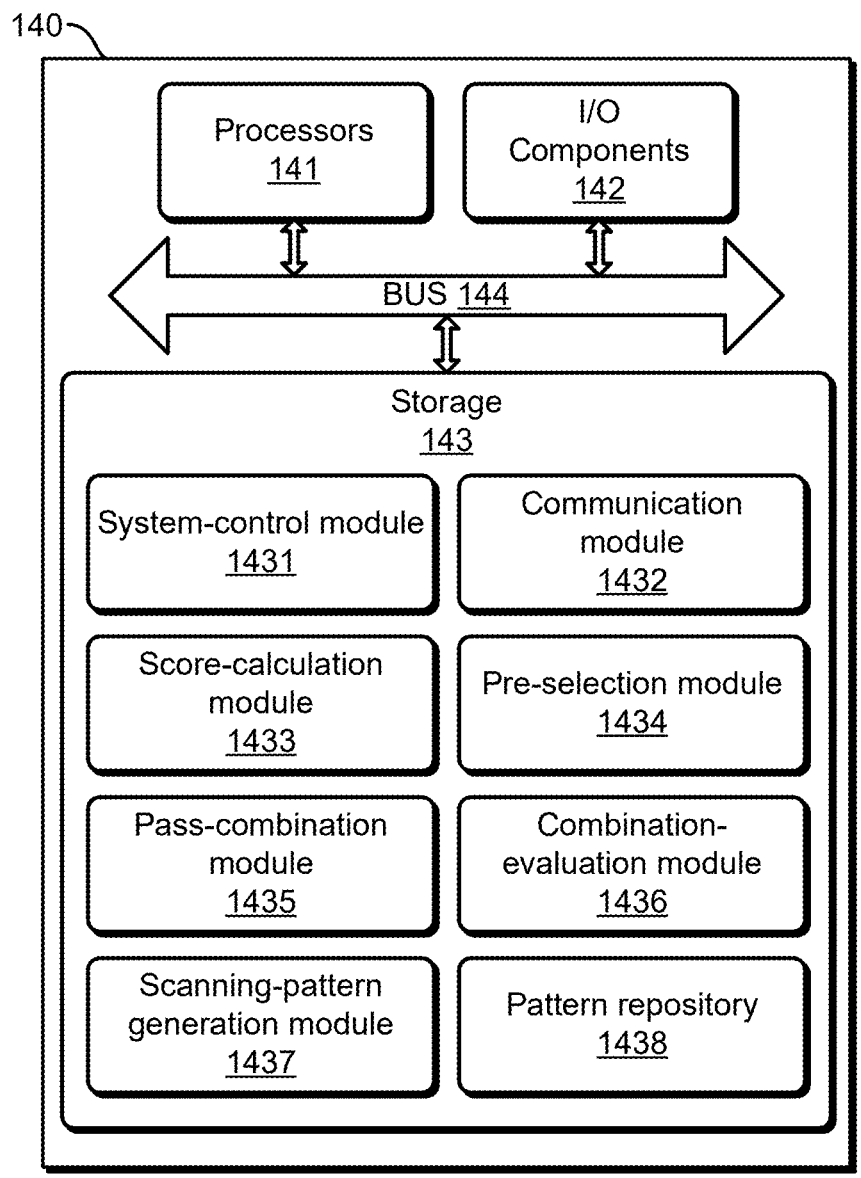
FIG. 27 is a schematic illustration of an example embodiment of a control device.

FIG. 27 is a schematic illustration of an example embodiment of a control device 140. The control device 140 includes one or more processors 141, one or more I/O components 142, and storage 143. Also, the hardware components of the control device 140 communicate via one or more buses 144 or other electrical connections. Examples of buses 144 include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 141 are or include one or more central processing units (CPUs), such as microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). And the one or more processors 141 are an example of a processing unit.

The I/O components 142 include interfaces and communication components (e.g., a GPU, a network-interface controller) that enable communication (wired or wireless) with other members of an imprint system 100 (e.g., the fluid dispenser 122, the substrate-positioning stage 105, actuators, motors), with other computing devices, and with input or output devices (not illustrated), which may include a network device, a keyboard, a mouse, a printing device, a display device, a light pen, an optical-storage device, a scanner, a microphone, a drive, a joystick, and a control pad.

The storage 143 includes one or more computer-readable storage media. As used herein, a computer-readable storage medium is a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 143, which may include both ROM and RAM, can store computer-readable data or computer-executable instructions. Furthermore, in embodiments where the storage 143 includes RAM, the one or more processors 141 can use the RAM as a work area. Also, the storage 143 is an example of a storage unit. Additionally, when the control device 140 is described as obtaining, recording, generating, storing, operating, processing, etc., the information is stored in the storage 143.

The control device 140 additionally includes a system-control module 1431, a communication module 1431, a score-calculation module 1433, a pre-selection module 1434, a pass-combination module 1435, a combination-evaluation module 1436, and a scanning-pattern-generation module 1437. As used herein, a module includes logic, computer-readable data, or computer-executable instructions. In the embodiment shown in FIG. 27, the modules are implemented in software (e.g., Assembly, C, C++, C#, Java, JavaScript, BASIC, Perl, Visual Basic, Python, PHP). However, in some embodiments, the modules are implemented in hardware (e.g., customized circuitry) or, alternatively, a combination of software and hardware. When the modules are implemented, at least in part, in software, then the software can be stored in the storage 143. Also, in some embodiments, the control device 140 includes additional or fewer modules, the modules are combined into fewer modules, or the modules are divided into more modules. And a module may use (e.g., call) other modules. Also, the control device 140 includes a pattern repository 1438, which stores drop patterns and scanning patterns.

The system-control module 1431 includes instructions that cause the applicable components (e.g., the one or more processors 141, the I/O components 142, the storage 143) of the control device 140 to communicate with and to control the other members of an imprint system 100. And the applicable components operating according to the system-control module 1431 realize an example of a system-control unit.

The communication module 1432 includes instructions that cause the applicable components (e.g., the one or more processors 141, the I/O components 142, the storage 143) of the control device 140 to communicate with one or more other devices, such as other computing devices and input or output devices (e.g., display devices). And the applicable components operating according to the communication module 1432 realize an example of a communication unit.

The score-calculation module 1433 includes instructions that cause the applicable components (e.g., the one or more processors 141, the I/O components 142, the storage 143) of the control device 140 to calculate respective drop-error scores for fluid-dispense ports. For example, some embodiments of the score-calculation module 1433 include instructions that cause the applicable components of the control device 140 to perform at least some of the operations that are described in blocks B1505-B1560 in FIG. 15, in block B1710 in FIG. 17, and in block B1905 in FIG. 19. And the applicable components operating according to the score-calculation module 1433 realize an example of a score-calculation unit.

The pre-selection module 1434 includes instructions that cause the applicable components (e.g., the one or more processors 141, the I/O components 142, the storage 143) of the control device 140 to determine whether to search for shift combinations and pass combinations. For example, some embodiments of the pre-selection module 1434 include instructions that cause the applicable components of the control device 140 to perform at least some of the operations that are described in blocks B2100-B2145 in FIG. 21, in blocks B2400-B2460 in FIG. 24, in blocks B2500-B2560 in FIG. 25, and in blocks B2600-B2655 in FIG. 26. And the applicable components operating according to the pre-selection module 1434 realize an example of a pre-selection unit.

The pass-combination module 1435 includes instructions that cause the applicable components (e.g., the one or more processors 141, the I/O components 142, the storage 143) of the control device 140 to generate shift combinations and pass combinations and to determine whether to generate scanning patterns according to pass combinations. For example, some embodiments of the pass-combination module 1435 include instructions that cause the applicable components of the control device 140 to perform at least some of the operations that are described in blocks B1100-B1155 and B1165 in FIG. 11, in blocks B1200-B1260 and B1270 in FIG. 12, in blocks B1715-B1720 in FIG. 17, and in block B1920 in FIG. 19. And the applicable components operating according to the pass-combination module 1435 realize an example of a pass-combination unit.

The combination-evaluation module 1436 includes instructions that cause the applicable components (e.g., the one or more processors 141, the I/O components 142, the storage 143) of the control device 140 to calculate overall drop-error scores for pass combinations and subsets of fluid-dispense ports and to select pass combinations and subsets of fluid-dispense ports based on their respective overall drop-error scores. For example, some embodiments of the combination-evaluation module 1436 include instructions that cause the applicable components of the control device 140 to perform at least some of the operations that are described in blocks B1700-B1705 and B1725-B1750 in FIG. 17 and in blocks B1910-B1915 and B1920-B1950 in FIG. 19. And the applicable components operating according to the combination-evaluation module 1436 realize an example of a combination-evaluation unit.

The scanning-pattern-generation module 1437 includes instructions that cause the applicable components (e.g., the one or more processors 141, the I/O components 142, the storage 143) of the control device 140 to generate scanning patterns, for example based on pass combinations. For example, some embodiments of the scanning-pattern-generation module 1437 include instructions that cause the applicable components of the control device 140 to perform at least some of the operations that are described in blocks B1160 and B1170 in FIG. 11, in blocks B1265 and B1275 in FIG. 12, and in block B1960 in FIG. 19. And the applicable components operating according to the scanning-pattern-generation module 1437 realize an example of a scanning-pattern-generation unit.

FIGS. 28A-C illustrate example embodiments of fluid dispensers that include multiple fluid-dispense heads. The fluid dispenser 122 in FIG. 28A includes three fluid-dispense heads 123. Also, each fluid-dispense head 123 includes two parallel rows of fluid-dispense ports 124. Two of the fluid-dispense heads 123 are aligned with each other (have the same position on the x axis). Also, along the y axis, the coverage range of each fluid-dispense head 123 partially overlaps the coverage range of at least one other fluid-dispense head 123. The height of the fluid dispenser 122, as measured in units of fluid-dispense ports 124, is 45.

The fluid dispenser 122 in FIG. 28B includes five fluid-dispense heads 123. Each fluid-dispense head 123 includes one row of fluid-dispense ports 124. Three of the fluid-dispense heads 123 are aligned with each other (have the same position on the x axis), and the other two fluid-dispense heads 123 are aligned with each other (have the same position on the x axis). Also, along the y axis, the coverage range of each fluid-dispense head 123 partially overlaps the coverage range of at least one other fluid-dispense head 123. The height of the fluid dispenser 122, as measured in units of fluid-dispense ports 124, is 67.

The fluid dispenser 122 in FIG. 28C includes three fluid-dispense heads 123. Each fluid-dispense head 123 includes one row of fluid-dispense ports 124. None of the fluid-dispense heads 123 are aligned with another fluid-dispense head 123. And along the y axis, none of the fluid-dispense heads 123 has a coverage range that overlaps the coverage range of another fluid-dispense head 123. The height of the fluid dispenser 122, as measured in units of fluid-dispense ports 124, is 57.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

In the description, specific details are set forth in order to provide a thorough understanding of the embodiments disclosed. However, well-known methods, procedures, components and circuits may not have been described in detail in order to avoid unnecessarily lengthening the present disclosure.

Also, if a member (e.g., element, part, component) is referred herein as being "on," "against," "connected to," or "coupled to" another member, then the member can be directly on, against, connected or coupled to the other member, but intervening members may also be present between the member and the other member. In contrast, if a member is referred to as being "directly on," "directly against," "directly connected to," or "directly coupled to" another member, then there are no intervening members present between the member and the other member.

Furthermore, the terms "comprising," "having," "includes," "including," and "containing" are to be construed as open-ended terms unless otherwise noted. Accordingly, these terms, when used in the present specification, specify the presence of described features, integers, steps, operations, elements, materials, or members, but do not preclude the presence or addition of one or more other features, integers, steps, operations, elements, materials, or members that are not explicitly described.

The invention claimed is:

1. A method for generating a scanning pattern to apply a drop pattern, the method comprising:
   specifying nozzles of a fluid dispenser that are usable to eject fluid and nozzles of the fluid dispenser that are not usable to eject fluid;
   specifying contiguous nozzle groups of the nozzles that are usable to eject fluid;
   specifying a coverage height of a largest contiguous nozzle group of the contiguous nozzle groups, wherein the largest contiguous nozzle group includes more nozzles than any other nozzle group of the contiguous nozzle groups;
   determining, for one or more pass combinations, a respective combined coverage height, wherein each pass combination of the one or more pass combinations respectively includes two or more passes, of the fluid dispenser, that are shifted relative to each other by a shift value, and wherein at least one of the nozzles that are usable to eject fluid can eject fluid in each location encompassed by the respective combined coverage height in at least one of the two or more passes; and
   selecting, as a selected basis of a scanning pattern, the largest contiguous nozzle group or, alternatively, one of the one or more pass combinations based on the coverage height of the largest contiguous nozzle group and on the respective combined coverage height of each of the one or more pass combinations.

2. The method of claim 1, further comprising:
   generating the scanning pattern based on the selected basis of the scanning pattern; and
   controlling the fluid dispenser to apply drops of fluid on a substrate according to the scanning pattern, wherein applying the drops of fluid includes making multiple passes over the substrate.

3. The method of claim 1, wherein each shift value is an integer multiple of a distance between adjacent nozzles.

4. The method of claim 1,
   wherein the largest contiguous nozzle group is selected as the selected basis of the scanning pattern in a case where the coverage height of the largest contiguous nozzle group is greater than all of the respective combined coverage heights of the one or more pass combinations, and
   wherein a first pass combination of the one or more pass combinations is selected as the selected basis of the scanning pattern in a case where the respective combined coverage height of the first pass combination is greater than the coverage height of the largest contiguous nozzle group and, if the one or more pass combinations include one or more other pass combinations in addition to the first pass combination, is greater than the respective combined coverage heights of the one or more other pass combinations.

5. The method of claim 1, wherein each pass combination of the one or more pass combinations includes two passes.

6. The method of claim 1, wherein each pass combination of the one or more pass combinations includes three, four, or five passes.

7. The method of claim 1, further comprising:
   calculating drop-error scores that include a respective drop-error score for each nozzle of the fluid dispenser, wherein the specifying of the nozzles of the fluid dispenser that are usable to eject fluid and the nozzles of the fluid dispenser that are not usable to eject fluid is based on the drop-error scores.

8. A method for generating a scanning pattern to apply a drop pattern, the method comprising:
   specifying fluid-dispense ports of a fluid dispenser that are usable to eject fluid and fluid-dispense ports of the fluid dispenser that are not usable to eject fluid;
   specifying a plurality of pass combinations, wherein each pass combination, of the plurality of pass combinations, respectively includes two or more passes, and wherein the two or more passes are shifted relative to each other according to shift values;
   determining, for each pass combination of the plurality of pass combinations, a respective maximum coverage range, wherein at least one of the fluid-dispense ports that are usable to eject fluid can eject fluid in each drop location encompassed by the respective maximum coverage range; and
   selecting a selected pass combination from among the plurality of pass combinations based on the respective maximum coverage ranges.

9. The method of claim 8, further comprising:
calculating a number of fluid-dispense ports required per each pass of the selected pass combination based on a drop pattern;
calculating a respective overall drop-error score for each fluid-dispense-port subset of a plurality of fluid-dispense-port subsets, in the respective maximum coverage range of the selected pass combination, that include the number of fluid-dispense ports;
selecting, as a selected subset, one of the plurality of fluid-dispense-port subsets based on the overall drop-error scores; and
generating a scanning pattern based on the selected subset.

10. The method of claim 8, wherein each shift value is an integer multiple of a fluid-dispense port pitch or a drop pitch.

11. The method of claim 8, further comprising:
calculating a respective drop-error score for each of the fluid-dispense ports that are usable to eject fluid; and
selecting a selected pass offset from among a plurality of pass offsets based on the respective drop-error scores for the fluid-dispense ports that are usable to eject fluid.

12. The method of claim 11, wherein the respective drop-error scores for the fluid-dispense ports that are usable to eject fluid are based on respective distances of the fluid-dispense ports from a datum.

13. The method of claim 11, wherein the respective drop-error scores for the fluid-dispense ports that are usable to eject fluid are based on respective drop-placement errors of the fluid-dispense ports.

14. A device comprising:
one or more memories storing instructions; and
one or more processors, wherein the one or more processors and the one or more memories are configured to:
obtain information indicating fluid-dispense ports of a collection of fluid-dispense ports that are usable to eject fluid and fluid-dispense ports of the collection of fluid-dispense ports that are not usable to eject fluid,
specify a largest contiguous fluid-dispense port group of the fluid-dispense ports that are usable to eject fluid,
specify, for each pass combination of a plurality of pass combinations, a respective maximum coverage range, wherein each pass combination, of the plurality of pass combinations, respectively includes two or more passes, and wherein the two or more passes are shifted relative to each other according to shift values, and wherein at least one of the fluid-dispense ports that are usable to eject fluid can eject fluid in each drop location encompassed by the respective maximum coverage range, and
select, as a selected basis of a scanning pattern, the largest contiguous fluid-dispense port group or one of the plurality of pass combinations based on a height of the largest contiguous fluid-dispense port group and respective heights of the maximum coverage ranges.

15. The device of claim 14, wherein a single fluid-dispense head includes each of the fluid-dispense ports in the collection of fluid-dispense ports.

16. The device of claim 14, wherein multiple fluid-dispense heads include respective subsets of the fluid-dispense ports in the collection of fluid-dispense ports.

17. The device of claim 14, wherein the one or more processors and the one or more memories are further configured to:
generate a scanning pattern based on the selected basis of the scanning pattern; and
control a fluid dispenser to eject fluid according to the scanning pattern.

18. The device of claim 14, wherein the one or more processors and the one or more memories are further configured to:
calculate a respective drop-error score for each of the fluid-dispense ports that are usable to eject fluid,
wherein selecting the selected basis of the scanning pattern is further based on the respective drop-error scores for the fluid-dispense ports that are usable to eject fluid.

19. The device of claim 18, wherein the respective drop-error scores for the fluid-dispense ports that are usable to eject fluid are based on respective distances of the fluid-dispense ports from a datum.

20. The device of claim 19, wherein the respective drop-error scores for the fluid-dispense ports that are usable to eject fluid are further based on respective volume performances or placement performances of the fluid-dispense ports.

* * * * *